United States Patent
Ohori et al.

(10) Patent No.: US 10,871,795 B2
(45) Date of Patent: Dec. 22, 2020

(54) ELECTRIC POWER SYSTEM

(71) Applicant: DAIHEN CORPORATION, Osaka (JP)

(72) Inventors: Akihiro Ohori, Osaka (JP); Nobuyuki Hattori, Osaka (JP)

(73) Assignee: DAIHEN Corporation, Osaka (JP)

( * ) Notice: Subject to any disclaimer, the term of this patent is extended or adjusted under 35 U.S.C. 154(b) by 370 days.

(21) Appl. No.: 16/081,276

(22) PCT Filed: Feb. 24, 2017

(86) PCT No.: PCT/JP2017/007105
§ 371 (c)(1),
(2) Date: Aug. 30, 2018

(87) PCT Pub. No.: WO2017/150376
PCT Pub. Date: Sep. 8, 2017

(65) Prior Publication Data
US 2020/0183436 A1    Jun. 11, 2020

(30) Foreign Application Priority Data
Mar. 2, 2016    (JP) ................. 2016-040308

(51) Int. Cl.
G05F 1/67    (2006.01)
H02J 13/00    (2006.01)
(Continued)

(52) U.S. Cl.
CPC .............. G05F 1/67 (2013.01); H02J 3/32 (2013.01); H02J 3/46 (2013.01); H02J 13/00022 (2020.01); *H02J 2300/24* (2020.01)

(58) Field of Classification Search
CPC ......... G05F 1/67; H02J 13/00022; H02J 3/32; H02J 3/46; H02J 2300/24; H02J 3/38;
(Continued)

(56) References Cited

U.S. PATENT DOCUMENTS

2008/0157591 A1*   7/2008   Fattal ................. B60L 50/61
                                           307/10.1
2013/0013123 A1*   1/2013   Ozaki ................. H01M 10/48
                                           700/295

(Continued)

FOREIGN PATENT DOCUMENTS

| JP | 2012-205322 A | 10/2012 |
|---|---|---|
| JP | 2013-5537 A | 1/2013 |
| JP | 2013-207862 A | 10/2013 |

OTHER PUBLICATIONS

International Search Report issued in PCT/JP2017/007105, dated Apr. 18, 2017 (1 page).

*Primary Examiner* — Ziaul Karim
(74) *Attorney, Agent, or Firm* — Hamre, Schumann, Mueller & Larson, P.C.

(57) ABSTRACT

A power system includes a plurality of power conditioners, and a central management device that manages the plurality of power conditioners. The central management device includes a detector and an index calculator. The detector detects regulation subject power. The index calculator calculates an index for controlling individual output powers of the plurality of power conditioners such that the regulation subject power matches with target power. Each of the plurality of power conditioners includes a target power calculator and a controller. The target power calculator calculates the individual target power of the power conditioner based on an optimization problem using the index. The controller regulates the individual output power to the individual target power.

17 Claims, 24 Drawing Sheets

(51) Int. Cl.
*H02J 3/32* (2006.01)
*H02J 3/46* (2006.01)

(58) Field of Classification Search
CPC . H02J 7/35; H02J 13/00; Y04S 40/126; Y04S 10/12; Y04S 10/123; Y04S 10/14; Y02E 70/30; Y02E 10/56; Y02E 40/70; Y02E 60/00; Y02P 90/50
See application file for complete search history.

(56) References Cited

U.S. PATENT DOCUMENTS

| | | | |
|---|---|---|---|
| 2013/0041516 A1* | 2/2013 | Rockenfeller | H02J 3/38 700/287 |
| 2015/0236589 A1* | 8/2015 | Baba | H02M 3/158 307/82 |
| 2016/0241040 A1* | 8/2016 | Kusunose | H02M 1/08 |

* cited by examiner

FIG.16

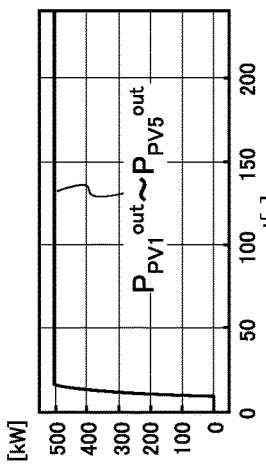
(a) Power generation amounts $P_i^{SP}$ of solar cells $SP_i$

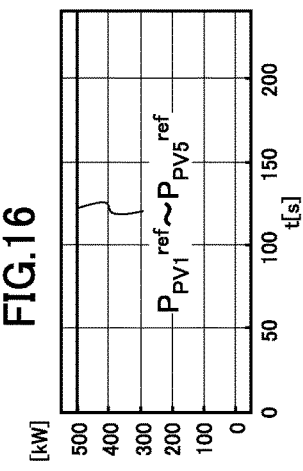
(b) Individual target powers $P_{PVi}^{ref}$ of power conditioners $PCS_{PVi}$

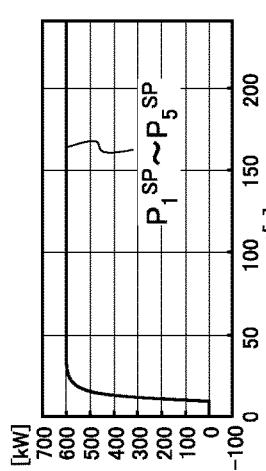
(c) Individual output powers $P_{PVi}^{out}$ of power conditioners $PCS_{PVi}$

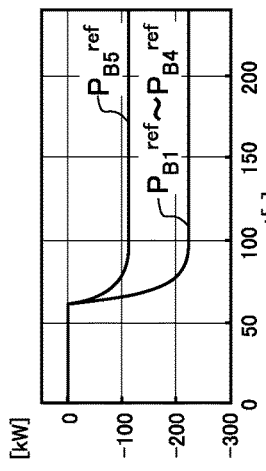
(e) Individual target powers $P_{Bk}^{ref}$ of power conditioners $PCS_{Bk}$

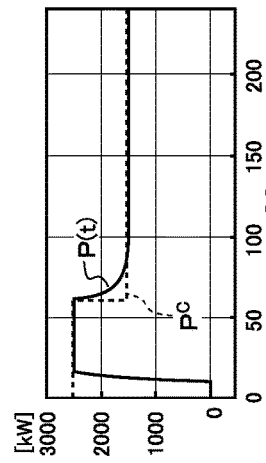
(d) Connection point power $P(t)$, Output command value $P^C$

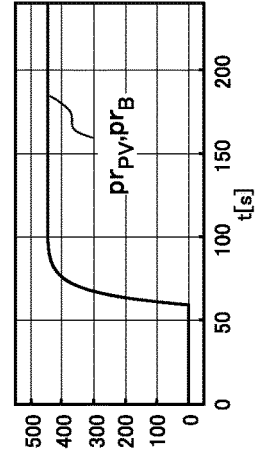
(f) Individual output powers $P_{Bk}^{out}$ of power conditioners $PCS_{Bk}$ (g) Suppression index $pr_{PV}$, Charge/discharge index $pr_B$

ELECTRIC POWER SYSTEM

TECHNICAL FIELD

The present disclosure relates to an interconnected power system, and particularly to a power system that adjusts regulation subject power to target power.

BACKGROUND ART

In recent years, power generation systems utilizing renewable energy have been widespread. One example of such a system is a photovoltaic power generation system that utilizes sunlight. The photovoltaic power generation system includes a solar cell and a power conditioner. The solar cell generates DC power, which is then converted to AC power by the power conditioner. The converted AC power is supplied to a power grid. Photovoltaic power generation systems range from a small-scale system for a general household to a large-scale system such as a mega-solar system.

A large-scale photovoltaic power generation system includes a plurality of power conditioners that are each connected to a power grid. For example, a photovoltaic power generation system disclosed in Patent Document 1 includes a plurality of solar cells, a plurality of power conditioners, and a monitoring control system. The monitoring control system monitors and controls the plurality of power conditioners. Specifically, the monitoring control system monitors input/output power, input/output voltage, input/output current, etc., for the plurality of power conditioners, and performs control such as changing the output voltage.

TECHNICAL REFERENCE

Patent Document

Patent Document 1: Japanese Patent Application Publication No. 2012-205322

SUMMARY OF THE INVENTION

Problems to be Solved by the Invention

Since the monitoring control system as described above monitors and controls the power conditioners, an increase in the number of power conditioners to be monitored and controlled inevitably leads to an increase in the processing load.

A power system according to the present disclosure is created in view of the foregoing circumstances. An object of the present disclosure is therefore to provide a power system capable of regulating the regulation subject power to a target value while reducing the processing load of a device that manages a plurality of power conditioners.

Means for Solving the Problems

A power system provided by the present disclosure is a power system connected to a power grid, comprising: a plurality of power conditioners; and a central management device that manages the plurality of power conditioners. The central management device includes: a detector that detects regulation subject power; an index calculator that calculates an index for controlling individual output powers of the plurality of power conditioners such that the regulation subject power matches with target power, where the calculating of the index is based on the regulation subject power and the target power; and a transmitter that transmits the index to the plurality of power conditioners. Each of the plurality of power conditioners includes: a receiver that receives the index; a target power calculator that calculates the individual target power of the power conditioner based on an optimization problem using the index; and a controller that regulates the individual output power of the power conditioner to the individual target power.

In a preferred embodiment of the power system, the plurality of power conditioners include n photovoltaic power conditioners (n being a positive integer) that receive power from solar cells. The index calculator calculates a suppression index as the index for the photovoltaic power conditioners. The transmitter transmits the suppression index to the photovoltaic power conditioners.

In a preferred embodiment of the power system, when pr denotes the suppression index, $P_i^{ref}$ (i=an integer of 1, ..., n) denotes the individual target power of each of the n photovoltaic power conditioners, $P_i^{lmt}$ denotes a rated output of each of the n photovoltaic power conditioners, and $w_i$ denotes a weight for an output control of each of the n photovoltaic power conditioners, the individual target power $P_i^{ref}$ is calculated by solving an optimization problem defined by the following formula (1).

$$\min_{P_i^{ref}} \left\{ w_i \left( P_i^{ref} - P_i^{lmt} \right)^2 + pr \left( P_i^{ref} - P_i^{lmt} \right) \right\} \quad \Lambda(1)$$

$$\text{subject to } 0 \leq P_i^{ref} \leq P_i^{lmt}$$

In a preferred embodiment of the power system, when $P_i^{out}(t)$ denotes the individual output power of each of the n photovoltaic power conditioners, $P^C(t)$ denotes the target power, and P(t) denotes the regulation subject power, the index calculator calculates the suppression index pr by solving the following formulas (2) and (3).

$$\frac{d\lambda}{dt} = \varepsilon \left( \sum_{i=1}^{n} P_i^{out}(t) - P^C(t) \right), \varepsilon > 0 \quad (2)$$

$$= \varepsilon (P(t) - P^C(t))$$

$$pr = \lambda \quad (3)$$

Note that ε denotes a gradient coefficient.

In a preferred embodiment of the power system, the plurality of power conditioners include m storage cell power conditioners (m being a positive integer) that receive power from storage cells or output power to the storage cells. The index calculator calculates a charge/discharge index as the index for the storage cell power conditioners. The transmitter transmits the charge/discharge index to the storage cell power conditioners.

In a preferred embodiment of the power system, when $pr_{pv}$ denotes the suppression index, $P_{PVi}^{ref}$ (i=an integer of 1, ..., n) denotes the individual target power of each of the n photovoltaic power conditioners, $P_{PVi}^{lmt}$ denotes a rated output of each of the n photovoltaic power conditioners, $w_{PVi}$ denotes a weight for an output control of each of the n photovoltaic power conditioners, and $P_{qi}$ denotes a design parameter indicating whether to prioritize suppression of the individual output power of each of the n photovoltaic power conditioners, the individual target power $P_{PVi}^{ref}$ is calculated by solving an optimization problem defined by the following formula (4). Also, when $pr_B$ denotes the charge/discharge index, $P_{Bk}^{ref}$ (k=an integer of 1, ..., m) denotes the individual target power of each of them storage cell power conditioners, $P_{Bk}^{lmt}$ denotes a rated output of each of the m storage cell power conditioners, $w_{Bk}$ denotes a weight for an output control of each of the m storage cell power conditioners, and $\alpha_k$ and $\beta_k$ denote parameters set according to a remaining amount of each of the storage cells, the individual target power $P_{Bk}^{ref}$ is calculated by solving an optimization problem defined by the following formula (5).

$$\min_{P_{PVi}^{ref}} \{w_{PVi}(P_{PVi}^{ref} - P_{\phi i})^2 + pr_{PV}(P_{PVi}^{ref} - P_{\phi i})\} \quad \Lambda(4)$$
$$\text{subject to } 0 \le P_{PVi}^{ref} \le P_{PVi}^{lmt}$$

$$\min_{P_{Bk}^{ref}} \{w_{Bk}(P_{Bk}^{ref})^2 + pr_B(P_{Bk}^{ref})\} \quad \Lambda(5)$$
$$\text{subject to } -P_{Bk}^{lmt} \le P_{Bk}^{ref} \le P_{Bk}^{lmt}$$
$$\alpha_k \le P_{Bk}^{ref} \le \beta_k$$

In a preferred embodiment of the power system, when $pr_{PV}$ denotes the suppression index, $P_{PVi}^{ref}$ (i=an integer of 1, ..., n) denotes the individual target power of each of the n photovoltaic power conditioners, $P_{PVi}^{lmt}$ denotes a rated output of each of the n photovoltaic power conditioners, $w_{PVi}$ denotes a weight for an output control of each of the n photovoltaic power conditioners, $P_{\phi i}$ denotes a design parameter indicating whether to prioritize suppression of the individual output power of each of the n photovoltaic power conditioners, $Q_{PVi}$ denotes an output of reactive power, $S_{PVi}^d$ denotes a maximum apparent power that can be output, $V_{PVi}$ denotes a connection point voltage of each of the n photovoltaic power conditioners, and $V_0$ denotes a connection point reference voltage, the individual target power $P_{PVi}^{ref}$ is calculated by solving an optimization problem defined by the following formula (4'). Also, wherein when $pr_B$ denotes the charge/discharge index, $P_{Bk}^{ref}$ (k=an integer of 1, ..., m) denotes the individual target power of each of the m storage cell power conditioners, $P_{Bk}^{lmt}$ denotes a rated output of each of the m storage cell power conditioners, $P_{SMk}^{lmt}$ denotes a charge rated output of each of the storage cells, $P_{SPk}^{lmt}$ denotes a discharge rated output of each of the storage cells, $w_{Bk}$ denotes a weight for an output control of each of the m storage cell power conditioners, $\alpha_k$ and $\beta_k$ denote parameters set according to a remaining amount of each of the storage cells, $W_{SOCk}$ denotes a weight corresponding to a state of charge of each of the storage cells, $Q_{Bk}$ denotes an output of reactive power, $S_{Bk}^d$ denotes a maximum apparent power that can be output, $V_{Bk}$ denotes a connection point voltage of each of the m storage cell power conditioners, and $V_0$ denotes a connection point reference voltage, the individual target power $P_{Bk}^{ref}$ is calculated by solving an optimization problem defined by the following formula (5').

$$\min_{P_{PVi}^{ref}} \{w_{PVi}(P_{PVi}^{ref} - P_{\phi i})^2 + pr_{PV}(P_{PVi}^{ref} - P_{\phi i})\} \quad \Lambda(4')$$
$$\text{subject to } 0 \le P_{PVi}^{ref} \le P_{PVi}^{lmt}$$
$$(P_{PVi}^{ref})^2 + (Q_{PVi})^2 \le \left(S_{PVi}^d \frac{V_{PVi}}{V_0}\right)^2$$

$$\min_{P_{Bk}^{ref}} \{w_{Bk} w_{SOCk}(P_{Bk}^{ref})^2 + pr_B(P_{Bk}^{ref})\} \quad \Lambda(5')$$
$$\text{subject to } -P_{Bk}^{lmt} \le P_{Bk}^{ref} \le P_{Bk}^{lmt}$$
$$P_{SMk}^{lmt} \le P_{Bk}^{ref} \le P_{SPk}^{lmt}$$
$$\alpha_k \le P_{Bk}^{ref} \le \beta_k$$
$$(P_{Bk}^{ref})^2 + (Q_{Bk})^2 \le \left(S_{Bk}^d \frac{V_{Bk}}{V_0}\right)^2$$

In a preferred embodiment of the power system, when $P_{PVi}^{out}(t)$ denotes the individual output power of each of the n photovoltaic power conditioners, $P_{BK}^{out}(t)$ denotes the individual output power of each of the m storage cell power conditioners, $P^C(t)$ denotes the target power, $P(t)$ denotes the regulation subject power, $pr_{PV}$ denotes the suppression index, and $pr_3$ denotes the charge/discharge index, the index calculator calculates the suppression index $pr_{PV}$ and the charge/discharge index $Pr_3$ with use of the following formulas (6) and (7).

$$\frac{d\lambda}{dt} = \varepsilon \left( \sum_{i=1}^{n} (P_{PFi}^{out}(t)) + \sum_{k=1}^{m} (P_{Bk}^{out}(t)) - P^c(t) \right), \varepsilon > 0 \quad (6)$$
$$= \varepsilon(P(t) - P^c(t))$$

$$pr_{PF} = pr_B = \lambda \quad (7)$$

Note that $\varepsilon$ denotes a gradient coefficient.

In a preferred embodiment of the power system, the regulation subject power is a power at a connection point of the plurality of power conditioners and the power grid.

In a preferred embodiment of the power system, the central management device further includes: an acquiring unit that acquires the individual output powers of the plurality of power conditioners; and a total output power calculator that calculates a total output power which is a sum of the individual output powers of the plurality of power conditioners. The regulation subject power is the total output power.

In a preferred embodiment of the power system, a load that consumes power is connected to the connection point of the plurality of power conditioners and the power grid.

In a preferred embodiment of the power system, a load that consumes power is connected to the connection point of the plurality of power conditioners and the power grid. The central management device further includes: an acquiring unit that acquires the individual output powers of the plurality of power conditioners, and that acquires power consumption of the load; a total output power calculator that calculates a total output power that is a sum of the individual output powers of the plurality of power conditioners; and a connection point power estimator that estimates a power at the connection point, based on the total output power and the power consumption. The regulation subject power is the power at the connection point.

In a preferred embodiment of the power system, the central management device further includes an acquiring unit that acquires an output command from a power company via wireless communication, and the target power is a target value based on the output command.

In a preferred embodiment of the power system, the central management device further includes a setting unit that sets an upper limit value of power supplied from the power grid, and the target power is a target value based on the upper limit value.

In a preferred embodiment of the power system, when at least one of the plurality of power conditioners is connected to any of the solar cells, the index calculator calculates the index for the at least one power conditioner as 0.

In a preferred embodiment of the power system, the central management device further includes a setting unit that sets a reverse power flow prevention target, and the target power is a target value based on the reverse power flow prevention target.

In a preferred embodiment of the power system, the plurality of power conditioners are divided into a plurality of groups, and in at least one of the plurality of groups, a control is performed such that a sum of the individual output powers of all power conditioners in the group indicates a predetermined target value.

Effect of the Invention

According to the power system of the present disclosure, the central management device calculates the index for controlling the individual output powers of the plurality of power conditioners such that the regulation subject power matches with the target power. Each of the plurality of power conditioners calculates the individual target power of the power conditioner based on the optimization problem using the index, so that the individual output power matches with the individual target power. In this way, the central management device only needs to calculate the index and does not need to calculate the individual target power for each of the plurality of power conditioners. This makes it possible to reduce the processing load on the central management device. Each of the plurality of power conditioners then controls the individual output power based on the index. This makes it possible to match the regulation subject power with the target power.

BRIEF DESCRIPTION OF THE DRAWINGS

FIG. 16 shows a verification result (case 3) in the simulation according to the second embodiment;

MODE FOR CARRYING OUT THE INVENTION

The following describes embodiments of a power system according to the present disclosure, in the case where the power system is applied to a photovoltaic power generation system connected to a power grid. In the following description, when the power at a connection point takes a positive value, power is assumed to be output (reversely flowing) from the photovoltaic power generation system to the power grid. On the other hand, when the power at the connection point takes a negative value, power is assumed to be output from the power grid to the photovoltaic power generation system.

Figure 1:
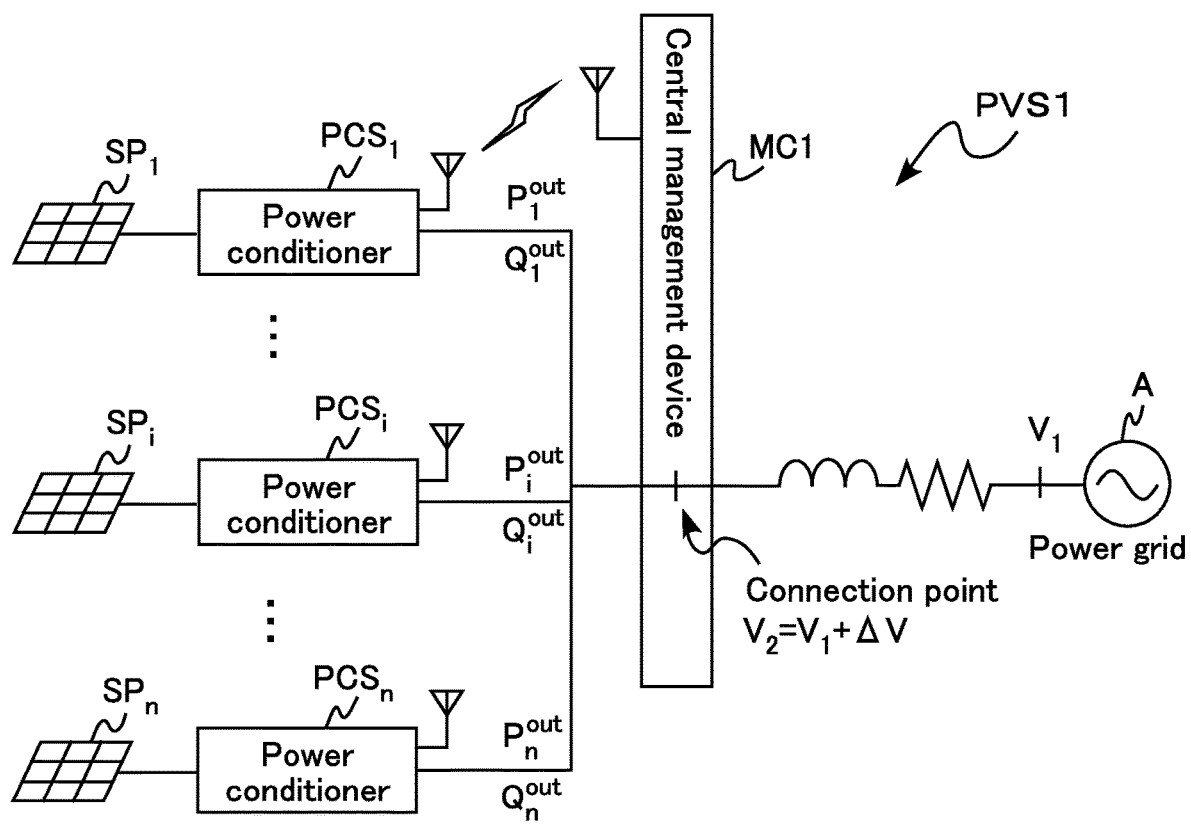
FIG. 1 shows the overall structure of a photovoltaic power generation system according to a first embodiment.
Figure 2:
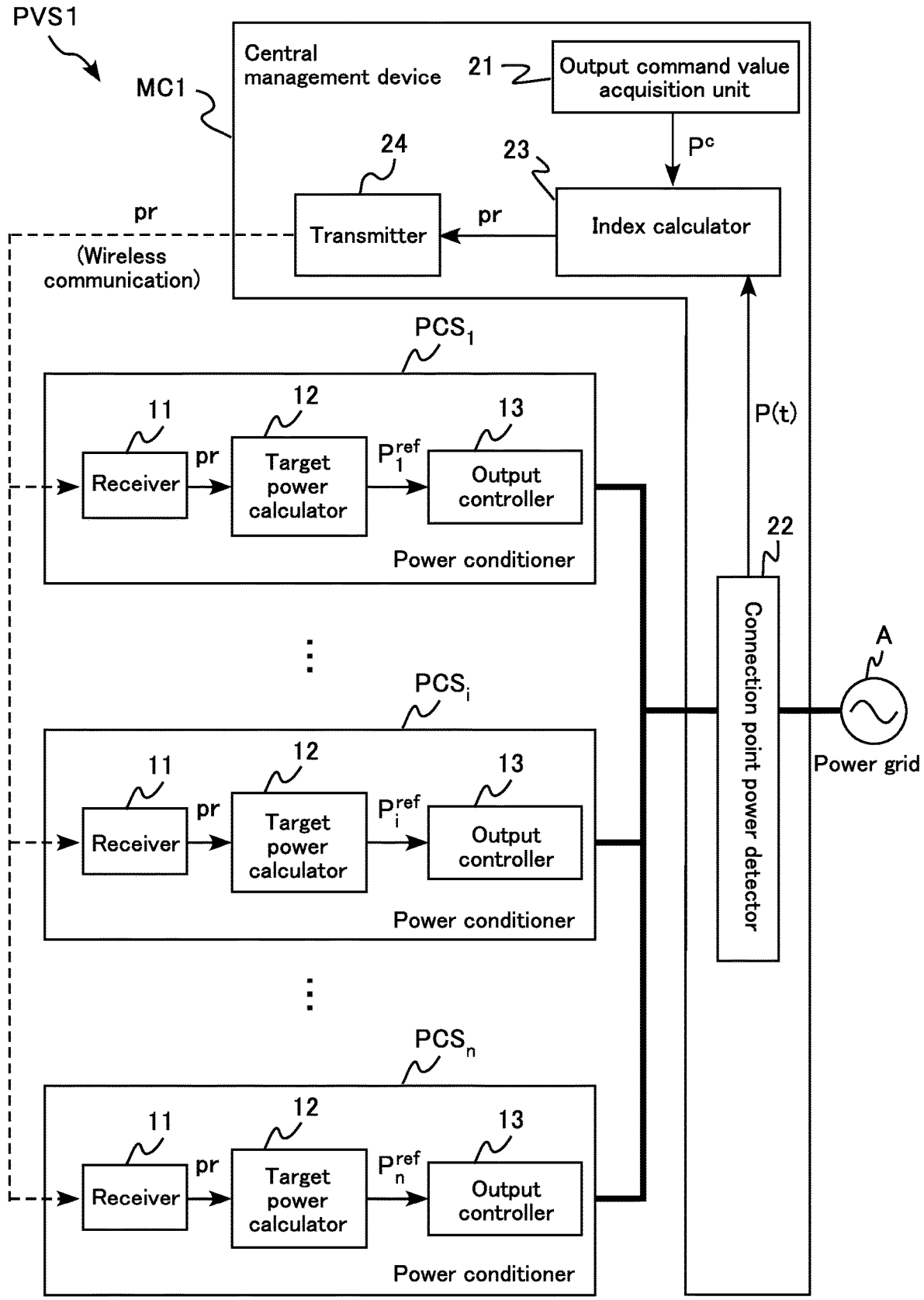
FIG. 2 shows the functional structure for a connection point power suppression control of the photovoltaic power generation system according to the first embodiment.

FIGS. 1 and 2 show a photovoltaic power generation system PVS1 according to a first embodiment. FIG. 1 shows the overall structure of the photovoltaic power generation system PVS1. FIG. 2 shows the functional structure of a control system in the photovoltaic power generation system PVS1 in FIG. 1, where the control system controls power at a connection point with a power grid A.

As shown in FIG. 1, the photovoltaic power generation system PVS1 includes a plurality of solar cells $SP_i$ (i=1, 2, ..., n; n being a positive integer), a plurality of power conditioners $PCS_i$, and a central management device MC1. The photovoltaic power generation system PVS1 is an interconnected reverse power flow system.

Each of the plurality of solar cells SP converts solar energy to electric energy. Each of the solar cells $SP_i$ includes a plurality of solar cell panels connected in series/in parallel. Each of the solar cell panels may be formed by connecting a plurality of solar cells that are made of a semiconductor, such as silicon, and covering the solar cells with resin or tempered glass for outdoor use. The solar cells $SP_i$ generate and output power (DC power) to the power conditioners $PCS_i$. Note that the maximum amount of power generatable by each of the solar cells $SP_i$ is assumed to be a power generation amount $P_i^{SP}$ of the solar cell $SP_i$.

Each of the power conditioners $PCS_i$ converts the power generated by the corresponding solar cell $SP_i$ to AC power. The converted AC power is then output to the power grid A. Each of the power conditioners $PCS_i$ includes an inverter circuit, a transformer, and a control circuit. The inverter circuit converts the DC power input from the solar cell $SP_i$ to AC power synchronized with the power grid A. The transformer boosts (or drops) AC voltage output from the inverter circuit. The control circuit controls, for example, the inverter circuit. Note that the power conditioners $PCS_i$ may have a structure different from the structure described above.

Letting the active power output from each of the power conditioners $PCS_i$ be $P_i^{out}$, and the reactive power output therefrom be $Q_i^{out}$, then the complex power of $P_i^{out}+jQ_i^{out}$ is output from each of the power conditioners $PCS_i$. Accordingly, the complex power of $\Sigma_i P_i^{out}+j\Sigma_i Q_i^{out}$ is output at the connection point of the plurality of power conditioners PCS and the power grid A. In other words, the power at the connection point (hereinafter "connection point power") is the sum of the output power of each power conditioner $PCS_i$. In the present embodiment, consideration is not particularly given to the output control of the reactive power $Q_i^{out}$, which is mainly used to suppress voltage variations at the connection point. In other words, the connection point power is the sum $(\Sigma_i P_i^{out})$ of the active powers $P_i^{out}$ at the connection point. The connection point power is assumed to be P(t).

When the number of photovoltaic power generation systems PVS1 connected to the power grid A increases, power supply to the power grid A becomes excessive relative to the demand. In order to address the excessive supply, each of the photovoltaic power generation systems PVS1 may be commanded by a power company to suppress output power. Thus, the photovoltaic power generation system PVS1 according to the present embodiment suppresses output power according to the output suppression command from the power company.

In the present embodiment, the output suppression command from the power company commands the photovoltaic power generation system PVS1 that the connection point power P(t) should not exceed a predetermined value. The photovoltaic power generation system PVS1 controls the connection point power P(t) according to the output suppression command. Specifically, the output suppression command from the power company to the photovoltaic power generation system PVS1 indicates an output command value $P^C$ which is the upper limit value of the connection point power P(t). The photovoltaic power generation system PVS1 controls the output power of each power conditioner $PCS_i$ (hereinafter "individual output power") $P_i^{out}$, so that the connection point power P(t) matches with an output command value $P^C$ specified by the power company. Accordingly, the connection point power P(t) is regarded as the regulation subject power, and the output command value $P^C$ is regarded as the target value of the connection point power P(t). When the connect ion point power P(t) is greater than the output command value $P^C$, the photovoltaic power generation system PVS1 suppresses the individual output power $P_i^{out}$ of each power conditioner $PCS_i$. Accordingly, the control performed by the photovoltaic power generation system PVS1 is referred to as "connection point power suppression control".

In the connection point power suppression control, each of the power conditioners $PCS_i$ receives a suppression index pr from the central management device MC1, and calculates the target of the individual output power $P_i^{out}$ (hereinafter, "individual target power") $P_i^{ref}$, based on the suppression index pr. The suppression index pr is information for regulating the connection point power P(t) to the output command value $P^C$ and for calculating the individual target power $P_i^{ref}$. Each of the power conditioners $PCS_i$ controls the individual output power $P_i^{out}$ based on the individual target power $P_i^{ref}$ thus calculated. In order to do so, each of the power conditioners PCSi includes a receiver 11, a target power calculator 12, and an output controller 13, as shown in FIG. 2.

The receiver 11 receives the suppression index pr transmitted from the central management device MC1. The receiver 11 receives the suppression index pr, for example, by wireless communication. It is possible to use wired communication instead of wireless communication.

The target power calculator 12 calculates the individual target power $P_i^{ref}$ of the power conditioner (power conditioner $PCS_i$), based on the suppression index pr received by the receiver 11. Specifically, the target power calculator 12 calculates the individual target power $P_i^{ref}$ by solving a constrained optimization problem shown by the following formula (8). In formula (8), $P_i^{lmt}$ denotes the rated output (output limit) of each power conditioner $PCS_i$, and $w_i$ denotes a weight for the active power suppression of the power conditioner $PCS_i$. The weight $w_i$ for the active power suppression is stored in the target power calculator 12. The weight $w_i$ for the active power suppression can be set manually by a user. Alternatively, each of the power conditioners $PCS_i$ may set the weight $w_i$ automatically based on the situation of the power conditioner PCS (e.g., temperature, climate, the amount of reactive power, etc). Details of the following formula (8) are described later.

$$\left.\begin{array}{ll}\min_{P_i^{ref}}\{w_i(P_i^{ref}-P_i^{lmt})^2+pr(P_i^{ref}-P_i^{lmt})\} & \Lambda(8a)\\ \text{subject to } 0\leq P_i^{ref}\leq P_i^{lmt} & \Lambda(8b)\end{array}\right\} \quad \Lambda(8)$$

The output controller 13 controls the individual output power $P_i^{out}$ by controlling the inverter circuit described above. The output controller 13 regulates the individual output power $P_i^{out}$ to the individual target power $P_i^{ref}$ calculated by the target power calculator 12.

The central management device MC1 centrally manages the power conditioners $PCS_i$. The central management device MC1 exchanges various pieces of information with the power conditioners $PCS_i$, for example, by wireless communication. It is possible to use wired communication instead of wireless communication. The central management device MC1 monitors the connect ion point power P(t) during the connection point power suppression control. Furthermore, the central management device MC1 acquires the output command value $P^C$ specified by the power company. Thereafter, the central management device MC1 calculates the suppression index pr for regulating the connection point power P(t) to the output command value $P^C$, and transmits the suppression index pr to each of the power conditioners $PCS_i$. In order to do so, the central management device MC1 includes an output command value acquisition unit 21, a connection point power detector 22, an index calculator 23, and a transmitter 24, as shown in FIG. 2.

The output command value acquisition unit 21 acquires the output command value $P^C$ specified by the power company. For example, the output command value acquisition unit 21 acquires the output command value $P^C$ from the power company by wireless communication. Alternatively, the output command value $P^C$ specified by the power company may be manually input to a predetermined computer by a manager, and the output command value acquisition unit 21 may acquire the output command value $P^C$ from the computer. Yet alternatively, the output command value acquisition unit 21 may acquire, via another communication device, the output command value $P^C$ specified by the power company. The output command value acquisition unit 21 outputs the acquired output command value $P^C$ to the index calculator 23.

When there is no output suppression command from the power company, the output command value acquisition unit 21 informs the index calculator 23 accordingly. "When there is no output suppression command from the power company" refers to when the output of the photovoltaic power generation system PVS1 is not suppressed and the power generated by the solar cells SP can be output to the maximum. For example, the maximum output is possible when each of the power conditioners $PCS_i$ operates at the maximum power point by a maximum power point tracking control. In the present embodiment, when there is no output suppression command from the power company, the output command value acquisition unit 21 outputs a numerical value of −1 as the output command value $P^C$ to the index calculator 23. Any informing method is possible as long as the index calculator 23 is informed of no output suppression command. For example, the output command value acquisition unit 21 may acquire, from the power company, etc., flag information indicating whether there is an output suppression command, and may inform the index calculator 23 of the flag information. For example, the flag information indicates "0" when there is no output suppression command, and indicates "1" when there is an output suppression command. When there is an output suppression command (i.e., when the flag information indicates "1"), the output command value acquisition unit 21 acquires the flag information and the output command value $P^C$.

In the present embodiment, a description is given of the case where the output command value acquisition unit 21 acquires the output command value $P^C$, but other examples are also conceivable. Specifically, it is possible to acquire information on an output suppression rate (%), instead of the output command value $P^C$. In this case, the output command value acquisition unit 21 calculates the output command value $P^C$, based on the output suppression ratio (%) thus acquired and the rated output of the entire photovoltaic power generation system PVS1 (i.e., the sum of the rated output of each power conditioner $PCS_i$) $\Sigma_i P_{hu\_lmt}$. For example, when acquiring a command indicating that the output suppression ratio is 20%, the output command value acquisition unit 21 calculates 80% of the rated output $\Sigma_i P_i^{lmt}$ of the photovoltaic power generation system PVS1 (=100−20) as the output command value $P^C$. The output command value acquisition unit 21 outputs the output command value $P^C$ thus calculated to the index calculator 23.

The connection point power detector 22 detects the connection point power P(t). Then, the connection point power detector 22 outputs the connection point power P(t) thus detected to the index calculator 23. Note that the connection point power detector 22 may be configured as a detection device different from the central management device MC1. In this case, the detection device (connection point power detector 22) transmits the detection value of the connection point power P(t) to the central management device MC1 by wireless communication or wired communication.

The index calculator 23 calculates the suppression index pr for regulating the connection point power P(t) to the output command value $P^C$. The index calculator 23 calculates the suppression index pr based on the following formulas (9) and (10) where λ denotes a Lagrange multiplier, ε denotes a gradient coefficient, and t denotes time. Suppose that the index calculator 23 receives, as the output command value $P^C$, a numerical value of −1, which indicates that there is no output suppression command from the power company. In this case, the index calculator 23 sets the Lagrange multiplier λ to "0". In other words, the suppression index pr is calculated to be "0". In the following formula (9), the individual output power $P_i^{out}$ and the output command value $P^C$ vary relative to time t. Accordingly, the individual output power is denoted by $P_i^{out}(t)$ and the output command value by $P^C(t)$. Details of the formulas (9) and (10) are described later.

$$\frac{d\lambda}{dt} = \varepsilon\left(\sum_{i=1}^{n} P_i^{out}(t) - P^C(t)\right), \varepsilon > 0 \qquad (9)$$
$$= \varepsilon(P(t) - P^C(t))$$

$$pr = \lambda \qquad (10)$$

The transmitter 24 transmits the suppression index pr calculated by the index calculator 23 to the power conditioners $PCS_i$.

Next, a description is provided of a reason why the power conditioners $PCS_i$ use the above formula (8) to calculate the individual target power $P_i^{ref}$, and a reason why the central management device MC1 uses the above formulas (9) and (10) to calculate the suppression index pr, during the connection point power suppression control performed by the photovoltaic power generation system PVS1.

The photovoltaic power generation system PVS1 is configured to achieve the following three objectives during the connection point power suppression control. The first objective (objective 1-1) is that "each of the power conditioners $PCS_i$ dispersively calculates the individual target power". The second objective (objective 1-2) is "to match the output power at the connection point (connection point power) of the photovoltaic power generation system PVS1 with the output command value from the power company". The third objective (objective 1-3) is "to make an output suppression amount adjustable for each power conditioner $PCS_i$". The output suppression amount refers to a difference between the value of the maximum power that can be output by each power conditioner PCS, and the individual output power $P_i^{out}$. The value of the maximum power that can be output is the rated output $P_i^{lmt}$ of the power conditioner $PCS_i$ when the power generation amount $P_i^{SP}$ of the solar cell $SP_i$>the rated output power $P_i^{lmt}$. On the other hand, the value of the maximum power that can be output is the power generation amount $P_i^{SP}$ of the solar cell $SP_i$ when the power generation amount $P_i^{SP}$ of the solar cell $SP_i$≤ the rated output $P_i^{lmt}$.

First, consideration is given to a constrained optimization problem when the central management device MC1 centrally calculates the individual target powers $P_i^{ref}$. In this case, the following formula (11) is obtained. As described above, $P_i^{ref}$ denotes the individual target power of each of the power conditioners $PCS_i$, $P_i^{lmt}$ denotes the rated output (output limit) of each of the power conditioners $PCS_i$, and $P^C$ denotes the output command value specified by the power company. The individual target power $P_i^{ref}$ that is the optimum solution of the following formula (11) is denoted by $(P_i^{ref})^*$. In the following formula (11), formula (11a) expresses minimization of the output suppression amount of the individual output power $P_i^{out}$, formula (11b) expresses the constraint by the rated output $P_i^{lmt}$, and formula (11c) expresses matching of the connection point power $P(t)$ with the output command value $P^C$.

$$\left. \begin{array}{ll} \min_{P_i^{ref}} \left\{ \sum_{i=1}^n w_i (P_i^{ref} - P_i^{lmt})^2 \right\} & \Lambda(11a) \\ \text{subject to } 0 \leq P_i^{ref} \leq P_i^{lmt} & \Lambda(11b) \\ \sum_{i=1}^n P_i^{ref} - P^C = 0 & \Lambda(11c) \end{array} \right\} \quad \Lambda(11)$$

This indicates the case where the central management device MC1 calculates the individual target power $(P_i^{ref})^*$ from the above formula (11). In the case of the above formula (11), the power conditioners $PCS_i$ do not dispersively calculate the individual target power $(P_i^{ref})^*$, and the objective 1-1 is therefore not achieved.

Next, consideration is given to a constrained optimization problem when each of the power conditioners $PCS_i$ dispersively calculates the individual target power $P_i^{ref}$. In this case, the following formula (12) is obtained.

$$\left. \begin{array}{ll} \min_{P_i^{ref}} \{ w_i (P_i^{ref} - P_i^{lmt})^2 \} & \Lambda(12a) \\ \text{subject to } 0 \leq P_i^{ref} \leq P_i^{lmt} & \Lambda(12b) \end{array} \right\} \quad \Lambda(12)$$

Although the individual target power that is the optimum solution of the above formula (12) is the individual target power $P_i^{ref}$ that is dispersively calculated by each of the power conditioners $PCS_i$, this individual target power disregards the above formula (11c). Accordingly, the objective 1-2, which is to match the connection point power $P(t)$ with the output command value $P^C$ from the power company, cannot be achieved.

In view of the above, the following method is taken into consideration to achieve the objective 1-2. That is, each of the power conditioners $PCS_i$ dispersively calculates the individual target power $P_i^{ref}$, based on the suppression index pr received from the central management device MC1. As a result, the objective 1-2 is achieved. A constrained optimization problem when each of the power conditioners $PCS_i$ dispersively calculates the individual target power $P_i^{ref}$ with use of the suppression index pr is expressed by the above formula (8). Note that the individual target power $P_i^{ref}$ that is the optimum solution of the above formula (8) is denoted by $(P_i^{ref})^b$.

When the optimum solution $(P_i^{ref})^*$ obtained from the above formula (11) matches with the optimum solution $(P_i^{ref})^b$, the connection point power $P(t)$ can be matched with the output command value $P^C$ from the power company. That is, the objective 1-2 can be achieved even when each of the power conditioners $PCS_i$ dispersively solves the optimization problem. Accordingly, the suppression index pr with which $(P_i^{ref})^* = (P_i^{ref})^b$ is considered, focusing on the optimality of a steady state. For that, KKT (Karush-Kuhn-Tucker) conditions of the above formulas (11) and (8) are considered. As a result, the following formula (13) is obtained from the KKT condition of the above formula (11), and the following formula (14) is obtained from the KKT condition of the above formula (8). Note that $\mu$ denotes a predetermined Lagrange multiplier.

$$\left. \begin{array}{ll} 2w_i(P_i^{ref} - P_i^{lmt}) + \lambda - \mu_{1,i} + \mu_{2,i} = 0 & \Lambda(13a) \\ -P_i^{ref} \leq 0, P_i^{ref} - P_i^{lmt} \leq 0 & \Lambda(13b) \\ \mu_{1,i}(-P_i^{ref}) = 0, \mu_{1,i} \geq 0 & \Lambda(13c) \\ \mu_{2,i}(P_i^{ref} - P_i^{lmt}) = 0, \mu_{2,i} \geq 0 & \Lambda(13d) \\ \sum_{i=1}^n P_i^{ref} - P^C = 0 & \Lambda(13e) \end{array} \right\} \quad \Lambda(13)$$

$$\left. \begin{array}{ll} 2w_i(P_i^{ref} - P_i^{lmt}) + pr - \mu_{1,i} + \mu_{2,i} = 0 & \Lambda(14a) \\ -P_i^{ref} \leq 0, P_i^{ref} - P_i^{lmt} \leq 0 & \Lambda(14b) \\ \mu_{1,i}(-P_i^{ref}) = 0, \mu_{1,i} \geq 0 & \Lambda(14c) \\ \mu_{2,i}(P_i^{ref} - P_i^{lmt}) = 0, \mu_{2,i} \geq 0 & \Lambda(14d) \end{array} \right\} \quad \Lambda(14)$$

Based on the above formulas (13) and (14), it can be understood that two optimum solutions $(P_i^{ref})^*$ and $(P_i^{ref})^b$ match with each other when $pr = \lambda$ (the above formula (10)). Accordingly, the central management device MC1 may calculate the Lagrange multiplier $\lambda$, and may present (transmit) the Lagrange multiplier $\lambda$ as the suppression index pr to each of the power conditioners PCSi, so that each of the power conditioners $PCS_i$ can calculate the individual target power $(P_i^{ref})^b$ based on the above formula (8). In this way, the connection point power $P(t)$ can be matched with the output command value $P^C$ from the power company even when each of the power conditioners $PCS_i$ dispersively calculates the individual target power $P_i^{ref}$. That is, the objective 1-2 can be achieved.

Next, a description is provided of a method by which the central management device MC1 calculates the Lagrange multiplier $\lambda$. In order for the central management device MC1 to calculate the Lagrange multiplier $\lambda$, it is defined as $h_{1,i} = -P_i^{ref}$, and $h_{2,i} = P_i^{ref} - P_i^{lmt}$, and the inequality constraints of the power conditioners $PCS_i$ are collectively defined as $h_{j,i}$ (j=1, 2, and i=1, . . . , n). Then, the following formula (15), which is the dual problem of the above formula (11), is considered.

$$\max_{\lambda} \left[ \min_{\substack{P_i^{ref} \\ h(j,i) \leq 0}} \left\{ \sum_{i=1}^n w_i (P_i^{ref} - P_i^{lmt})^2 + \lambda \left( \sum_{i=1}^n P_i^{ref} - P^C \right) \right\} \right] \quad \Lambda(15)$$

Assume here that the optimum solution $(P_i^{ref})^b$ calculated by each of the power conditioners $PCS_i$ is determined. In this case, the following formula (16) is obtained, which is in the form of a maximization problem for the Lagrange multiplier $\lambda$. Application of a gradient method to the following formula (16) yields the following formula (17). Note that $\varepsilon$ denotes a gradient coefficient, and $\tau$ indicates a time variable.

$$\max_{\lambda} \left\{ \sum_{i=1}^n w_i ((P_i^{ref})^b - P_i^{lmt})^2 + \lambda \left( \sum_{i=1}^n (P_i^{ref})^b - P^C \right) \right\} \quad \Lambda(16)$$

$$\frac{d\lambda}{d\tau} = \varepsilon \left( \sum_{i=1}^n (P_i^{ref})^b - P^C \right), \varepsilon > 0 \quad \Lambda(17)$$

In the above formula (17), $(P_i^{ref})^b$ is replaced with the individual output power $(P_i^{out})$ of the corresponding power conditioner $PCS_i$. Furthermore, the central management device MC1 observes the connection point power $P(t)=\Sigma_i P_i^{out}$, instead of individually observing the individual output power $P_i^{out}$ of each power conditioner $PCS_i$. Furthermore, it is assumed that the central management device MC1 sequentially acquires the output command value $P^C$ from the power company. As a result, the above formula (9) is obtained. Hence, the central management device MC1 can calculate the Lagrange multiplier λ, based on the connection point power $P(t)$ and the output command value $P^C$ from the power company. The calculated Lagrange multiplier λ is then set to the suppression index pr based on the above formula (10).

Based on the above, in the present embodiment, each of the power conditioners $PCS_i$ uses the optimization problem shown in formula (8) when calculating the individual target power $P_i^{ref}$. Also, the central management device MC1 uses the above formulas (9) and (10) when calculating the suppression index pr.

Next, a simulation was used to verify that the photovoltaic power generation system PVS1 having the above-described configuration achieves the above-described three objectives and operates appropriately.

In the simulation, the photovoltaic power generation system PVS1 was assumed to have 10 power conditioners $PCS_i$ (i=1 to 10; $PCS_1$ to $PCS_{10}$).

The model of the power grid A (connection point voltage) was set to the following formula (18). In the following formula (18), $R=R_L×L$, $X=X_L×L$, $R_L$ denotes the resistance component per unit length of a distribution line, $X_L$ denotes the reactance component per unit length of the distribution line, L denotes the length of the distribution line, and $V_1$ denotes upper system voltage. In the present simulation, the upper system voltage $V_1$ was set to 6600 V, the resistance component $R_L$ per unit length of the distribution line to 0.220 Ω/km, the reactance component $X_L$ per unit length of the distribution line to 0.276 Ω/km, and the length of the distribution line L to 5 km.

$$V_2 = \sqrt{\frac{b+\sqrt{b^2-4c}}{2}} \quad (18)$$
$$b = 2(PR-QR)+V_1^2$$
$$c = (P^2+Q^2)(R^2+X^2)$$
$$P = \sum_{i=1}^{n} P_i, Q = \sum_{i=1}^{n} Q_i.$$

Figure 3:
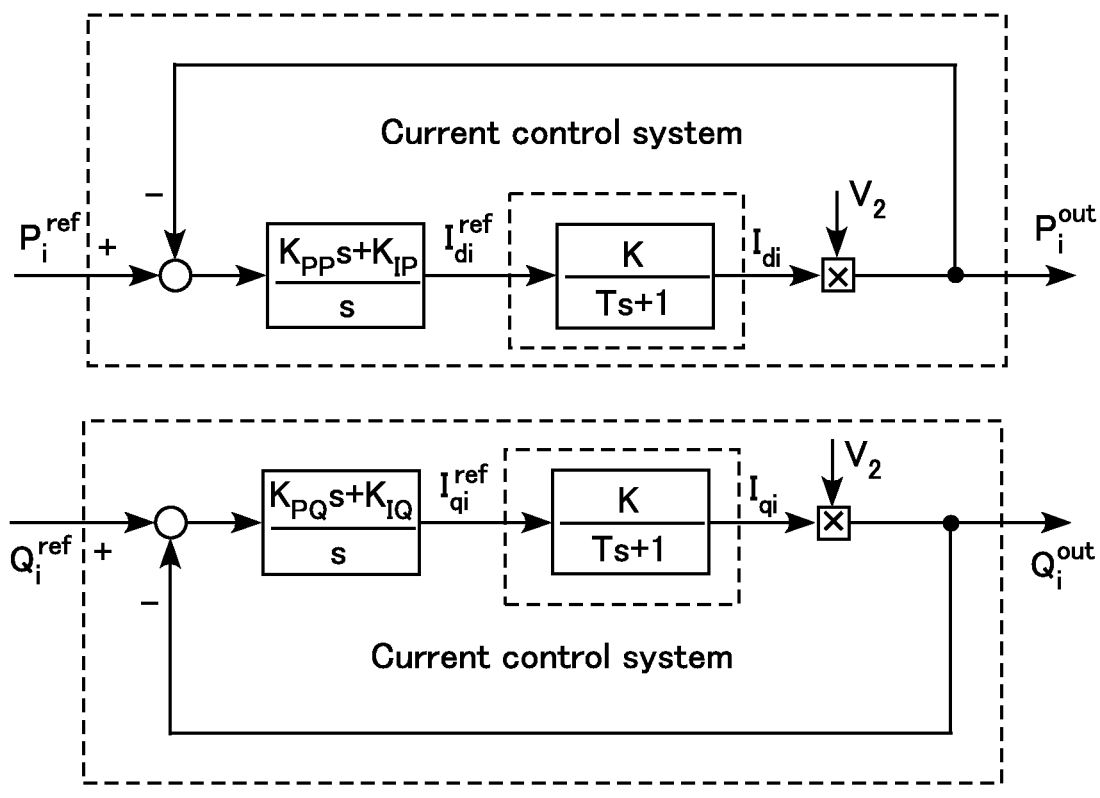
FIG. 3 shows a model of a power conditioner assumed in a simulation.
Figure 4:
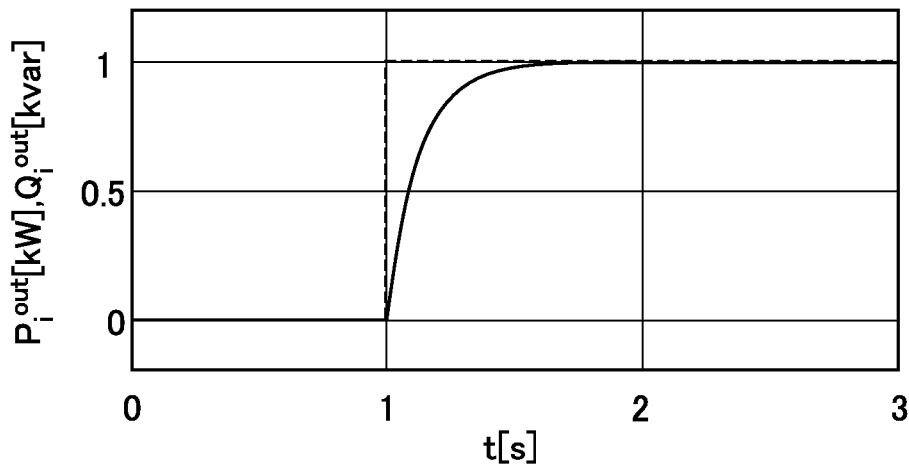
FIG. 4 shows a step response of a power control system of the power conditioner assumed in the simulation.

It is assumed that each of the power conditioners $PCS_i$ is of the model shown in FIG. 3 and performs PI control to regulate the individual output power $P_i^{out}$ to the individual target power $P_i^{ref}$. The current control system of the power conditioner $PCS_i$ is designed to respond much faster than an active/reactive power control system. In the present embodiment, an appropriate control system design is made in advance, and the system is realized by a first-order lag system with K=1, and T=10$^{-4}$. A power control system, which is an upper control system of the current control system, uses a time constant with which a step response converges within 1 second, and is set such that $K_{PP}=K_{PQ}=1.0×10^{-7}$, and $K_{IP}=K_{IQ}=1.2×10^{-3}$. Note that $K_{PP}$ denotes the proportional gain of active power, $K_{PQ}$ denotes the proportional gain of reactive power, $K_{IP}$ denotes the integral gain of active power, and $K_{IQ}$ denotes the integral gain of reactive power. FIG. 4 shows a step response of the active/reactive power control system.

FIGS. 5 to 11 show results when a simulation was conducted under multiple conditions with the photovoltaic power generation system PVS1 of the aforementioned model. Note that each of the power conditioners $PCS_i$ suppresses the power generation amount $P_i^{SP}$ of the corresponding solar cell $SP_i$ connected thereto to the rated output $P_i^{lmt}$ of the power conditioner $PCS_i$, when the power generation amount $P_i^{SP}$ is larger than the rated output $P_i^{lmt}$.

Figure 5:
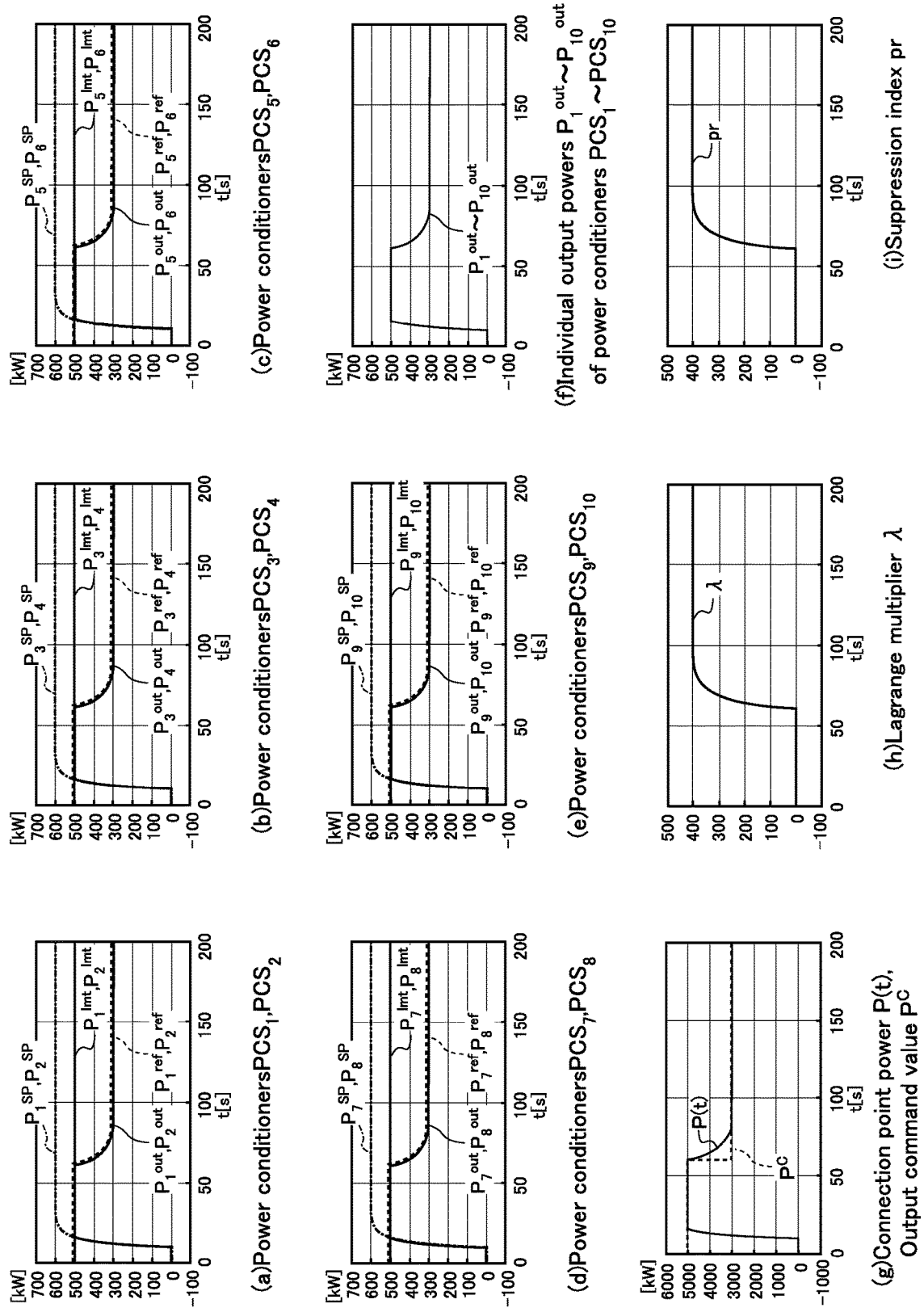
FIG. 5 shows a verification result (case 1) in the simulation according to the first embodiment.

In case 1, a simulation was conducted when 10 power conditioners $PCS_1$ to $PCS_{10}$ were under the same condition. The simulation is referred to as simulation 1-1. In simulation 1-1, all of the 10 power conditioners $PCS_1$ to $PCS_{10}$ had a rated output $P_i^{lmt}$ of 500 kW, the weight $w_i$ for active power suppression was set to 1.0, and the power generation amount $P_i^{SP}$ of each the solar cells $SP_i$ was set to 600 kW. Also, the output command value $P^C$ from the power company was set to indicate no command when 0≤t≤60 [s], and to indicate 3000 kW when 60≤t [s]. When "the output command value $P^C$ indicates no command", a numerical value of −1, which indicates no command, was used as the output command value $P^C$, as described above. Furthermore, the gradient coefficient ε was set to 0.025, the sampling time of the update of the suppression index pr performed by the central management device MC1 was set to 1 s, and the sampling time of the update of the individual target power $P_i^{ref}$ performed by each of the power conditioners $PCS_i$ was also set to 1 s. Also, all of the power conditioners $PCS_i$ was assumed to operate at a power factor of 1 (reactive power target value=0 kvar). FIG. 5 shows the results of simulation 1-1.

In (a) to (e) in FIG. 5, the power generation amount $P_i^{SP}$ of the solar cell $SP_i$ (chain line), the rated output $P_i^{lmt}$ (solid line), the individual target power $P_i^{ref}$ (broken line), and the individual output power $P_i^{out}$ (solid line) are indicated for each of the power conditioners $PCS_i$. In FIG. 5, (a) relates to the power conditioners $PCS_1$ and $PCS_2$, (b) to the power conditioners $PCS_3$ and $PCS_4$, (c) to the power conditioners $PCS_5$ and $PCS_6$, (d) to the power conditioners $PCS_7$ and $PCS_8$, and (e) to the power conditioners $PCS_9$ and $PCS_{10}$. In (a) to (e) in FIG. 5, the individual target power $P_i^{ref}$ (broken line) is plotted as slightly shifting upward to facilitate understanding. In FIG. 5, (f) shows the individual output powers $P_1^{out}$ to $P_{10}^{out}$ of the $PCS_1$ to $PCS_{10}$ in a single graph. In FIG. 5, (g) shows the connection point power $P(t)$ (solid line) and the output command value $P^C$ from the power company (broken line). Note that in (g) in FIG. 5, when the output command value $P^C$ indicates no command, the sum of the rated outputs $P_1^{lmt}$ to $P_{10}^{lmt}$ of the power conditioners $PCS_1$ to $PCS_{10}$ is plotted as the output command value $P^C$ to facilitate understanding. In FIG. 5, (h) shows the Lagrange multiplier λ calculated by the index calculator 23. In FIG. 5, (i) shows the suppression index pr calculated by the index calculator 23.

The following points can be confirmed from FIG. 5. That is, as shown in (a) to (e) in FIG. 5, during the period from the start of the simulation to the issuance of the output suppression command (0≤t≤60 [s]), the individual output powers $P_1^{out}$ to $P_{10}^{out}$ of the power conditioners $PCS_1$ to $PCS_{10}$ rise according to the power generation amounts $P_1^{SP}$ to $P_{10}^{SP}$ of the solar cells $SP_i$ until the individual output powers $P_1^{out}$ to $P_{10}^{out}$ reach the individual target powers $P_1^{ref}$ to $P_{10}^{ref}$ that are each 500 kW. After reaching the individual target powers $P_1^{ref}$ to $P_{10}^{ref}$ of 500 kW, the individual output powers $P_1^{out}$ to $P_{10}^{out}$ are regulated to the individual target powers $P_1^{ref}$ to $P_{10}^{ref}$ of 500 kW. After the issuance of the output command value $P^C$ (60≤t [s]), the Lagrange multiplier λ and the suppression index pr are updated, as shown in (h) to (i) in FIG. 5. Based on the update of the suppression index pr, the power conditioners $PCS_1$ to $PCS_{10}$ change the individual target powers $P_1^{ref}$ to $P_{10}^{ref}$, as shown in (a) to (e) in FIG. 5. Accordingly, it can be confirmed that the individual output powers $P_1^{out}$ to $P_{10}^{out}$ are suppressed to follow the individual target powers $P_1^{ref}$ to $P_{10}^{ref}$. As a result, the connection point power P(t) is suppressed to match with the output command value $P^C$ in a steady state, as shown in (g) in FIG. 5.

Figure 6:
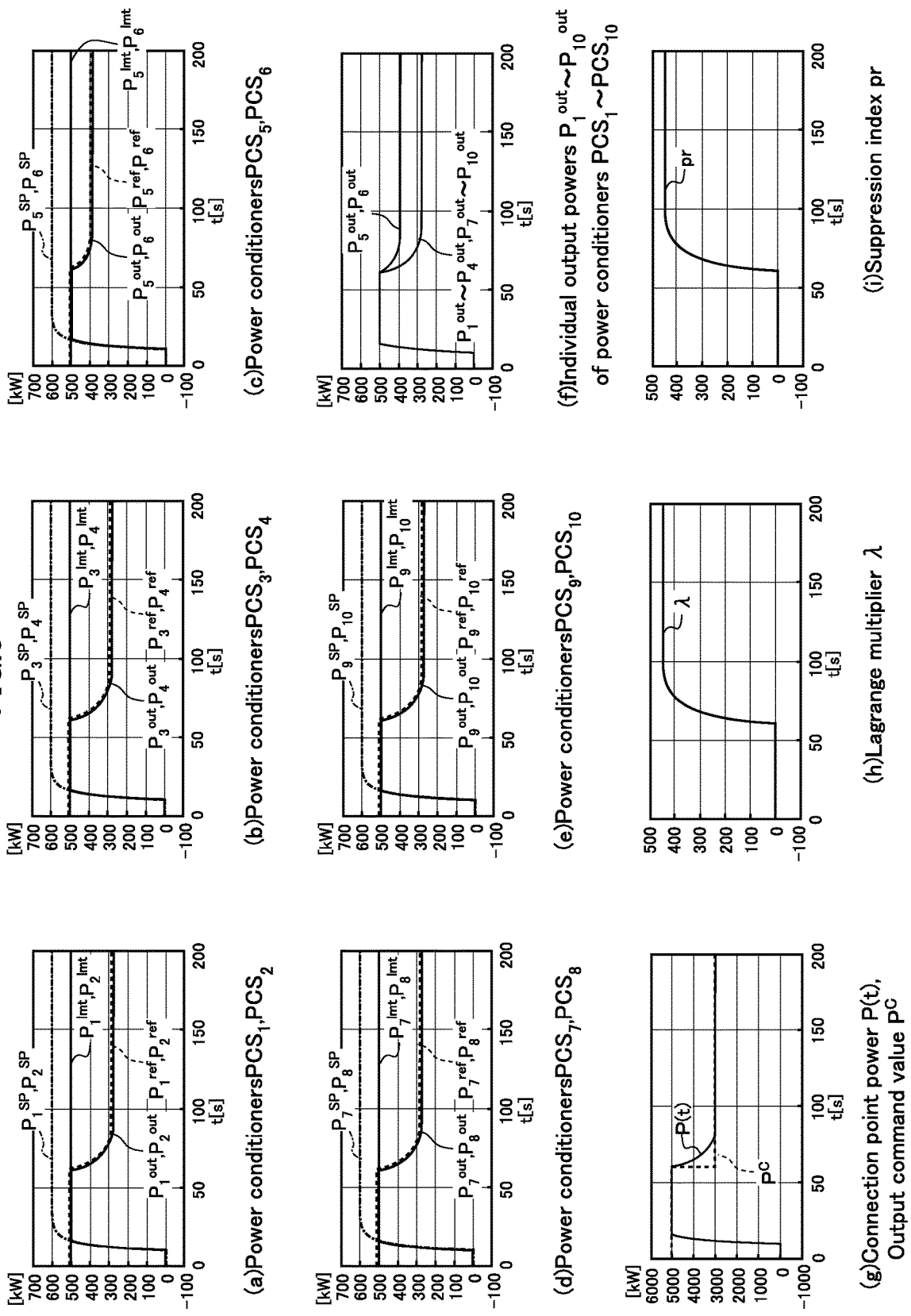
FIG. 6 shows a verification result (case 2) in the simulation according to the first embodiment.

In case 2, a simulation was conducted in which weights $w_5$ and $w_6$ for active power suppression, which were set for two power conditioners $PCS_5$ and $PCS_6$ among 10 power conditioners $PCS_1$ to $PCS_{10}$, were different from weights set for the other power conditioners $PCS_1$ to $PCS_4$, and $PCS_7$ to $PCS_{10}$. The simulation is referred to as simulation 1-2. In simulation 1-2, the weight $w_1$ for the active power suppression of the two power conditioners $PCS_5$ and $PCS_6$ was set to 2.0. The other conditions are the same as those in the above-described simulation 1-1. FIG. 6 shows the results of simulation 1-2. Note that (a) to (i) in FIG. 6 correspond to (a) to (i) in FIG. 5 in the above-described simulation 1-1, respectively.

The following points can be confirmed from FIG. 6. That is, as shown in (a) to (e) in FIG. 6, the output suppression amounts of the power conditioners $PCS_5$ and $PCS_6$ in which the weight $w_i$ for active power suppression has been changed are half the output suppression amounts of the other power conditioners $PCS_1$ to $PCS_4$, and $PCS_7$ to $PCS_{10}$. In this case, as shown in (h) and (i) in FIG. 6, the Lagrange multiplier λ and the suppression index pr calculated by the central management device MC1 are also different from those in the above-described simulation 1-1 (see (h) and (i) in FIG. 5). Accordingly, the output suppression amount can be varied by adjusting the weight $w_i$ for active power suppression. Furthermore, as shown in FIG. 6, the output suppression amounts of the other power conditioners $PCS_1$ to $PCS_4$, and $PCS_7$ to $PCS_{10}$ are increased, as compared to the case in simulation 1-1, by the amount equivalent to the reduction in the output suppression amounts of the power conditioners $PCS_5$ and $PCS_6$. In this way, the connection point power P(t) matches with the output command value $P^C$ in a steady state, as shown in (g) in FIG. 6. Accordingly, it can be said that the photovoltaic power generation system PVS1 appropriately operates in consideration of the weight $w_i$ for active power suppression set for each of the power conditioners $PCS_i$.

Figure 7:
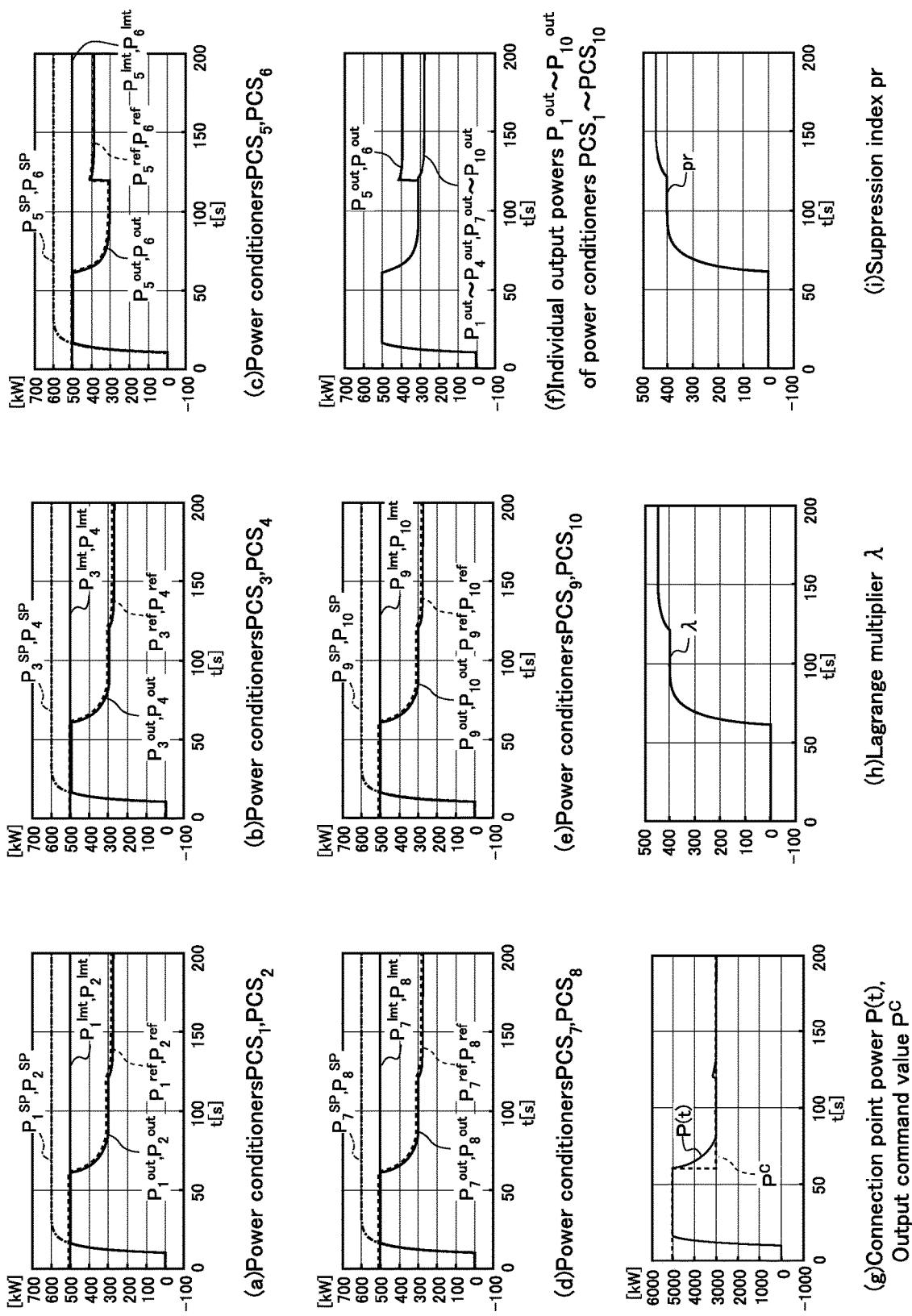
FIG. 7 shows a verification result (case 3) in the simulation according to the first embodiment.

In case 3, a simulation was conducted in which weights $w_5$ and $w_6$ for active power suppression, which were set for two power conditioners $PCS_5$ and $PCS_6$ among 10 power conditioners $PCS_1$ to $PCS_{10}$, were varied in midstream. The simulation is referred to as simulation 1-3. In simulation 1-3, the weights $w_5$ and $w_6$ for the active power suppression of the two power conditioners $PCS_5$ and $PCS_6$ were set to $w_5=w_6=1.0$ at the start point (0 s) and changed to $w_5=w_6=2.0$ after 120 s. That is, when 60≤t<120 [s], the weights $w_1$ to $w_{10}$ for the active power suppression of the power conditioners $PCS_1$ to $PCS_{10}$ were all 1.0 as seen in the above-described simulation 1-1, but when 120≤t [s], the weights $w_5$ and $w_6$ for the active power suppression of the power conditioners $PCS_5$ and $PCS_6$ were changed to 2.0 as seen in the above-described simulation 1-2. The other conditions are the same as those in the above-described simulation 1-1. FIG. 7 shows the results of simulation 1-3. Note that (a) to (i) in FIG. 7 correspond to (a) to (i) in FIG. 5 in the above-described simulation 1-1, respectively.

The following points can be confirmed from FIG. 7. That is, before the weights $w_5$ and $w_6$ for the active power suppression of the power conditioners $PCS_5$ and $PCS_6$ were changed to 2.0 (60≤t<120 [s]), the results were the same as in the above-described simulation 1-1, and after the weights $w_5$ and $w_6$ for the active power suppression of the power conditioners $PCS_5$ and $PCS_6$ were changed to 2.0 (120≤t [s]), the results were the same as in the above-described simulation 1-2. Accordingly, even when the weight $w_i$ for active power suppression is adjusted (changed) in midstream as described above, the connection point power P(t) can still be matched with the output command value $P^C$.

Figure 8:
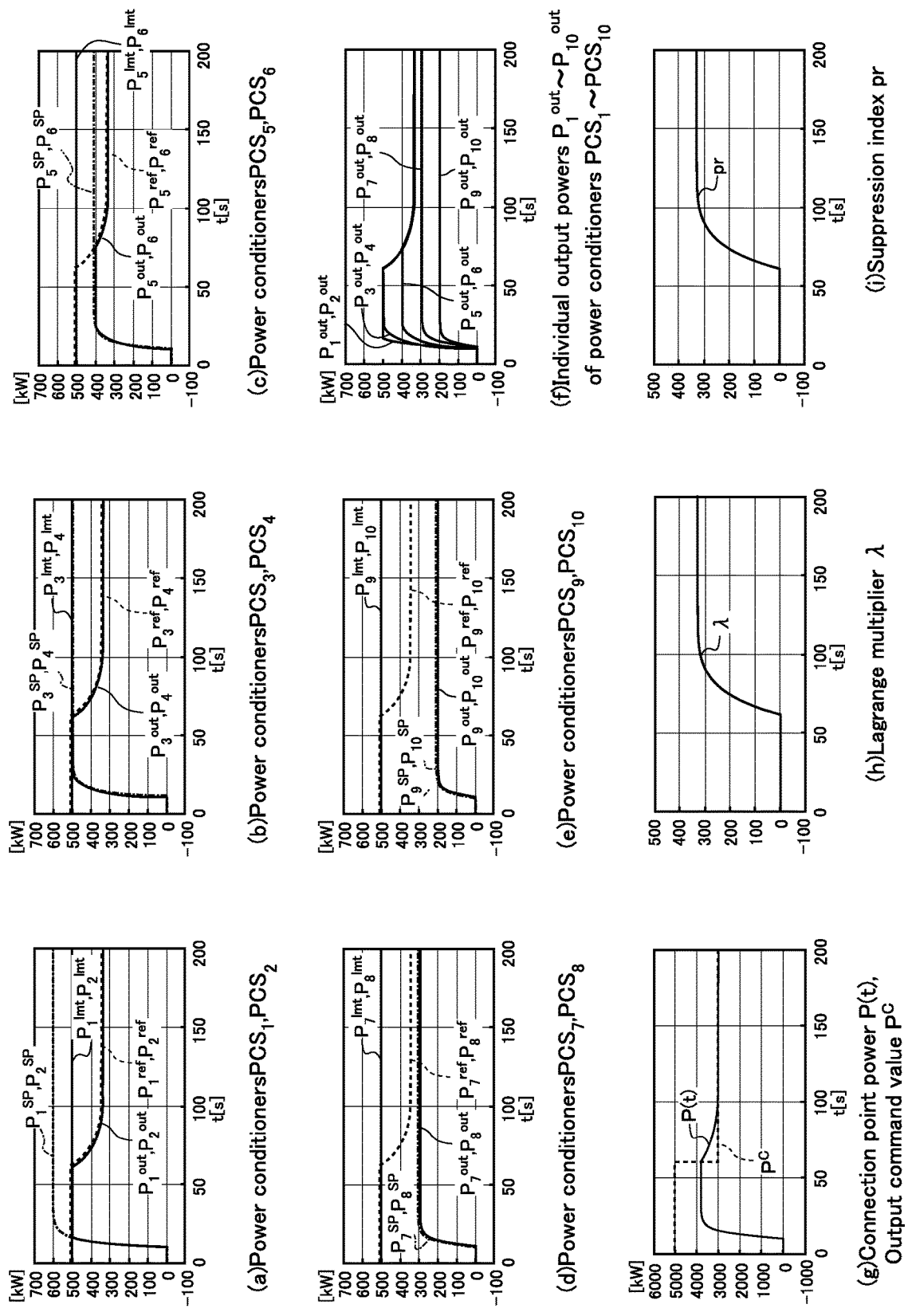
FIG. 8 shows a verification result (case 4) in the simulation according to the first embodiment.

In case 4, a simulation was conducted in which the power generation amount $P_i^{SP}$ of the solar cell $SP_i$ is different for every two power conditioners ($PCS_1$ and $PCS_2$, $PCS_3$ and $PCS_4$, $PCS_5$ and $PCS_6$, $PCS_7$ and $PCS_8$, and $PCS_9$ and $PCS_{10}$). The simulation is referred to as simulation 1-4. In simulation 1-4, the power generation amount $P_i^{SP}$ of the solar cell $SP_i$ for every two power conditioners ($PCS_1$ and $PCS_2$, $PCS_3$ and $PCS_4$, $PCS_5$ and $PCS_8$, $PCS_7$ and $PCS_8$, and $PCS_9$ and $PCS_{10}$) was set such that $P_1^{SP}$, $P_2^{SP}=600$ kW, $P_3^{SP}$, $P_4^{SP}=500$ kW, $P_6^{SP}$, $P_6^{SP}=400$ kW, $P_7^{SP}$, $P_8^{SP}=300$ kW, and $P_9^{SP}$, $P_{10}^{SP}=200$ kW. The other conditions are the same as those in the above-described simulation 1-1. FIG. 8 shows the results of simulation 1-4. Note that (a) to (i) in FIG. 8 correspond to (a) to (i) FIG. 5 in the above-described simulation 1-1, respectively.

The following points can be confirmed from FIG. 8. That is, as shown in (a) to (e) in FIG. 8, output suppression is not performed when the individual target power $P_i^{ref}$ is no less than the power generation amount $P_i^{SP}$ of the solar cell $SP_i$. Also, as shown in (f) in FIG. 8, when the power generation amounts $P_i^{SP}$ of the solar cells $SP_i$ are different among the power conditioners $PCS_1$ to $PCS_{10}$ having the same rated output $P_i^{lmt}$, the power conditioners $PCS_7$ to $PCS_{10}$ corresponding to the solar cells $SP_i$ having smaller power generation amounts $P_i^{SP}$ do not perform output suppression. Furthermore, as shown in (g) in FIG. 8, the connection point power P(t) is suppressed to match with the output command value $P^C$ in a steady state. Accordingly, it can be said that the photovoltaic power generation system PVS1 appropriately operates in consideration of the power generation amounts $P_i^{SP}$ of the solar cells $SP_i$.

Figure 9:
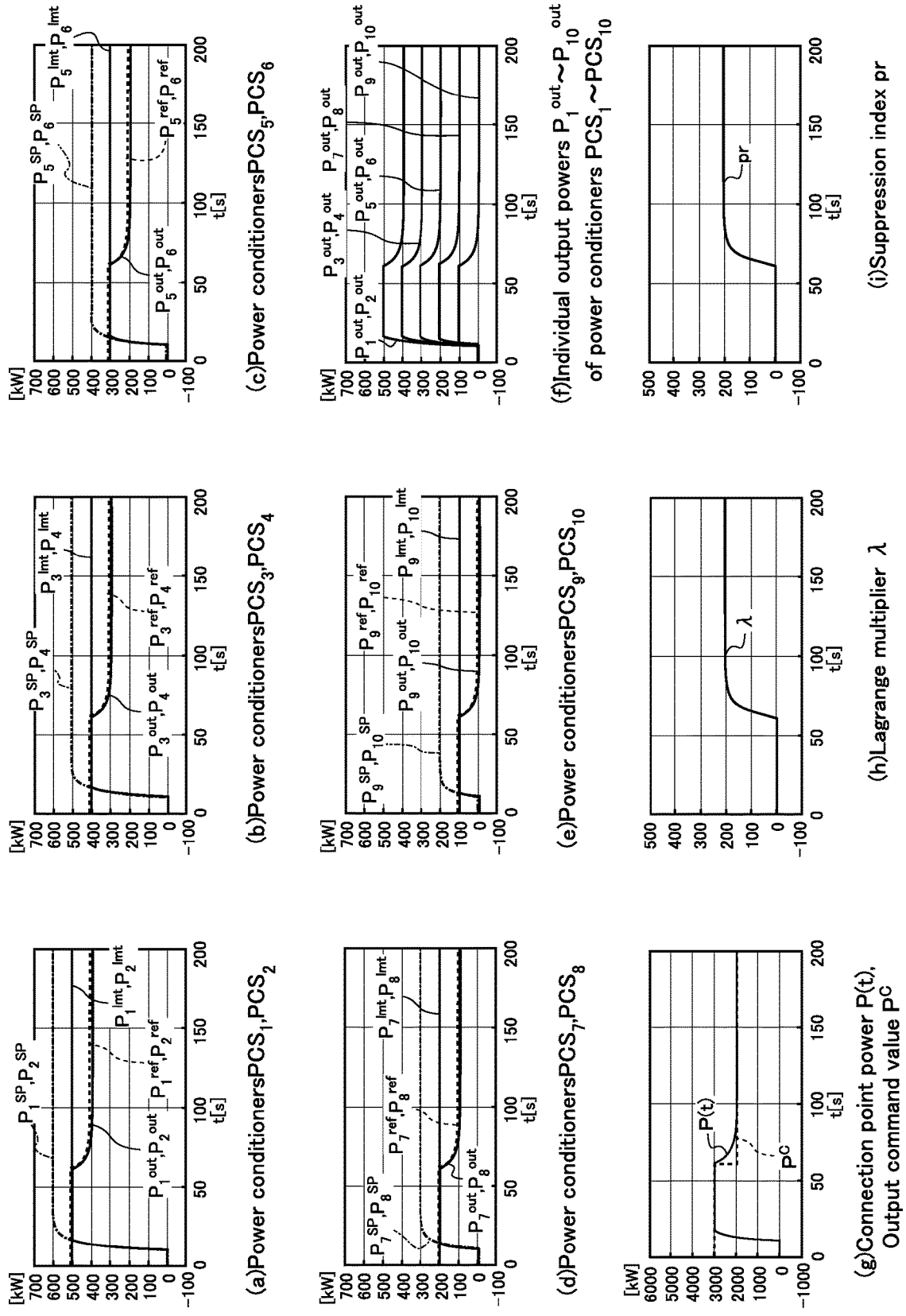
FIG. 9 shows a verification result (case 5) in the simulation according to the first embodiment.

In case 5, a simulation was conducted in which the rated output $P_i^{lmt}$ is different for every two power conditioners ($PCS_1$ and $PCS_2$, $PCS_3$ and $PCS_4$, $PCS_5$ and $PCS_6$, $PCS_7$ and $PCS_8$, and $PCS_9$ and $PCS_{10}$). The simulation is referred to as simulation 1-5. In simulation 1-5, the rated output $P_i^{lmt}$ for every two power conditioners ($PCS_1$ and $PCS_2$, $PCS_3$ and $PCS_4$, $PCS_5$ and $PCS_5$, $PCS_7$ and $PCS_3$, and $PCS_9$ and $PCS_{10}$) was set such that $P_1^{lmt}$, $p_2^{lmt}=500$ kW, $P_3^{lmt}$, $P_4^{lmt}=400$ kW, $P_5^{lmt}$, $P_6^{lmt}=300$ kW, $P_7^{lmt}$, $P_8^{lmt}=200$ kW, and $P_9^{lmt}$, $P_{10}^{lmt}=100$ kW. Also, the output command value $P^C$ from the power company was set to indicate no command when 0≤t<60 [s], and to indicate 2000 kW when 60≤t [s]. Each of the power generation amounts $P_i^{SP}$ of the solar cells $SP_i$ was set to the rated output $P_i^{lmt}+100$ kW. The other conditions are the same as those in the above-described simulation 1-1. FIG. 9 shows the results of simulation 1-5. Note that (a) to (i) in FIG. 9 correspond to (a) to (i) in FIG. 5 in the above-described simulation 1-1, respectively.

The following points can be confirmed from FIG. 9. That is, when the rated outputs $P_i^{lmt}$ are different as shown in (f) in FIG. 9, the output suppression amounts of the power conditioners $PCS_1$ to $PCS_{10}$ are the same. Furthermore, as shown in (g) in FIG. 9, the connection point power P(t) is suppressed to match with the output command value $P^C$ in a steady state. Accordingly, it can be said that the photovoltaic power generation system PVS1 appropriately operates in consideration of the rated outputs $P_i^{Imt}$ of the power conditioners $PCS_i$.

Figure 10:
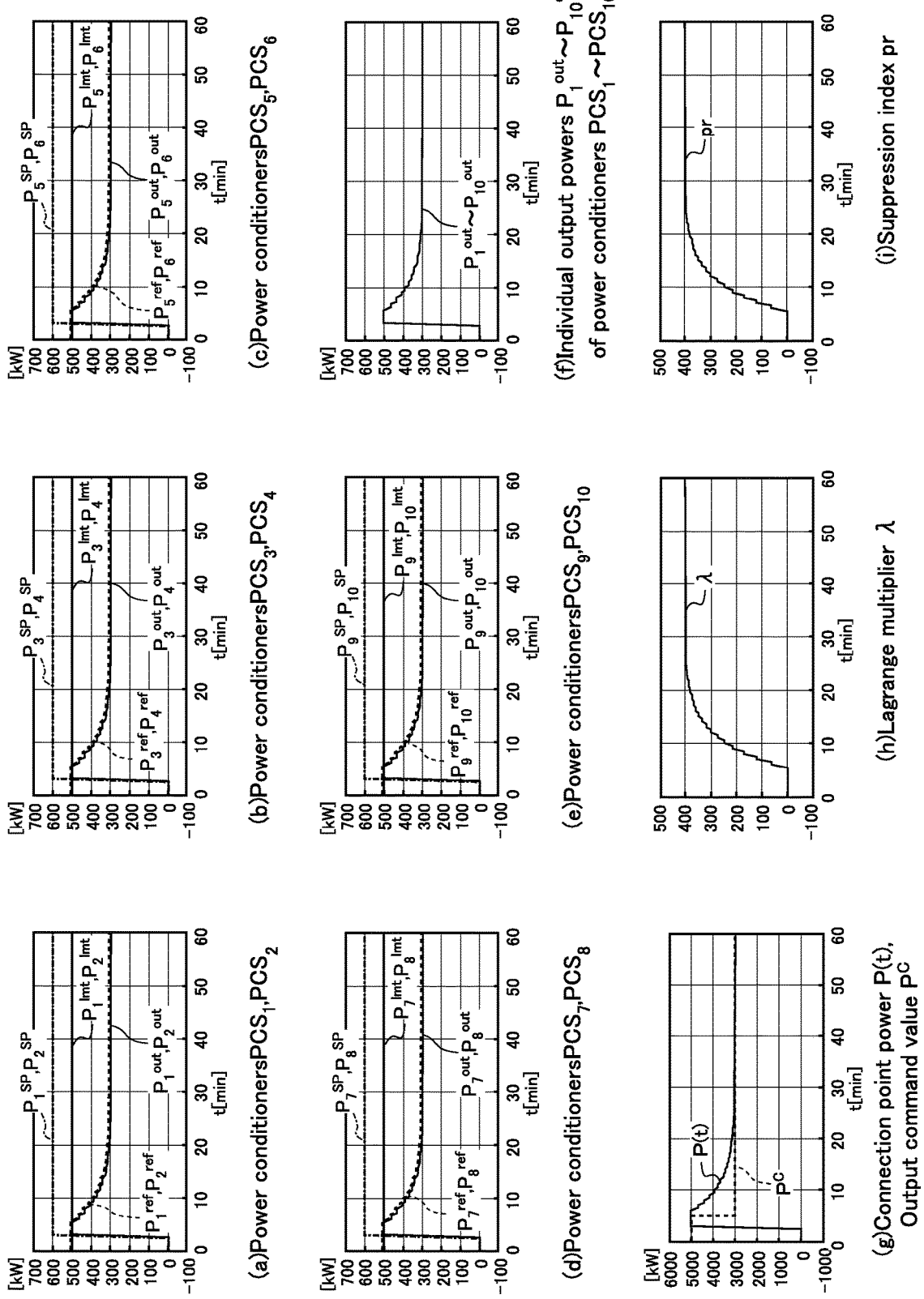
FIG. 10 shows a verification result (case 6) in the simulation according to the first embodiment.

In case 6, a simulation was conducted in which the above-described sampling time was lengthened. The simulation is referred to as simulation 1-6. In simulation 1-6, the sampling time was set such that 60 s=1 min. Also, the gradient coefficient s was set to 0.0005, and the output command value $P^C$ from the power company was set to indicate no command when 0≤t<5 [min], and to indicate 3000 kW when 5≤t [min]. The other conditions are the same as those in the above-described simulation 1-1. FIG. 10 shows the results of simulation 1-6. Note that (a) to (i) in FIG. 10 correspond to (a) to (i) in FIG. 5 in the above-described simulation 1-1, respectively.

The following points can be confirmed from FIG. 10. That is, as shown in (g) in FIG. 10, when the sampling time is lengthened, the time that it takes for the connection point power P(t) to follow the output command value $P^C$ is longer than in the above-described simulation 1-1, but the connection point power P(t) is suppressed to match with the output command value $P^C$ in a steady state.

Figure 11:
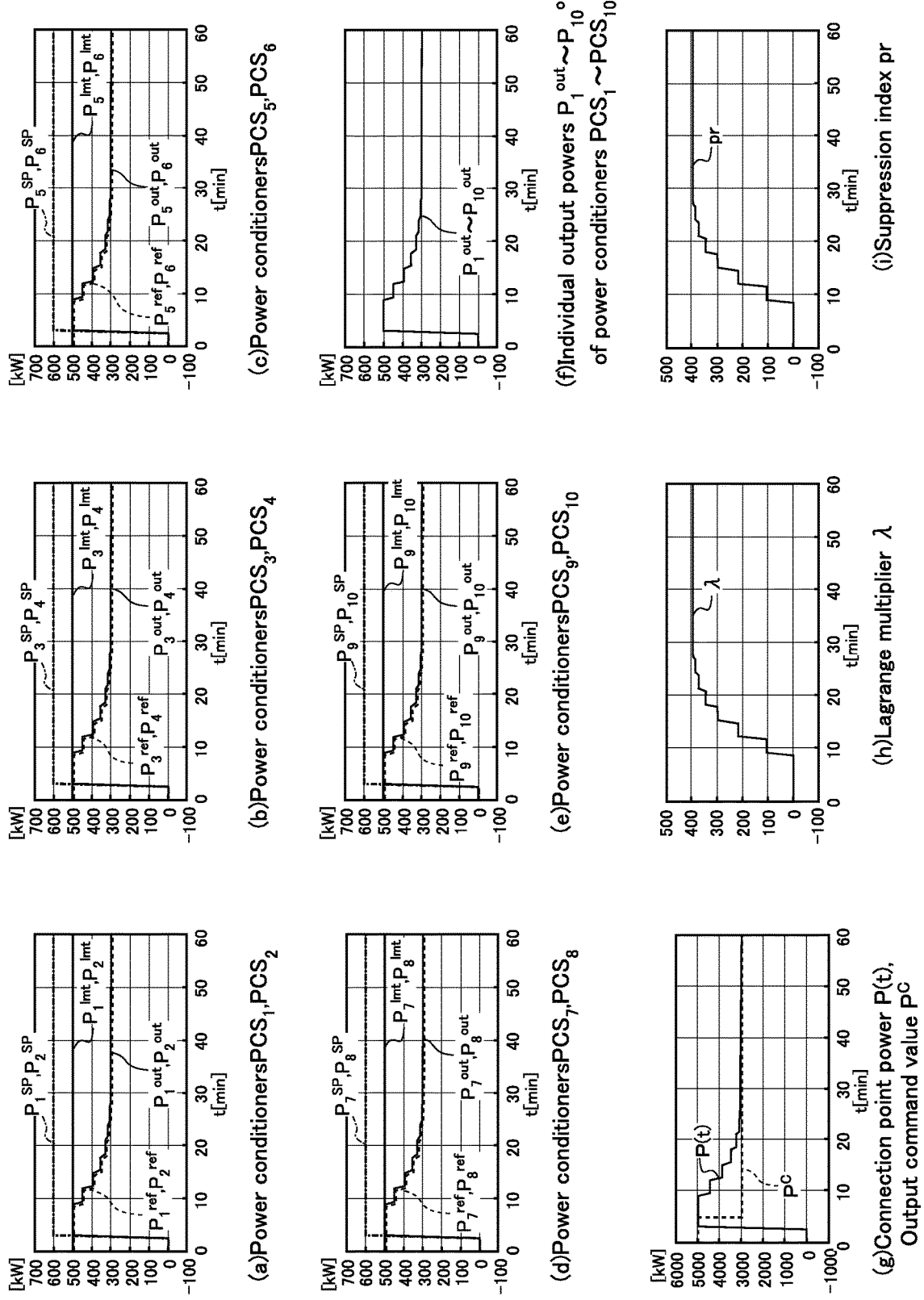
FIG. 11 shows a verification result (case 7) in the simulation according to the first embodiment.

In case 7, a simulation was conducted in which the above-described sampling time was further lengthened as compared to the sampling time in case 6. The simulation is referred to as simulation 1-7. In simulation 1-7, the sampling time was set such that 180 s=3 min. Also, the gradient coefficient s was set to 0.0003, and the output command value $P^C$ from the power company was set to indicate no command when 0≤t<5 [min], and to indicate 3000 kW when 5≤t [min]. The other conditions are the same as those in the above simulation 1-1. FIG. 11 shows the results of simulation 1-7. Note that (a) to (i) in FIG. 11 correspond to (a) to (i) in FIG. 5 in the above simulation 1-1, respectively.

The following points can be confirmed from FIG. 11. That is, as shown in (g) in FIG. 11, even when the sampling time is longer than in the above-described simulation 1-6, the connection point power P(t) is suppressed to match with the output command value $P^C$ in a steady state.

The following points can be confirmed from the respective results shown in FIGS. 5 to 11 and by comparison of FIGS. 5 to 11. That is, as shown in (h) and (i) in each of the figures, different values are calculated as the Lagrange multiplier λ and the suppression index pr, based on the power generation amounts $P_i^{SP}$ of the solar cells $SP_i$, the rated outputs $P_i^{Imt}$, and the weights $w_i$ for active power suppression of the power conditioners $PCS_1$ to $PCS_{10}$, the output command value $P^C$, and so on. Also, as shown in (a) to (e) in each figure, the individual target powers $P_i^{ref}$ are updated according to the update of the suppression index pr. Each of the power conditioners $PCS_1$ to $PCS_{10}$ controls the individual output power $P_i^{out}$ according to the individual target power $P_i^{ref}$. Accordingly, as shown in (g) of each figure, the connection point power P(t) is matched with the output command value $P^C$. Based on the above, it can be said that the suppression index pr calculated by the central management device MC1 with the above formulas (9) and (10) is an appropriate value.

According to the results of the above simulations 1-1 to 1-7, each of the power conditioners PCS in the photovoltaic power generation system PVS1 dispersively calculates the individual target power $P_i^{ref}$, based on the suppression index pr received from the central management device MC1. Accordingly, the above-described objective 1-1 is achieved. Also, the connection point power P(t) is suppressed to match with the output command value $P^C$. Accordingly, the above-described objective 1-2 is achieved. Also, depending on the various conditions, the individual output power $P_i^{out}$ is varied for each power conditioner $PCS_i$. That is, depending on the various conditions, the output suppression amount is varied for each power conditioner $PCS_i$. Accordingly, the above-described objective 1-3 is achieved. From the above, it can be understood that the photovoltaic power generation system PVS1 achieves the three objectives described above.

As described above, in the photovoltaic power generation system PVS1 according to the first embodiment, the central management device MC1 calculates the suppression index pr from the output command value $P^C$ from the power company and the detected connection point power P(t) with use of the above formulas (9) and (10), and transmits the calculated suppression index pr to each of the power conditioners $PCS_i$. Each of the power conditioners PCS calculates the individual target power $P_i^{ref}$ by dispersively solving the optimization problem shown by the above formula (8) based on the suppression index pr, and regulates the individual output power $P_i^{out}$ to the individual target power $P_i^{ref}$. In this way, the central management device MC1 only needs to perform simple calculations shown in the above formulas (9) and (10). As a result, in the photovoltaic power generation system PVS1, the processing load on the central management device MC1 can be reduced. Also, even in the case where each of the power conditioners $PCS_i$ dispersively calculates the individual target power $P_i^{ref}$, and controls the individual output power $P_i^{out}$, the connection point power P(t) can be matched with the output command value $P^C$ from the power company.

According to the first embodiment, the photovoltaic power generation system PVS1 includes the plurality of power conditioners PCS, connected to the solar cells $SP_i$. In the photovoltaic power generation system PVS1 having such a structure, however, its output is largely affected by weather changes. In order to suppress output variations caused by weather changes or the like, a photovoltaic power generation system can be provided that includes power conditioners connected to solar cells and power conditioners connected to storage cells. This case will be described below as a second embodiment.

Figure 12:
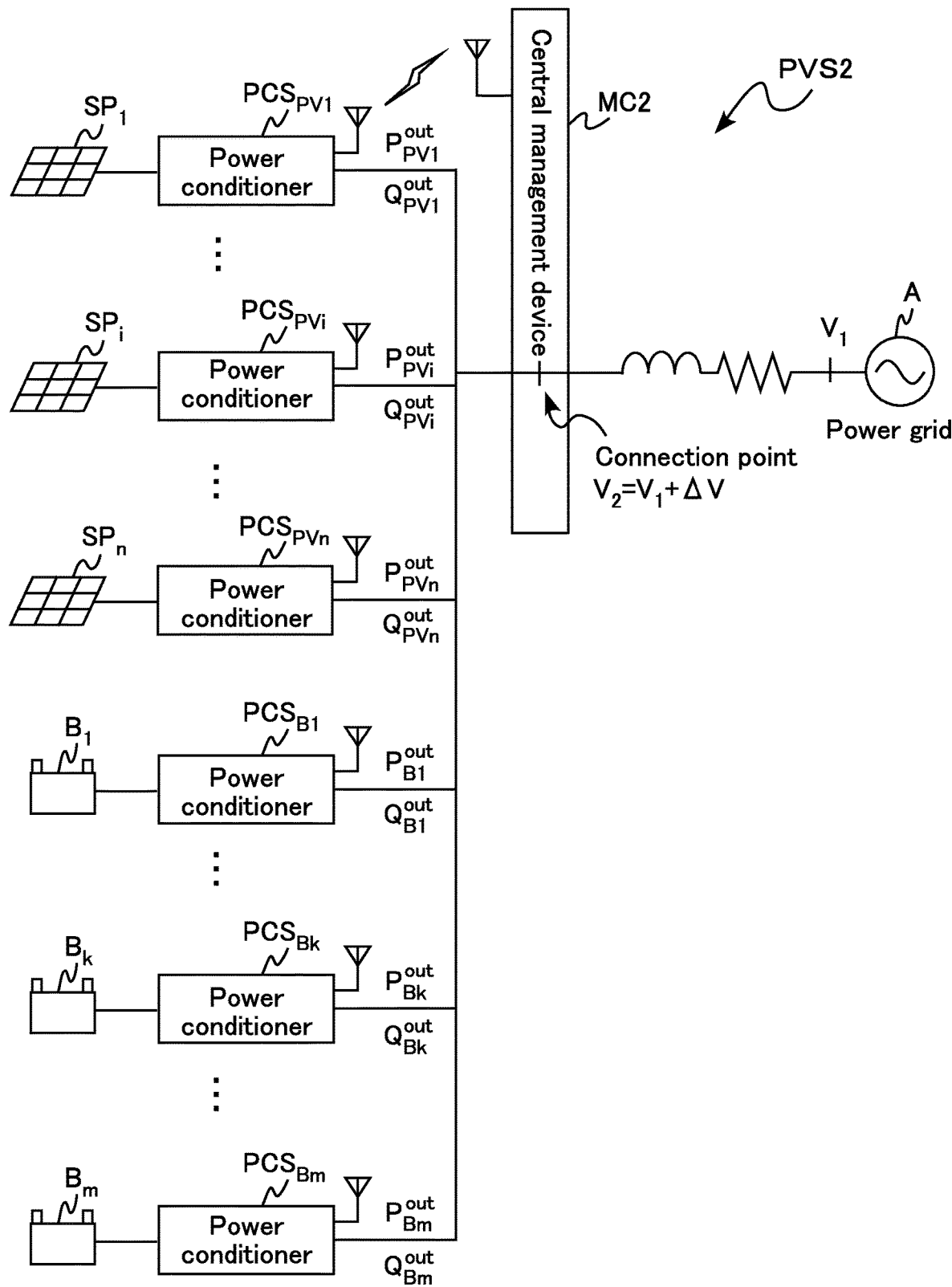
FIG. 12 shows the overall structure of a photovoltaic power generation system according to a second embodiment.
Figure 13:
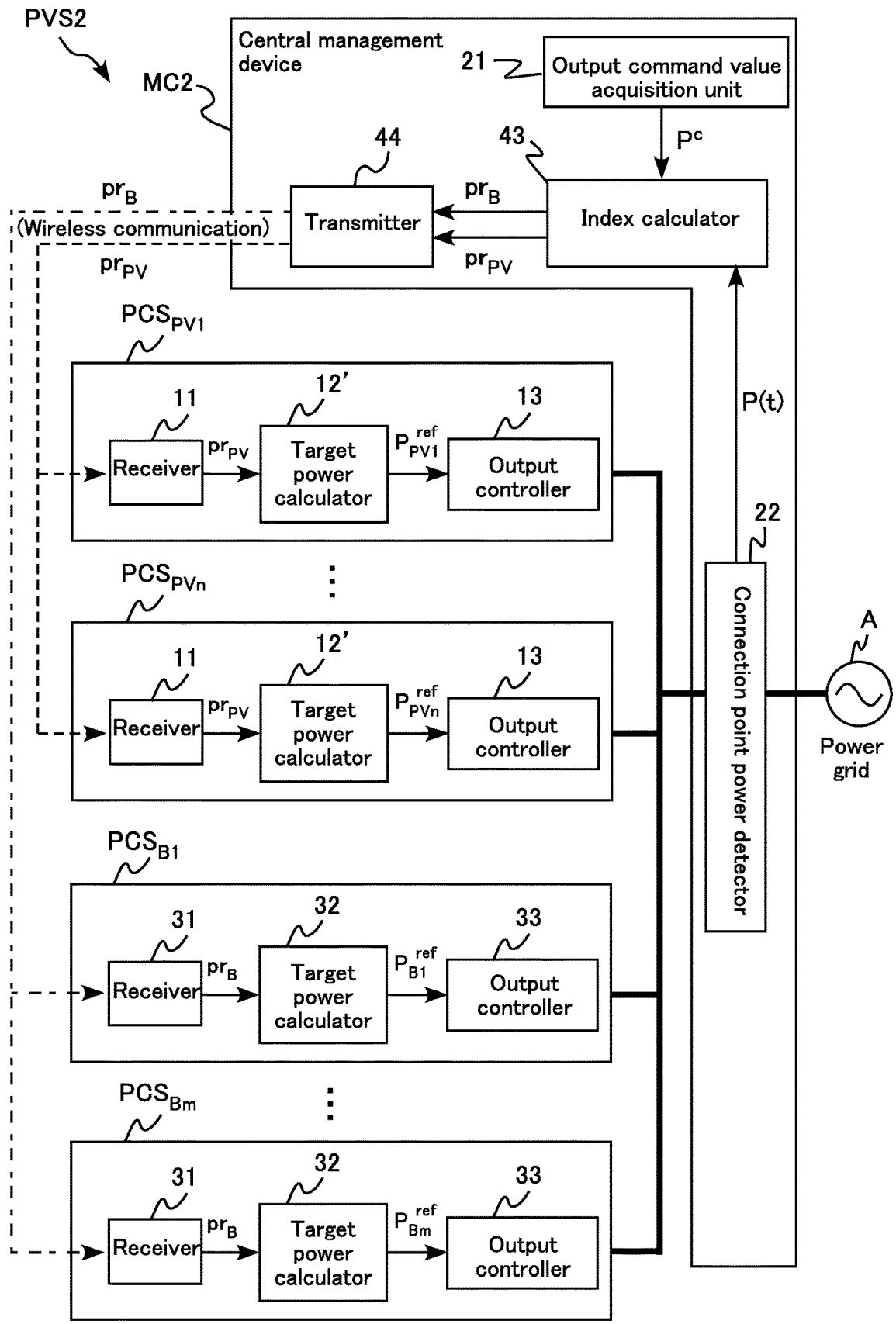
FIG. 13 shows the functional structure for a connection point power suppression control of the photovoltaic power generation system according to the second embodiment.

FIGS. 12 and 13 show a photovoltaic power generation system PVS2 according to a second embodiment. FIG. 12 shows the overall structure of the photovoltaic power generation system PVS2. FIG. 13 shows the functional structure of a control system in the photovoltaic power generation system PVS2 in FIG. 12, where the control system controls power at a connection point with a power grid A. Note that elements that are the same as or similar to those in the first embodiment are provided with the same reference signs and descriptions thereof will be omitted.

As shown in FIG. 12, the photovoltaic power generation system PVS2 includes a plurality of solar cells $SP_i$ (i=1, 2, . . . , n; n being a positive integer), a plurality of power conditioners $PCS_{PVi}$, a plurality of storage cells $B_k$ (k=1, 2, . . . , m; m being a positive integer), a plurality of power conditioners $PCS_{Bk}$, and a central management device MC2. The photovoltaic power generation system PVS2 is an interconnected reverse power flow system.

The plurality of power conditioners $PCS_{PVi}$ have the same structures as the power conditioners PCS in the first embodiment. That is, each of the power conditioners $PCS_{PVi}$ converts the power (DC power) generated by the corresponding solar cell $SP_i$ to AC power, and outputs the AC power to the power grid A.

The plurality of storage cells $B_k$ can store power by charging repeatedly. The storage cells $B_k$ are secondary batteries, such as lithium ion batteries, nickel hydrogen batteries, nickel cadmium battery, lead storage cells or the like. It is also possible to use capacitors such as electric double layer capacitors. The storage cells $B_k$ discharge accumulated power and supply DC power to the power conditioners $PCS_{Bk}$.

The plurality of power conditioners $PCS_{Bk}$ convert the DC power input from the storage cells $B_k$ to AC power and output the AC power. Furthermore, the power conditioners $PCS_{Bk}$ convert the AC power input from the power grid A or the power conditioners $PCS_{PVi}$ to DC power, and supply the DC power to the storage cells $B_k$. In other words, the power conditioners $PCS_{Bk}$ charge the storage cells $B_k$. The power conditioners $PCS_{Bk}$ control charging and discharging of the storage cells $B_k$. Accordingly, the power conditioners $PCS_{Bk}$ function as charging circuits for charging the storage cells $B_k$ and also as discharging circuits for discharging the storage cells $B_k$.

Letting the active power output from each of the power conditioners $PCS_{PVi}$ be $P_{PVi}^{out}$, and the reactive power output therefrom be $Q_{PVi}^{out}$, then the complex power of $P_{PVi}^{out}+jQ_{PVi}^{out}$ is output from each of the power conditioners $PCS_{PVi}$. Also, letting the active power output from each of the power conditioners $PCS_{Bk}$ be $P_{Bk}^{out}$, and the reactive power output therefrom be $Q_{Bk}^{out}$, then the complex power of $P_{Bk}^{out}+jQ_{Bk}^{out}$ is output from each of the power conditioners $PCS_{Bk}$. Accordingly, the complex power of $(\Sigma_i P_{PVi}^{out}+\Sigma_k P_{Bk}^{out})+j(\Sigma_i Q_{PVi}^{out}+\Sigma_k Q_{Bk}^{out})$ is output at the connection point of the plurality of power conditioners $PCS_{PVi}$, $PCS_{Bk}$ and the power grid A. In other words, the power at the connection point is the sum of the output power of each of the power conditioners $PCS_{PVi}$, and $PCS_{Bk}$. Even in the present embodiment, consideration is not particularly given to the output control of the reactive powers $Q_{PVi}^{out}$ and $Q_{Bk}^{out}$, which are mainly used to suppress voltage variations at the connection point. In other words, the connection point power is the sum $(\Sigma_i P_{PVi}^{out}+\Sigma_k P_{Bk}^{out})$ of the active powers $P_{PVi}^{out}$ and $P_{Bk}^{out}$ at the connection point.

In the present embodiment, the photovoltaic power generation system PVS2 receives a command, from the power company, indicating that the connection point power P(t) should not exceed a predetermined value. The photovoltaic power generation system PVS2 controls the connection point power P(t) according to the command. Specifically, the output suppression command from the power company to the photovoltaic power generation system PVS2 indicates an output command value $P^C$ which is described above. The photovoltaic power generation system PVS2 controls the individual output powers $P_{PVi}^{out}$ and $P_{Bk}^{out}$ of the power conditioners $PCS_{PVi}$ and $PCS_{Bk}$, so that the connection point power P(t) indicates an output command value $P^C$ specified by the power company. Accordingly, the connection point power P(t) is regarded as the regulation subject power, and the output command value $P^C$ is regarded as the target value of the connection point power P(t). When the connection point power P(t) is greater than the output command value $P^C$, the photovoltaic power generation system PVS2 suppresses the individual output powers $P_{PVi}^{out}$ and $P_{Bk}^{out}$ of the power conditioners $PCS_{PVi}$ and $PCS_{Bk}$. Accordingly, the photovoltaic power generation system PVS2 also performs the connection point power suppression control.

During the connection point power suppression control, each of the power conditioners $PCS_{PVi}$ receives a suppression index $pr_{pv}$ from the central management device MC2, and calculates individual target power $P_{PVi}^{ref}$. The suppression index $pr_{pv}$ is information for regulating the connection point power P(t) to the output command value $P^C$ and for calculating the individual target power $P_{PVi}^{ref}$. Each of the power conditioners $PCS_{PVi}$ controls the individual output power $P_{PV}^{out}$ based on the individual target power $P_{PVi}^{ref}$ thus calculated. In order to do so, each of the power conditioners $PCS_{PVi}$ includes a receiver 11, a target power calculator 12', and an output controller 13.

The target power calculator 12' calculates the individual target power $P_{PVi}^{ref}$ of the power conditioner (power conditioner $PCS_{PVi}$), based on the suppression index $pr_{pv}$, received by the receiver 11. Specifically, the target power calculator 12' calculates the individual target power $P_{PVi}^{ref}$ by solving a constrained optimization problem shown by the following formula (19). As compared to the target power calculator 12 according to the first embodiment, the target power calculator 12' uses a different formula for the optimization problem to calculate the individual target power $P_{PVi}^{ref}$. In formula (19) $w_{PVi}$ is a design value and denotes a weight for the active power suppression of the power conditioner $PCS_{PVi}$. Also, $P_{\varphi i}$ is a design value and denotes a design parameter (hereinafter, "priority parameter") indicating whether to prioritize suppression of the individual output power $P_{PVi}^{out}$ of the power conditioner $PCS_{PVi}$. When the priority parameter $P_{\varphi i}$ is set to be smaller, the charging amount of the storage cell $B_k$ is reduced to facilitate suppression of the individual output power $P_{PVi}^{out}$. On the other hand, when the priority parameter $P_{\varphi i}$ is set to be larger, the charging amount of the storage cell $B_k$ is increased so that suppression of the individual output power $P_{PVi}^{out}$ becomes difficult. Accordingly, the priority parameter $P_{\varphi i}$ can also be regarded as a design parameter indicating whether to prioritize charging of the storage cell $B_k$. Furthermore, with the priority parameter $P_{\varphi i}$, it can be considered that a pseudo output limit is set for the individual output power $P_{PVi}^{out}$ of the power conditioner $PCS_{PVi}$, separately from the output limit by the rated output of the power conditioner $PCS_{PVi}$. Accordingly, the priority parameter $P_{\varphi i}$ can also be regarded as a pseudo active output limit. The weight $w_{PVi}$ and the priority parameter $P_{\varphi i}$ can be set by a user. Details of the following formula (19) are described later.

$$\min_{P_{PVi}^{ref}} \left\{ w_{PVi}\left(P_{PVi}^{ref} - P_{\varphi i}\right)^2 + pr_{PV}\left(P_{PVi}^{ref} - P_{0i}\right) \right\} \quad \Lambda(19a)$$

$$\text{subject to } 0 \leq P_{PVi}^{ref} \leq P_{PVi}^{lmt} \quad \Lambda(19b)$$

$\Lambda(19)$

During the connection point power suppression control, each of the power conditioners $PCS_{Bk}$ receives a charge/discharge index $pr_B$ from the central management device MC2, and calculates an individual target power $P_{Bk}^{ref}$ based on the charge/discharge index $pr_B$. The charge/discharge index $pr_B$ is information for regulating the connection point power P(t) to the output command value $P_c$ and for calculating the individual target power $P_{Bk}^{ref}$. The charge/discharge index $PR_B$ is also information for determining how much the storage cell $B_k$ is to be charged or discharged. Each of the power conditioners $PCS_{Bk}$ controls the individual output power $P_{Bk}^{out}$ based on the individual target power $P_{Bk}^{ref}$. In order to do so, each of the power conditioners $PCS_{Bk}$ includes a receiver 31, a target power calculator 32, and an output controller 33, as shown in FIG. 13.

The receiver 31 is configured similarly to the receiver 11 according to the first embodiment, and receives the charge/discharge index $pr_B$ transmitted from the central management device MC2.

The target power calculator 32 calculates the individual target power $P_{Bk}^{ref}$ of the power conditioner (power conditioner $PCS_{Bk}$), based on the charge/discharge index $pr_B$ received by the receiver 31. Specifically, the target power calculator 32 calculates the individual target power $P_{Bk}^{ref}$ by solving a constrained optimization problem shown by the following formula (20). In formula (20), $P_{Bk}^{lmt}$ denotes the rated output (output limit) of each of the power conditioners $PCS_{Bk}$. $w_{Bk}$ denotes a weight for the active power of the power conditioner $PCS_{Bk}$. The weight $w_{Bk}$ can be set by a user. $\alpha_k$ and $\beta_k$ denote adjustable parameters that are adjustable according to the remaining amount of the storage cell $B_k$. Details of the following formula (20) are described later.

$$\left. \begin{array}{c} \min_{P_{Bk}^{ref}} \{w_{Bk}(P_{Bk}^{ref})^2 + pr_B(P_{Bk}^{ref})\} \quad \Lambda(20a) \\ \text{subject to} \quad -P_{Bk}^{lmt} \leq P_{Bk}^{ref} \leq P_{Bk}^{lmt} \quad \Lambda(20b) \\ \alpha_k \leq P_{Bk}^{ref} \leq \beta_k \quad \Lambda(20c) \end{array} \right\} \quad \Lambda(20)$$

The output controller 33 is configured similarly to the output controller 13 according to the first embodiment. The output controller 33 controls discharging and charging of the storage cell $B_k$ so that the individual output power $P_{Bk}^{out}$ matches with the individual target power $P_{Bk}^{ref}$ calculated by the target power calculator 32. Specifically, when the individual target power $P_{Bk}^{ref}$ calculated by the target power calculator 32 indicates a positive value, the output controller 33 converts the power (DC power) accumulated in the storage cell $B_k$ to AC power, and supplies the AC power to the power grid A. In other words, the power conditioner $PCS_{Bk}$ is functioned as a discharge circuit. On the other hand, when the individual target power $P_{Bk}^{ref}$ indicates a negative value, the output controller 33 converts at least a portion of the AC power output from the power conditioner $PCS_{PVi}$ to DC power, and supplies the DC power to the storage cell $B_k$. In other words, the power conditioner $PCS_{Bk}$ is functioned as a charge circuit.

The central management device MC2 centrally manages the plurality of power conditioners $PCS_{PVi}$ and $PCS_{Bk}$. As shown in FIG. 13, the central management device MC2 is different from the central management device MC1 according to the first embodiment in that the index calculator 23 is replaced with an index calculator 43, and that the transmitter 24 is replaced with a transmitter 44. During the connection point power suppression control, the central management device MC2 calculates the suppression index $pr_{pv}$ and the charge/discharge index $pr_3$ for regulating the connection point power $P(t)$ to an output command value $P^c$, and transmits the suppression index $pr_{pv}$ to the power conditioners $PCS_{PVi}$ and the charge/discharge index $pr_B$ to the power conditioners $PCS_{Bk}$.

The index calculator 43 calculates the suppression index $pr_{PV}$ and the charge/discharge index $pr_B$ for regulating the connection point power $P(t)$ to the output command value $P^C$. The index calculator 43 calculates the suppression index $pr_{pv}$ and the charge/discharge index $pr_B$ based on the following formulas (21) and (22) where $\lambda$ denotes a Lagrange multiplier, $\varepsilon$ denotes a gradient coefficient, and t denotes time. Suppose that the index calculator 43 receives, as the output command value $P^C$ from an output command value acquisition unit 21, a numerical value of −1, which indicates that there is no output suppression command from the power company. In this case, the index calculator 43 sets the Lagrange multiplier $\lambda$ to "0". In other words, the suppression index $pr_{pv}$ and the charge/discharge index $pr_B$ are both calculated to be "0". In the following formula (21), the individual output powers $P_{PVi}^{out}$ and $P_{Bk}^{out}$ and the output command value $P^C$ vary relative to time t. Accordingly, the individual output powers are denoted by $P_{PVi}^{out}(t)$ and $P_{Bk}^{out}(t)$, and the output command value by $P^C(t)$. Details of the formulas (21) and (22) are described later.

$$\frac{d\lambda}{dt} = \varepsilon\left(\sum_{i=1}^{n}(P_{PVi}^{out}(t)) + \sum_{k=1}^{m}(P_{Bk}^{out}(t)) - P^C(t)\right), \varepsilon > 0 \quad \Lambda(21)$$

$$= \varepsilon(P(t) - P^c(t))$$

$$pr_{PV} = pr_B = \lambda \quad \Lambda(22)$$

The transmitter 44 transmits the suppression index $pr_{pv}$ calculated by the index calculator 43 to the power conditioners $PCS_{PVi}$, and transmits the charge/discharge index $pr_B$ calculated by the index calculator 43 to the power conditioners $PCS_{Bk}$.

The following explains the reasons why the formula (19) is used by the power conditioners $PCS_{PVi}$ to calculate the individual target power $P_{PVi}^{ref}$, why the formula (20) is used by the power conditioners $PCS_{Bk}$ to calculate the individual target powers $P_{Bk}^{ref}$, and why the formulas (21) and (22) are used by the central management device MC2 to calculate the suppression index $pr_{pv}$ and the charge/discharge index $pr_B$, during the connection point power suppression control performed by the photovoltaic power generation system PVS2.

The photovoltaic power generation system PVS2 is configured to achieve the following five objectives during the connection point power suppression control. The first objective (objective 2-1) is that "each of the power conditioners $PCS_{PVi}$ and $PCS_{Bk}$ dispersively calculates the individual target power". The second objective (objective 2-2) is "not to suppress the output power of each of the power conditioners $PCS_{PVi}$ connected to the solar cells as much as possible". The third objective (objective 2-3) is that "the storage cells perform charging when the connection point power is larger than the output command value, and perform discharging when the connection point power is smaller than the output command value". The fourth objective (objective 2-4) is "to match the output power (connection point power) at the connection point of the photovoltaic power generation system PVS2 with the output command value from the power company". The fifth objective (2-5) is "to make the output suppression amount adjustable for each of the power conditioners $PCS_{PVi}$ and $PCS_{Bk}$".

First, consideration is given to a constrained optimization problem when the central management device MC2 centrally calculates the individual target powers $P_{PVi}^{ref}$ and $P_{Bk}^{ref}$. In this case, the following formula (23) is obtained. Note that as described above, $P_{PVi}^{ref}$ and $P_{Bk}^{ref}$ denote the individual target powers of the power conditioners $PCS_{PVi}$ and the power conditioners $PCS_{Bk}$. $P_{PVi}^{lmt}$ and $P_{Bk}^{lmt}$ denote the rated outputs (output limits) of the power conditioners $PCS_{PVi}$ and $PCS_{Bk}$. $P_{qi}$ denotes the priority parameter. Note that the individual target powers $P_{PVi}^{ref}$ and $P_{Bk}^{ref}$ that are the optimum solutions of the following formula (23) are denoted by $(P_{PVi}^{ref})^*$ and $(P_{Bk}^{ref})^*$, respectively. In the following formula (23), formula (23a) expresses minimization of the output suppression amount of the individual output power $P_{PVi}^{out}$ of each power conditioner $PCS_{PVi}$ and minimization of the output suppression amount of the individual output power $P_{Bk}^{out}$ of each power conditioner $PCS_{Bk}$; formula (23b) expresses the constraint by the rated output $P_{PVi}^{lmt}$ of each power conditioner $PCS_{PVi}$; formula (23c) expresses the constraint by the rated output $P_{Bk}^{lmt}$ of each power conditioner $PCS_{Bk}$; formula (23d) expresses the constraint by the remaining amount of each storage cell $B_k$, and formula (23e) expresses matching of the connection point power P(t) with the output command value $P^C$.

$$\min_{\substack{P_{PVi}^{ref}, P_{Bk}^{ref} \\ i=1,\Lambda,n \\ k=1,\Lambda,m}} \left\{ \sum_{i=1}^{n} w_{PVi}(P_{PVi}^{ref} - P_{\phi i})^2 + \sum_{k=1}^{m} w_{Bk}(P_{Bk}^{ref})^2 \right\} \quad \Lambda(23a)$$

$$\text{subject to } 0 \leq P_{PVi}^{ref} \leq P_{PVi}^{lmt} \quad \Lambda(23b)$$

$$-P_{Bk}^{lmt} \leq P_{Bk}^{ref} \leq P_{Bk}^{lmt} \quad \Lambda(23c)$$

$$\alpha_k \leq P_{Bk}^{ref} \leq \beta_k \quad \Lambda(23d)$$

$$\sum_{i=1}^{n} P_{PVi}^{ref} + \sum_{k=1}^{m} P_{Bk}^{ref} - P^C = 0 \quad \Lambda(23e)$$

$\Lambda(23)$

This indicates the case where the central management device MC2 calculates the individual target powers $(P_{PVi}^{ref})^*, (P_{Bk}^{ref})^*$ from the above formula (23). In the case of the above formula (23), the power conditioners $PCS_{PVi}$ and $PCS_{Bk}$ do not dispersively calculate the individual target powers $(P_{PVi}^{ref})^*, (P_{Bk}^{ref})^*$, and the objective 2-1 is therefore not achieved.

Next, consideration is given to a constrained optimization problem when each of the power conditioners $PCS_{PVi}$ dispersively calculates the individual target power $P_{PVi}^{ref}$. In this case, the following formula (24) is obtained.

$$\min_{P_{PVi}^{ref}} \left\{ w_{pvi}(P_{PVi}^{ref} - P_{\phi i})^2 \right\} \quad \Lambda(24a)$$

$$\text{subject to } 0 \leq P_{PVi}^{ref} \leq P_{PVi}^{lmt} \quad \Lambda(24b)$$

$\Lambda(24)$

Similarly, consideration is given to a constrained optimization problem when each of the power conditioners $PCS_{Bk}$ dispersively calculates the individual target power $P_{Bk}^{ref}$. In this case, the following formula (25) is obtained.

$$\min_{P_{Bk}^{ref}} \left\{ w_{Bk}(P_{Bk}^{ref})^2 \right\} \quad \Lambda(25a)$$

$$\text{subject to } -P_{Bk}^{lmt} \leq P_{Bk}^{ref} \leq P_{Bk}^{lmt} \quad \Lambda(25b)$$

$$\alpha_k \leq P_{Bk}^{ref} \leq \beta_k \quad \Lambda(25c)$$

$\Lambda(25)$

Although the individual target power that is the optimum solution of the above formula (24) is the individual target power $P_{PVi}^{ref}$ that is dispersively calculated by each of the power conditioners $PCS_{PVi}$, this individual target power disregards the above formula (23e). Similarly, although the individual target power that is the optimum solution of the above formula (25) is the individual target power $P_{Bk}^{ref}$ that is dispersively calculated by each of the power conditioners $PCS_{3k}$, this individual target power disregards the above formula (23e). Accordingly, the objective 2-4, which is to match the connection point power P(t) with the output command value $P^C$ from the power company, cannot be achieved.

In view of the above, the following method is taken into consideration to achieve the objective 2-4. That is, each of the power conditioners $PCS_{PVi}$ dispersively calculates the individual target power $P_{PVi}^{ref}$, based on the suppression index $pr_{pv}$ received from the central management device MC2, and each of the power conditioners $PCS_{Bk}$ dispersively calculates the individual target power $P_{Bk}^{ref}$, based on the charge/discharge index $pr_B$ received from the central management device MC2. As a result, the objective 2-4 is achieved. A constrained optimization problem when each of the power conditioners $PCS_{PVi}$ dispersively calculates the individual target power $P_{PVi}^{ref}$ with use of the suppression index $pr_{pv}$ is expressed by the above formula (19). Note that the individual target power $P_{PVi}^{ref}$ that is the optimum solution of the above formula (19) is denoted by $(P_{PVi}^{ref})^b$. Similarly, a constrained optimization problem when each of the power conditioners $PCS_{Bk}$ dispersively calculates the individual target power $P_{Bk}^{ref}$ with use of the charge/discharge index $pr_3$ is expressed by the above formula (20). Note that the individual target power $P_{Bk}^{ref}$ that is the optimum solution of the above formula (20) is denoted by $(P_{Bk}^{ref})^b$.

When the optimum solution $(P_{PVi}^{ref})^*$ obtained from the above formula (23) matches with the optimum solution $(P_{PVi}^{ref})^b$ obtained from the above formula (19), and the optimum solution $(P_{Bk}^{ref})^*$ obtained from the above formula (23) matches with the optimum solution $(P_{Bk}^{ref})^b$ obtained from the above formula (20), then the connection point power P(t) can be matched with the output command value $P^C$ from the power company. That is, the objective 2-4 can be achieved even when each of the power conditioners $PCS_{PVi}$ and $PCS_{Bk}$ dispersively solves the optimization problem. Accordingly, the suppression index $pr_{pv}$ with which $(P_{PVi}^{ref})^*=(P_{PVi}^{ref})^b$, and the charge/discharge index $pr_B$ with which $(P_{Bk}^{ref})^*=(P_{Bk}^{ref})^b$ are considered, focusing on the optimality of a steady state. For that, KKT conditions of the above formulas (23), (19) and (20) are considered. As a result, the following formula (26) is obtained from the KKT condition of the above formula (23), the following formula (27) is obtained from the KKT condition of the above formula (19), and the following formula (28) is obtained from the KKT condition of the above formula (20). Note that $\mu$ and $\sigma$ denote predetermined Lagrange multipliers.

$$2w_{PVi}(P_{PVi}^{ref} - P_{\phi i}) + \lambda - \mu_{1,i} + \mu_{2,i} = 0 \quad \Lambda(26a)$$

$$2w_{Bk}(P_{Bk}^{ref}) + \lambda - \nu_{1,k} + \nu_{2,k} - \nu_{3,k} + \nu_{4,k} = 0 \quad \Lambda(26b)$$

$$-P_{PVi}^{ref} \leq 0, P_{PVi}^{ref} - P_{PVi}^{lmt} \leq 0 \quad \Lambda(26c)$$

$$-P_{Bk}^{lmt} - P_{Bk}^{ref} \leq 0, P_{Bk}^{ref} - P_{Bk}^{lmt} \leq 0 \quad \Lambda(26d)$$

$$\alpha_k - P_{Bk}^{ref} \leq 0, P_{Bk}^{ref} - \beta_k \leq 0 \quad \Lambda(26e)$$

$$\mu_{1,i}(-P_{PVi}^{ref}) = 0, \mu_{2,i}(P_{PVi}^{ref} - P_{PVi}^{lmt}) = 0 \quad \Lambda(26f)$$

$$\nu_{1,k}(-P_{Bk}^{lmt} - P_{Bk}^{ref}) = 0, \nu_{2,k}(P_{Bk}^{ref} - P_{Bk}^{lmt}) = 0 \quad \Lambda(26g)$$

$$\nu_{3,k}(\alpha_k - P_{Bk}^{ref}) = 0, \nu_{4,k}(P_{Bk}^{ref} - \beta_k) = 0 \quad \Lambda(26h)$$

$$\mu_{1,i} \geq 0, \mu_{2,i} \geq 0 \quad \Lambda(26i)$$

$$\nu_{1,k} \geq 0, \nu_{2,k} \geq 0, \nu_{3,k} \geq 0, \nu_{4,k} \geq 0 \quad \Lambda(26j)$$

$$\sum_{i=1}^{n} P_{PVi}^{ref} + \sum_{k=1}^{m} P_{Bk}^{ref} - P^C = 0 \quad \Lambda(26k)$$

$\Lambda(26)$ $$2w_{PVi}(P_{PVi}^{ref} - P_{\phi i}) + pr_{PV} - \mu_{1,i} + \mu_{2,i} = 0 \quad \Lambda(27a)$$

$$-P_{PVi}^{ref} \leq 0, P_{PVi}^{ref} - P_{PVi}^{lmt} \leq 0 \quad \Lambda(27b)$$

$$\mu_{1,i}(-P_{PVi}^{ref}) = 0, \mu_{2,i}(P_{PVi}^{ref} - P_{PVi}^{lmt}) = 0 \quad \Lambda(27c)$$

$$\mu_{1,i} \geq 0, \mu_{2,i} \geq 0 \quad \Lambda(27d)$$

$\Lambda(27)$

-continued $$2w_{Bk}\left(P_{Bk}^{ref}\right) + pr_B - v_{1,k} + v_{2,k} - v_{3,k} + v_{4,k} = 0 \quad \Lambda(28a)$$
$$-P_{Bk}^{lmt} - P_{Bk}^{ref} \leq 0, P_{Bk}^{ref} - P_{Bk}^{lmt} \leq 0 \quad \Lambda(28b)$$
$$\alpha_k - P_{Bk}^{ref} \leq 0, P_{Bk}^{ref} - \beta_k \leq 0 \quad \Lambda(28c)$$
$$v_{1,k}\left(-P_{Bk}^{lmt} - P_{Bk}^{ref}\right) = 0, v_{2,k}\left(P_{Bk}^{ref} - P_{Bk}^{lmt}\right) = 0 \quad \Lambda(28d)$$
$$v_{3,k}\left(\alpha_k - P_{Bk}^{ref}\right) = 0, v_{4,k}\left(P_{Bk}^{ref} - \beta_k\right) = 0 \quad \Lambda(28e)$$
$$v_{1,k} \geq 0, v_{2,k} \geq 0, v_{3,k} \geq 0, v_{4,k} \geq 0 \quad \Lambda(28f)$$
$$\Lambda(28)$$

Based on the above formulas (26), (27) and (28), it can be understood that $(P_{PVi}^{ref})^*$ matches with $(P_{PVi}^{ref})^b$, and $(P_{Bk}^{ref})^*$ matches with $(P_{Bk}^{ref})^b$ when $pr_{pv} = pr_B = \lambda$ (the above formula (22)). Accordingly, the central management device MC2 may calculate the Lagrange multiplier $\lambda$, and may present (transmit) the Lagrange multiplier $\lambda$ as the suppression index $pr_{pv}$ to each of the power conditioners $PCS_{PVi}$, so that each of the power conditioners $PCS_{PVi}$ can calculate the individual target power $(P_{PVi}^{ref})^b$ based on the above formula (19). Similarly, the central management device MC2 may calculate the Lagrange multiplier $\lambda$, and may present (transmit) the Lagrange multiplier $\lambda$ as the charge/discharge index $pr_B$ to each of the power conditioners $PCS_{Bk}$, so each of the power conditioners $PCS_{Bk}$ can calculate the individual target power $(P_{Bk}^{ref})^b$ based on the above formula (20). In this way, the connection point power $P(t)$ can be matched with the output command value $P^C$ from the power company even when the power conditioners $PCS_{PVi}$ and $PCS_{Bk}$ dispersively calculate the individual target powers $P_{PVi}^{ref}$ and $P_{Bk}^{ref}$. That is, the objective 2-4 can be achieved.

Next, a description is provided of a method by which the central management device MC2 calculates the Lagrange multiplier $\lambda$. In order to calculate the Lagrange multiplier $\lambda$, it is defined as $h^1_{1,i} = -P_{PVi}^{ref}$, and $h^1_{2,i} = P_{PVi}^{ref} - P_{PVi}^{lmt}$, and the inequality constraints of the power conditioners $PCS_{PVi}$ are collectively defined as $h^1_{x,i} \leq 0$ (x=1, 2, and i=1, ..., n). Similarly, it is defined as $h^2_{1,k} = -P_{BK}^{lmt} - P_{Bk}^{ref}$, $h^2_{2,k} = P_{Bk}^{ref} - P_{Bk}^{lmt}$, $h^2_{3,k} = \alpha_k - P_{Bk}^{ref}$, and $h^2_{4,k} = P_{Bk}^{ref} - \beta_k$, and the inequality constraints of the power conditioners $PCS_{Bk}$ are collectively defined as $h^2_{y,k} \leq 0$ (y=1, 2, 3, 4, k=1, ..., m). Then, the following formula (29), which is the dual problem of the above formula (23), is considered.

$$\max_{\lambda}\left[\min_{\substack{P_{PVi}^{ref}, P_{VBk}^{ref} \\ h^1(x,i) \leq 0, h^2(y,k) \leq 0}} \left\{\sum_{i=1}^{n} w_{PVi}\left(P_{PVi}^{ref} - P_{\phi i}\right)^2 + \sum_{k=1}^{m} w_{Bk}\left(P_{Bk}^{ref}\right)^2 + \lambda\left(\sum_{i=1}^{n}\left(P_{PVi}^{ref}\right)^2 + \sum_{k=1}^{m}\left(P_{Bk}^{ref}\right) - P^C\right)\right\}\right] \quad \Lambda(29)$$

Assume here that the optimum solutions $(P_{PVi}^{ref})^b$ and $(P_{Bk}^{ref})^b$ calculated by each of the power conditioners $PCS_{PVi}$ and $PCS_{Bk}$ are determined. In this case, the following formula (30) is obtained, which is in the form of a maximization problem for the Lagrange multiplier $\lambda$. Application of a gradient method to the following formula (30) yields the following formula (31). Note that $\varepsilon$ denotes a gradient coefficient, and $\tau$ indicates a time variable.

$$\max_{\lambda}\left\{\sum_{i=1}^{n} w_{PVi}\left(\left(P_{PVi}^{ref}\right)^b - P_{\phi i}\right)^2 + \sum_{k=1}^{m} w_{Bk}\left(\left(P_{Bk}^{ref}\right)^b\right)^2 + \lambda\left(\sum_{i=1}^{n}\left(P_{PVi}^{ref}\right)^b + \sum_{k=1}^{m}\left(P_{Bk}^{ref}\right)^b - P^C\right)\right\} \quad \Lambda(30)$$

$$\frac{d\lambda}{dt} = \varepsilon\left(\sum_{i=1}^{n}\left(P_{PVi}^{ref}\right)^b + \sum_{k=1}^{m}\left(P_{Bk}^{ref}\right)^b - P^C\right), \varepsilon > 0 \quad \Lambda(31)$$

In the above formula (31), $(P_{PVi}^{ref})^b$ is replaced with the individual output power $P_{PVi}^{out}$ of the corresponding power conditioner $PCS_{PVi}$, and $(P_{Bk}^{ref})^b$ is replaced with the individual output power $P_{Bk}^{out}$ of the corresponding power conditioner $PCS_{Bk}$. Furthermore, central management device MC2 observes the connection point power $P(t)=\Sigma_i P_{PVi}^{out}+\Sigma_k P_{Bk}^{out}$, instead of individually observing the individual output powers $P_{PVi}^{out}$ and $P_{Bk}^{out}$ of the power conditioners $PCS_{PVi}$ and $PCS_{Bk}$. Furthermore, it is assumed that the central management device MC2 sequentially acquires the output command value $P^C$ from the power company. As a result, the above formula (21) is obtained. Hence, the central management device MC2 can calculate the Lagrange multiplier $\lambda$, based on the connection point power $P(t)$ and the output command value $P^C$ from the power company. The calculated Lagrange multiplier $\lambda$ is then set to the suppression index suppression index $pr_{pv}$ and the charge/discharge index $pr_B$ based on the above formula (22).

Based on the above, in the present embodiment, each of the power conditioners $PCS_{PVi}$ uses the optimization problem shown in formula (19) when calculating the individual target power $P_{PVi}^{ref}$. Each of the power conditioners $PCS_{Bk}$ uses the optimization problem shown in formula (20) when calculating the individual target power $P_{Bk}^{ref}$. The central management device MC2 uses the above formulas (21) and (22) when calculating the suppression index $pr_{pv}$ and the charge/discharge index $pr_B$.

Next, a simulation was used to verify that the photovoltaic power generation system PVS2 having the above-described configuration achieves the above-described five objectives and operates appropriately.

In the simulation, the photovoltaic power generation system PVS2 was assumed to have five power conditioners $PCS_{PVi}$ (i=1~5; $PCS_{PV1}$ to $PCS_{PV5}$) to which the solar cells $SP_i$ are connected, and five power conditioners $PCS_{Bk}$ (k=1~5; $PCS_{B1}$ to $PCS_{B5}$) to which the storage cells $B_k$ are connected.

Also, in the present simulation, the model of each of the storage cells $B_k$ was set such that $d/dt$ $(x_k)=-K_k P_{Bk}^{out}$, and $s_k=x_k$. Here, $s_k$ denotes an amount of power charged in the storage cell $B_k$ and $K_k$ denotes the property of the storage cell $B_k$. Adjustment parameters $\alpha_k$ and $\beta_k$, which are adjustable according to the remaining amount of the storage cell $B_k$, were set as shown in Table 1. In Table 1, $SOC_k$ indicates the state of charge (%) of each of the storage cells $B_{Bk}$, and can be calculated by $SOC_k=(S_k/S_k^{max})\times 100$ where the amount of charged power (kWh) is set to $S_k$, and the maximum capacity of the storage cell $B_k$ (kWh) is set to $S_k^{max}$.

TABLE 1

| State of Charge | $\alpha_k$ | $\beta_k$ | Remarks |
|---|---|---|---|
| $SOC_k \geq 90\%$ | 0 | $P_{Bk}^{lmt}$ | Discharge Only |
| $SOC_k \leq 10\%$ | $-P_{Bk}^{lmt}$ | 0 | Charge Only |
| $10\% < SOC_k < 90\%$ | $-P_{Bk}^{lmt}$ | $P_{Bk}^{lmt}$ | Charge and Discharge |

The priority parameter (pseudo active output limit) $P_{\varphi i}$ of each of the power conditioners $PCS_{PVi}$, which is a parameter relating to the optimum problem, was set to 1000 kW. The model (see the above formula (18)) of the power grid A (connection point voltage), and the models (see FIGS. 3 and 4) of the power conditioners $PCS_{PVi}$ and $PCS_{Bk}$ are the same as those in the simulation according to the first embodiment.

Figure 14:
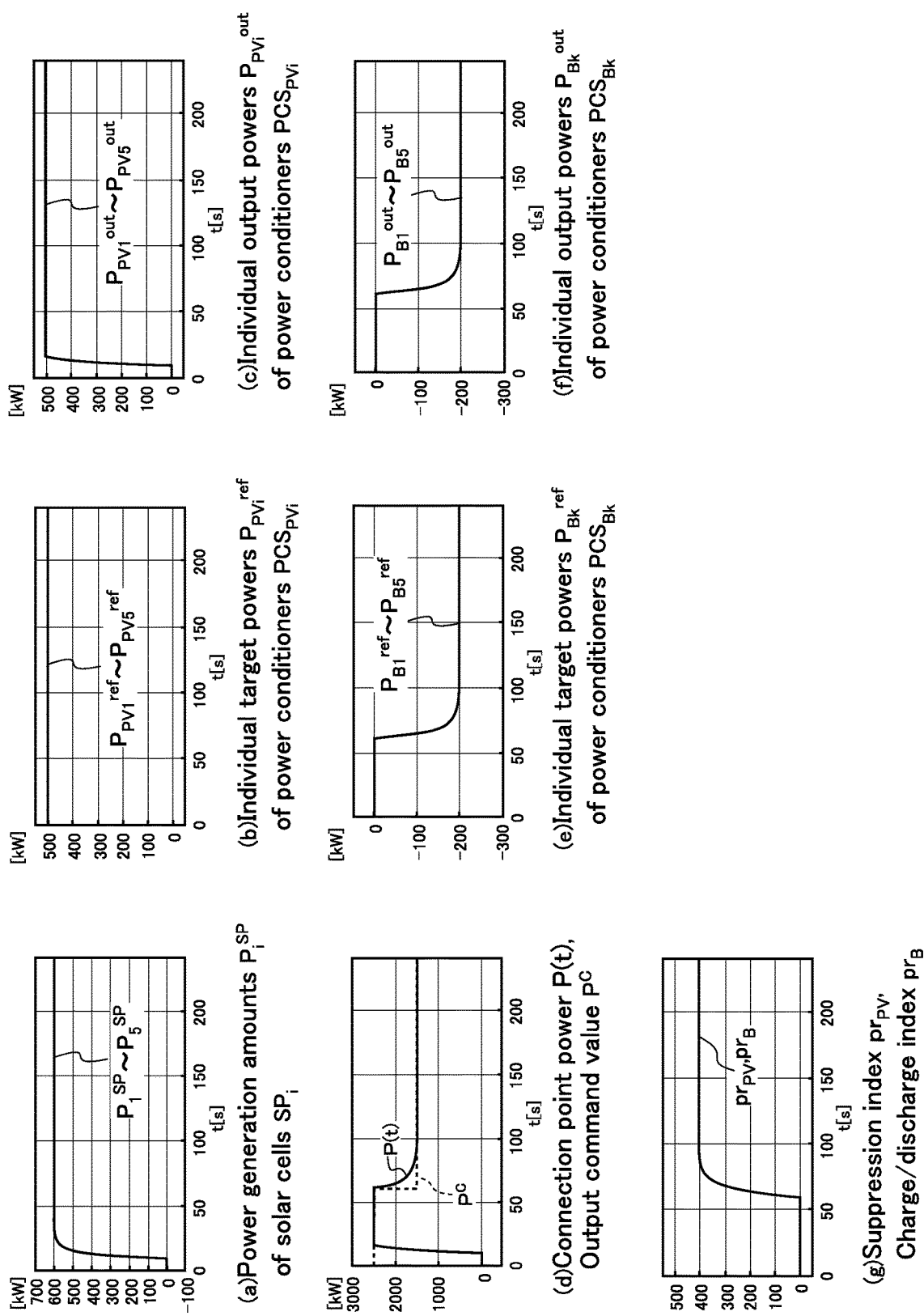
FIG. 14 shows a verification result (case 1) in a simulation according to the second embodiment.
Figure 15:
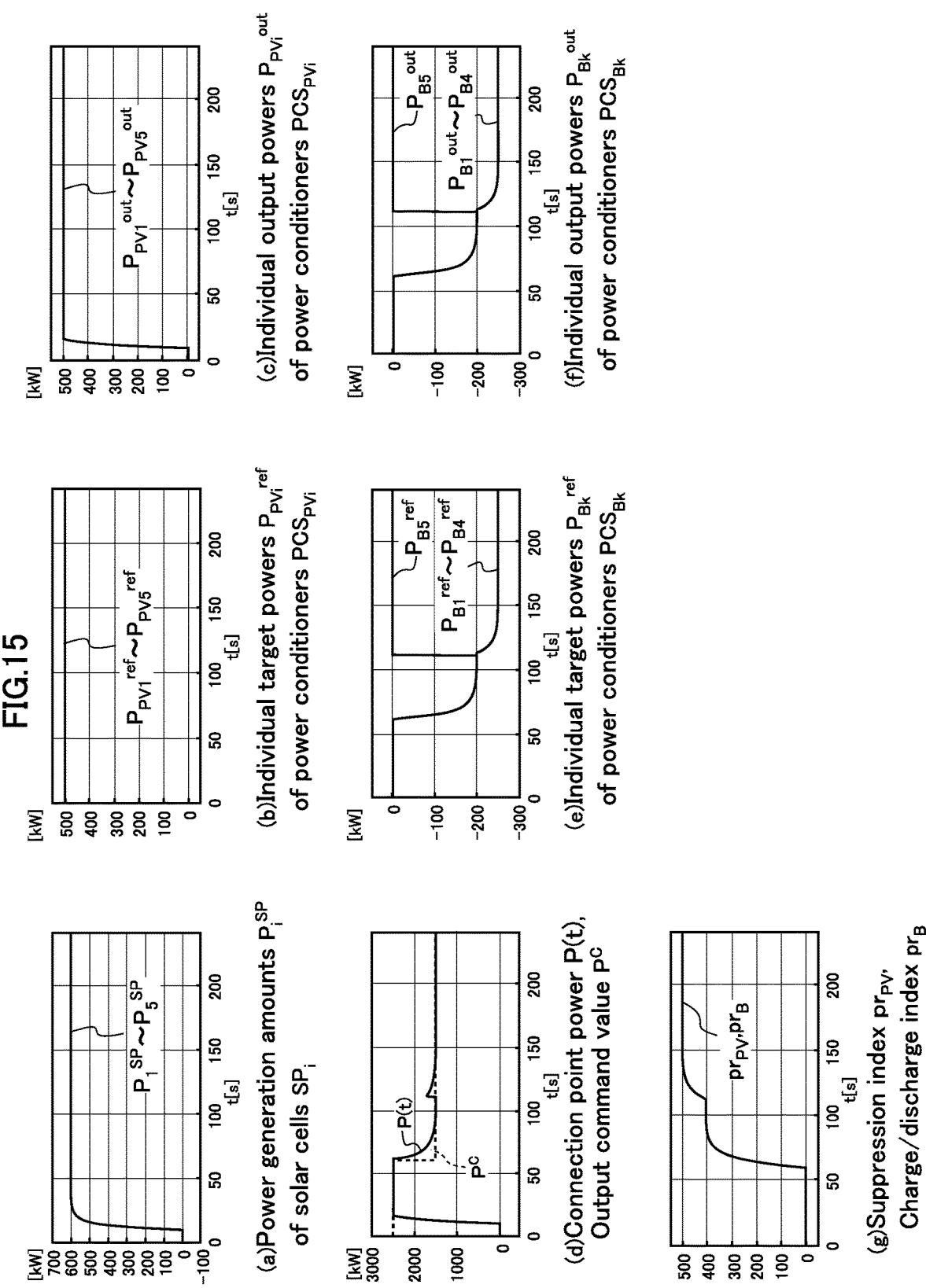
FIG. 15 shows a verification result (case 2) in the simulation according to the second embodiment.

FIGS. 14 to 16 show results when a simulation was conducted under multiple conditions with the photovoltaic power generation system PVS2 of the aforementioned model.

In case 1, a simulation was conducted when five power conditioners $PCS_{PV1}$ to $PCS_{PV5}$ were under the same condition, and five power conditioners $PCS_{B1}$ to $PCS_{B5}$ were under the same condition. The simulation is referred to as simulation 2-1. In simulation 2-1, all of the five power conditioners $PCS_{PV1}$ to $PCS_{PV5}$ had a rated output $P_{PVi}^{lmt}$ of 500 kW, the weight $w_{PVi}$ for active power suppression was set to 1.0, and the power generation amount $P_i^{SP}$ of each of the solar cells $SP_i$ was set to 600 kW. Also, all of the five power conditioners $PCS_{B1}$ to $PCS_{B5}$ had a rated output $P_{PVi}^{lmt}$ of 500 kW, and the weight $w_{PVi}$ for active power suppression was set to 1.0. The maximum capacities $S_1^{max}$ to $S_5^{max}$ of the storage cells are all set to 500 kWh. Also, the output command value $P^C$ from the power company was set to indicate no command when $0 \leq t < 60$ [s], and to indicate 1500 kW when $60 \leq t$ [s]. When "the output command value $P^C$ indicates no command", a numerical value of −1, which indicates no command, was used as the output command value $P^C$, as described above. Furthermore, the gradient coefficient ε was set to 0.05, the sampling time of the update of the suppression index $pr_{pv}$ and the charge/discharge index $pr_B$ performed by the central management device MC2 was set to 1 s, and the sampling time of the update of each of the individual target powers $P_{PVi}^{ref}$ and $P_{Bk}^{ref}$ performed by the power conditioners $PCS_{PVi}$ and $PCS_{Bk}$ was set to 1 s. Also, all of the power conditioners $PCS_{PVi}$ and $PCS_{Bk}$ were assumed to operate at a power factor of 1 (reactive power target value=0 kvar). FIG. 14 shows the results of simulation 2-1.

In FIG. 14, (a) shows the power generation amount $P_i^{SP}$ of each of the solar cells $SP_i$, (b) shows the individual target power $P_{PVi}^{ref}$ of each of the power conditioners $PCS_{PVi}$, (c) shows the individual output power $P_{PVi}^{out}$ of each of the power conditioners $PCS_{PVi}$, (d) shows the connection point power $P(t)$ (solid line) and the output command value $P^C$ from the power company (broken line), (e) shows the individual target power $P_{Bk}^{ref}$ of each of the power conditioners $PCS_{Bk}$, (f) shows the individual output power $P_{Bk}^{out}$ of each of the power conditioners $PCS_{Bk}$, and (g) shows the suppression index $pr_{pv}$ and the charge/discharge index $pr_B$ calculated by the index calculator 43.

The following points can be confirmed from FIG. 14. That is, as shown in (b) and (c) in FIG. 14, even after the output command value $P^C$ is issued ($60 \leq t$ [s]), the individual target powers $P_{PV1}^{ref}$ to $P_{PV5}^{ref}$ remain at 500 kW, and the individual output powers $P_{PV1}^{out}$ to $P_{PV5}^{out}$ are not suppressed. Also, as shown in (e) and (f) in FIG. 14, the individual output powers $P_{B1}^{out}$ to $P_{B5}^{out}$ of the power conditioners $PCS_{Bk}$ transition from 0 kW to negative (minus). This indicates that power is input to the power conditioners $PCS_{Bk}$, and the storage cells $B_k$ are charged with the powers input to the power conditioners $PCS_{Bk}$. Also, as shown in (d) in FIG. 14, the connection point power $P(t)$ matches with the output command value $P^C$. Accordingly, it can be confirmed that the photovoltaic power generation system PVS2 does not suppress the individual output powers $P_{PVi}^{out}$ of the power conditioners $PCS_{PVi}$ and uses the individual output powers $P_{PVi}^{out}$ to charge the storage cells $B_k$.

In case 2, a simulation was conducted when the maximum capacity $S_5^{max}$ of the storage cell $B_5$, which is one of the five power conditioners $PCS_{B1}$ to $PCS_{35}$ and connected to the power conditioner $PCS_{B5}$, is different from those of the storage cells $B_1$ to $B_4$ connected to the other power conditioners $PCS_{B1}$ to $PCS_{B4}$. The simulation is referred to as simulation 2-2. In simulation 2-2, the maximum capacity $S_5^{max}$ of the storage cell $B_5$ connected to the power conditioner $PCS_{B5}$ was set to 3 kWh. The other conditions are the same as those in the above simulation 2-1. FIG. 15 shows the results of simulation 2-2. Note that (a) to (g) in FIG. 15 correspond to (a) to (g) in FIG. 14 in the above simulation 2-1.

The following points can be confirmed from FIG. 15. That is, as shown in (a) to (c) in FIG. 15, even after the output command value $P^C$ is issued ($60 \leq t$ [s]), the individual target powers $P_{PV1}^{ref}$ to $P_{PV5}^{ref}$ are not suppressed, similarly to the above simulation 2-1. Also, as shown in (e) and (f) in FIG. 15, the individual output powers $P_{B1}^{out}$ to $P_{B5}^{out}$ of the power conditioners $PCS_{B1}$ to $PCS_{B5}$ transition from 0 kW to negative (minus). Accordingly, each of the power conditioners $PCS_{B1}$ to $PCS_{B5}$ charges the storage cell $B_k$ with input power, similarly to the above simulation 2-1. Also, as shown in (e) and (f) in FIG. 15, the individual output power $P_{B5}^{out}$ of the power conditioner $PCS_{B5}$ becomes 0 (zero) when $110 \leq t$ [s], and the individual output powers $P_{B1}^{out}$ to $P_{B4}^{out}$ of the other power conditioners $PCS_{B1}$ to $PCS_{B4}$ are further decreased (the input powers are increased). This means that because the maximum capacity $S_5^{max}$ of the storage cell $B_5$ is 3 kWh, which is lower than those of the other storage cells $B_1$ to $B_4$, the storage cell $B_5$ has completed charging earlier than the other storage cells $B_1$ to $B_4$. Since charging of the storage cell $B_5$ has been completed, input of power to the power conditioner $PCS_{B5}$ is stopped and charging is stopped. As a result, the power input to the power conditioner $PCS_{B5}$ is distributed to the other power conditioners $PCS_{B1}$ to $PCS_{B4}$, which causes the individual output powers $P_{B1}^{out}$ to $P_{B4}^{out}$ of the other power conditioners $PCS_{B1}$ to $PCS_{B4}$ to be further decreased (powers input thereto are increased). Furthermore, as shown in (d) in FIG. 15, the connection point power $P(t)$ is temporarily larger than the output command value $P^C$ due to the stoppage of charging to the storage cell $B_5$. However, in a steady state, the connection point power $P(t)$ matches with the output command value $P^C$. Accordingly, it can be said that the photovoltaic power generation system PVS2 appropriately operates in consideration of the capability of each storage cell $B_k$.

In case 3, a simulation was conducted when the weight $w_{B5}$ for active power, which is set to the power conditioner $PCS_{B5}$ among the five power conditioners $PCS_{B1}$ to $PCS_{B5}$, is different from those set to the other power conditioners $PCS_{B1}$ to $PCS_{B4}$. The simulation is referred to as simulation 2-3. In simulation 2-3, the weight $w_{B5}$ for the active power of the power conditioner $PCS_{B5}$ was set to 2.0. This means that the charging amount is half the charging amount of the other power conditioners $PCS_{B1}$ to $PCS_{B4}$. The other conditions are the same as those in the above simulation 2-1.

FIG. 16 shows the results of simulation 2-3. Note that (a) to (g) in FIG. 16 correspond to (a) to (g) in FIG. 14 in the above simulation 2-1.

The following points can be confirmed from FIG. 16. That is, as shown in (a) to (C) in FIG. 16, even after the output command value $P^C$ is issued (60≤t [s]), the individual target powers $P_{PV1}{}^{ref}$ to $P_{PV5}{}^{ref}$ are not suppressed, similarly to the above simulation 2-1. Also, as shown in (e) and (f) in FIG. 15, the individual output powers $P_{B1}{}^{out}$ to $P_{B5}{}^{out}$ of the power conditioners $PCS_{B1}$ to $PCS_{B5}$ transition from 0 kW to negative (minus). Accordingly, each of the power conditioners $PCS_{B1}$ to $PCS_{B5}$ charges the storage cell $B_k$ with input power, similarly to the above simulation 2-1. Also, as shown in (e) and (f) in FIG. 16, the charging amount of the power conditioner $PCS_{B5}$ (input power to the power conditioner $PCS_{B5}$) in which the weight $w_{B5}$ for active power is different is half the charging amounts of the other power conditioners $PCS_{B1}$ to $PCS_{B4}$. Also, as shown in (d) in FIG. 16, the connection point power P(t) matches with the output command value $P^C$ in a steady state. Accordingly, it can be said that the photovoltaic power generation system PVS2 appropriately operates in consideration of the weight $w_{Bk}$ for active power set for each of the power conditioners $PCS_{Bk}$.

The following points can be confirmed from the respective results shown in FIGS. 14 to 16 and by comparison of FIGS. 14 to 16. That is, as shown in (g) of each figure, different values are calculated as the suppression index $pr_{pv}$ and the charge/discharge index $pr_B$, based on the power generation amounts $P_i^{SP}$ of the solar cells $SP_i$, the performance of the storage cells $B_k$, the rated outputs $P_{PVi}{}^{Imt}$ and $p_{Bk}{}^{Imt}$, the weights $w_{PVi}$ for active power suppression, the weights $w_{Bk}$ for active power, and the output command value $P^C$, etc., which correspond to the power conditioners $PCS_{PV1}$ to $PCS_{PV5}$ and $PCS_{B1}$ to $PCS_{B5}$. Also, as shown in (b) and (e) in each figure, the individual target powers $P_{PVi}{}^{ref}$ and $P_{Bk}{}^{ref}$ are updated according to the update of the suppression index $pr_{pv}$ and the charge/discharge index $pr_B$. The power conditioners $PCS_{PVi}$ to $PCS_{PV5}$, and $PCS_{B1}$ to $PCS_{B5}$ control the individual output powers $P_{PVi}{}^{out}$ and $P_{Bk}{}^{out}$ according to the individual target powers $P_{PVi}{}^{ref}$ and $P_{Bk}{}^{ref}$. Accordingly, as shown in (d) of each figure, the connection point power P(t) is matched with the output command value $P^C$. Based on the above, it can be said that the suppression index $pr_{pv}$ and the charge/discharge index $pr_B$ calculated by the central management device MC2 with the above formulas (21) and (22) are appropriate values.

According to the results of the above simulations 2-1 to 2-3, each of the power conditioners $PCS_{PVi}$ in the photovoltaic power generation system PVS2 dispersively calculates the individual target power $P_{PVi}{}^{ref}$, based on the suppression index $pr_{pv}$ received from the central management device MC2. Also, each of the power conditioners $PCS_{Bk}$ dispersively calculates the individual target power $P_{Bk}{}^{ref}$, based on the charge/discharge index $pr_B$ received from the central management device MC2. Accordingly, the above-described objective 2-1 is achieved. Also, each of the power conditioners $PCS_{PVi}$ does not suppress the individual target power $P_{PVi}{}^{out}$ as much as possible, and inputs, to the power conditioner $PCS_{Bk}$, the excess of the connection point power P(t) over the output command value $P^C$ so as to utilize the excess of the connection point power P(t) for charging the storage cell $B_k$. Accordingly, the above-described objectives 2-2 and 2-3 are achieved. Also, the connection point power P(t) matches with the output command value $P^C$. Accordingly, the above-described objective 2-4 is achieved. Also, depending on the various conditions, the individual output powers $P_{PVi}{}^{out}$ and $P_{Bk}{}^{out}$ are varied for each of the power conditioners $PCS_{PVi}$ and $PCS_{Bk}$. That is, depending on the various conditions, the output suppression amount is varied for each of the power conditioners $PCS_{PVi}$ and $PCS_{Bk}$. Accordingly, the above-described objective 2-5 is achieved. From the above, it can be understood that the photovoltaic power generation system PVS2 achieves the five objectives described above.

As described above, in the photovoltaic power generation system PVS2 according to the second embodiment, the central management device MC2 calculates the suppression index $pr_{pv}$ and the charge/discharge index $pr_B$ based on the output command value $P^C$ from the power company and the detected connection point power P(t). Then, the central management device MC2 transmits the suppression index $pr_{pv}$ to each of the power conditioners $PCS_{PVi}$, and the charge/discharge index $pr_B$ to each of the power conditioners $PCS_{Bk}$. Each of the power conditioners $PCS_{PVi}$ calculates the individual target power $P_{PVi}{}^{ref}$ by dispersively solving the optimization problem in the above formula (19), based on the received suppression index $pr_{pv}$. Each of the power conditioners $PCS_{PVi}$ then regulates the individual output power $P_{PVi}{}^{out}$ to the individual target power $P_{PVi}{}^{ref}$. Each of the power conditioners $PCS_{Bk}$ calculates the individual target power $P_{Bk}{}^{ref}$ by dispersively solving the optimization problem shown by the above formula (20), based on the received charge/discharge index $pr_B$. Each of the power conditioners $PCS_{Bk}$ then regulates the individual output power $P_{Bk}{}^{out}$ to the individual target power $P_{Bk}{}^{ref}$. In this way, the central management device MC2 only needs to perform simple calculations shown in the above formulas (21) and (22). As a result, in the photovoltaic power generation system PVS2, the processing load on the central management device MC2 can be reduced. Also, even in the case where the power conditioners $PCS_{PVi}$ and $PCS_{Bk}$ dispersively calculate the individual target powers $P_{PVi}{}^{ref}$ and $P_{Bk}{}^{ref}$ based on the suppression index $pr_{pv}$ and the charge/discharge index $pr_B$, and control the individual output powers $P_{PVi}{}^{out}$ and $P_{Bk}{}^{out}$, the connection point power P(t) can be matched with the output command value $P^C$ from the power company.

The first embodiment takes into consideration the weight $w_i$ for active power suppression, and the second embodiment takes into consideration the weight $w_{PVi}$ for active power suppression and the weight $w_{Bk}$ for active power. However, other examples are possible. For example, suppose that in the first embodiment, the objective 1-3, which is "to make an output suppression amount adjustable for each power conditioner $PCS_i$", does not need to be taken into consideration. In this case, the weights $w_i$ for active power suppression set for the power conditioners $PCS_i$ may all take the same value (e.g., "1"). Similarly, suppose that in the second embodiment, the objective 2-5, which is "to make the output suppression amount adjustable for each of the power conditioners $PCS_{PVi}$ and $PCS_{Bk}$", does not need to be taken into consideration. In this case, the weights $w_{PVi}$ for active power suppression and the weights $w_{Bk}$ for active power set for the power conditioners $PCS_{PVi}$ and $PCS_{Bk}$ may all take the same value (e.g., "1").

In the second embodiment, the target power calculator 12' calculates the individual target powers $P_{PVi}{}^{ref}$ with use of the priority parameter $P_{\varphi i}$ as shown in the formula (19). However, it is possible to use the rated outputs $P_{PVi}{}^{Imt}$ as shown in the formula (8) in the first embodiment. In this case, whether to prioritize suppression of the individual output powers $P_{PVi}{}^{out}$ or to prioritize control through charging/discharging (individual output powers $P_{Bk}{}^{out}$) of the storage cells $B_k$ may be adjusted with the weights $w_{PVi}$ for active power suppression and the weights $w_{Bk}$ for active power.

In the second embodiment, the optimization problem solved by the target power calculator 12' is not limited by the formula (19). For example, the following formula (19') may be used instead of the above formula (19). As compared to the formula (19), the formula (19') additionally includes formula (19c') which expresses a constraint on the output current of each of the power conditioners $PCS_{PVi}$. Note that in the formula (19'), $Q_{PVi}$ denotes the reactive power of each of the power conditioners $PCS_{PVi}$, $S_{PVi}^d$ denotes the maximum apparent power that can be output by each of the power conditioners $PCS_{PVi}$, $V_0$ denotes the reference voltage of the connection point at the time of designing, and the $V_{PVi}$ denotes the voltage at the connection point of each of the power conditioners $PCS_{PVi}$. The formula (19') may include the following formula (19d') expressing a constraint on the rated capacity of each of the power conditioners $PCS_{PVi}$, instead of the formula (19c') expressing a constraint on the output current of each of the power conditioners $PCS_{PVi}$.

$$\min_{P_{PVi}^{ref}} \{w_{PVi}(P_{PVi}^{ref} - P_{\phi i})^2 + pr_{PV}(P_{PVi}^{ref} - P_{\phi i})\} \quad (19a') \quad (19')$$

$$\text{subject to } 0 \leq P_{PVi}^{ref} \leq P_{PVi}^{lmt} \quad (19b')$$

$$(P_{PVi}^{ref})^2 + (Q_{PVi})^2 \leq \left(S_{PVi}^d \frac{V_{PVi}}{V_0}\right)^2 \quad (19c')$$

$$(P_{PVi}^{ref})^2 + (Q_{PVi})^2 \leq (S_{PVi}^d)^2 \quad (19d')$$

In the second embodiment, the optimization problem solved by the target power calculator 32 is not limited by the formula (20). For example, the following formula (20') may be used instead of the above formula (20). As compared to the above formula (20), the formula (20') additionally includes the following formula (20a') which is an evaluation function including a weight $W_{SOCk}$ corresponding to the SOC of each of the storage cells $B_k$. The weight $w_{SOCk}$ can be calculated by the following formula (32). In formula (32), $A_{SOC}$ denotes an offset of $w_{SOCk}$, $K_{SOC}$ denotes a gain of the weight $w_{SOCk}$, s denotes an on/of f switch of the weight $w_{SOCk}$ (e.g., "1" when it is on, and "0" when it is of f), $SOC_k$ denotes the present SOC of each of the storage cells $B_k$, and $SOC_d$ denotes an SOC as a reference. Furthermore, formula (20') includes additional constraints, i.e., a constraint on the C rate of each of the storage cells $B_k$ shown in formula (20c') and a constraint on the output current of each of the power conditioners $PCS_{sk}$ shown in the following formula (20e'). The C rate is a ratio of current at the time of charging or discharging relative to the total capacity of each of the storage cells $B_k$, where 1C denotes charging or discharging of the total capacity of each of the storage cells $B_k$ in an hour. In the present embodiment, a charge rate $C_{rate}^M$ denotes the C rate at the time of charging, a discharge rate $C_{rate}^P$ denotes the C rate at the time of discharging, and predetermined values (e.g., both 0.3C) are set for these charging and discharge rates. Note that in the formula (20'), $P_{SMk}^{lmt}$ denotes the charge rated output of each of the storage cells $B_k$ calculated by $-C_{rate}^M \times WH_S^{lmt}$ ($WH_S^{lmt}$ being the rated output capacity of the storage cell $B_k$), $P_{SPk}^{lmt}$ denotes the discharge rated output of each of the storage cells $B_k$ calculated by $C_{rate}^P \times WH_S^{lmt}$, $QB_k$ denotes the reactive power of each of the power conditioners $PCS_{Bk}$, $SB_k^d$ denotes the maximum apparent power that can be output by each of the power conditioners $PCS_{Bk}$, and $VB_k$ denotes the voltage at the connection point of each of the power conditioners $PCS_{Bk}$. Furthermore, for the charge rated output $P_{SMk}^{lmt}$ of each of the storage cells $B_k$, a correction on a storage cell charging amount according to the SOC is considered, which is expressed by the following formula (33) where $SOC_C$ denotes correction start SOC, and $_cMAX$ denotes the threshold for the charging limit of SOC. Regarding the correction on the storage cell charging amount, a normal operation is performed until the correction start SOC and, during the period from the correction start SOC to an SOC upper limit, an output is corrected linearly such that the output becomes 0 (zero) at the SOC upper limit. Also, the following formula (20') may include the following formula (20f') expressing a constraint on the rated capacity of each of the power conditioners $PCS_{Bk}$, instead of the formula (20e') expressing a constraint on the output current of each of the power conditioners $PCS_{Bk}$.

$$\min_{P_{Bk}^{ref}} \{w_{Bk} w_{SOCk}(P_{Bk}^{ref})^2 + pr_B(P_{Bk}^{ref})\} \quad (20a') \quad (20')$$

$$\text{subject to } -P_{Bk}^{lmt} \leq P_{Bk}^{ref} \leq P_{Bk}^{lmt} \quad (20b')$$

$$-P_{SMk}^{lmt} \leq P_{Bk}^{ref} \leq P_{SPk}^{ref} \quad (20c')$$

$$\alpha_k \leq P_{Bk}^{ref} \leq \beta_k \quad (20d')$$

$$(P_{Bk}^{ref})^2 + (Q_{Bk})^2 \leq \left(S_{Bk}^d \frac{V_{Bk}}{V_0}\right)^2 \quad (20e')$$

$$(P_{Bk}^{ref})^2 + (Q_{Bk})^2 \leq (S_{Bk}^d)^2 \quad (20f')$$

$$w_{SOCk} = A_{SOC} + s \frac{SOC_k - SOC_d}{K_{SOC}} \text{ (During Charging)} \quad (32)$$

$$w_{SOCk} = A_{SOC} - s \frac{SOC_k - SOC_d}{K_{SOC}} \text{ (During Discharging)}$$

$$P_{SMk}^{lmt} = P_{SMk}^{lmt} \quad \text{if } SOC \leq SOC_0 \quad (33)$$

$$P_{SMk}^{lmt} = P_{SMk}^{lmt} \frac{cMAX - SOC}{cMAX - SOC_0} \quad \text{if } SOC > SOC_0$$

Note that in the photovoltaic power generation systems according to other embodiments described below, the target power calculators 12' may use either the above formula (19) or the above formula (19') when calculating the individual target powers $P_{PVi}^{ref}$. Similarly, the target power calculators 32 may use either the above formula (20) or the above formula (20') when calculating the individual target powers $P_{Bk}^{ref}$.

In the photovoltaic power generation system PVS2 according to the second embodiment, the plurality of power conditioners $PCS_{PVi}$ and $PCS_{Bk}$ are connected to the connection point. In addition to this, a power load may be further connected to the connection point. The power load consumes supplied power, examples of which include factories and general households. Such an embodiment will be described below with reference to FIGS. 17 to 20. Note that elements that are the same as or similar to those in the first embodiment and the second embodiment are provided with the same reference signs and descriptions thereof will be omitted.

Figure 17:
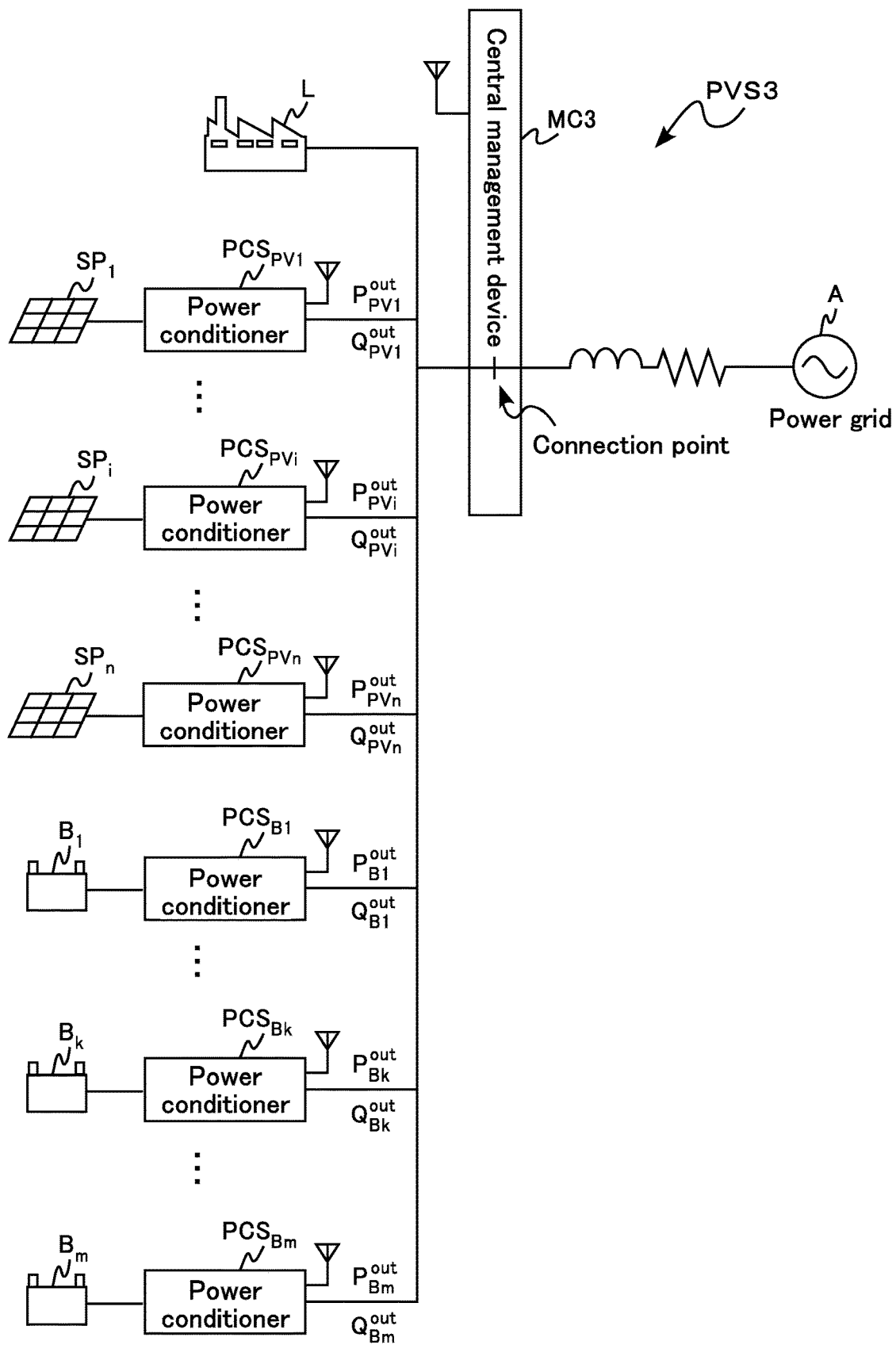
FIG. 17 shows the overall structure of a photovoltaic power generation system according to a third embodiment.
Figure 18:
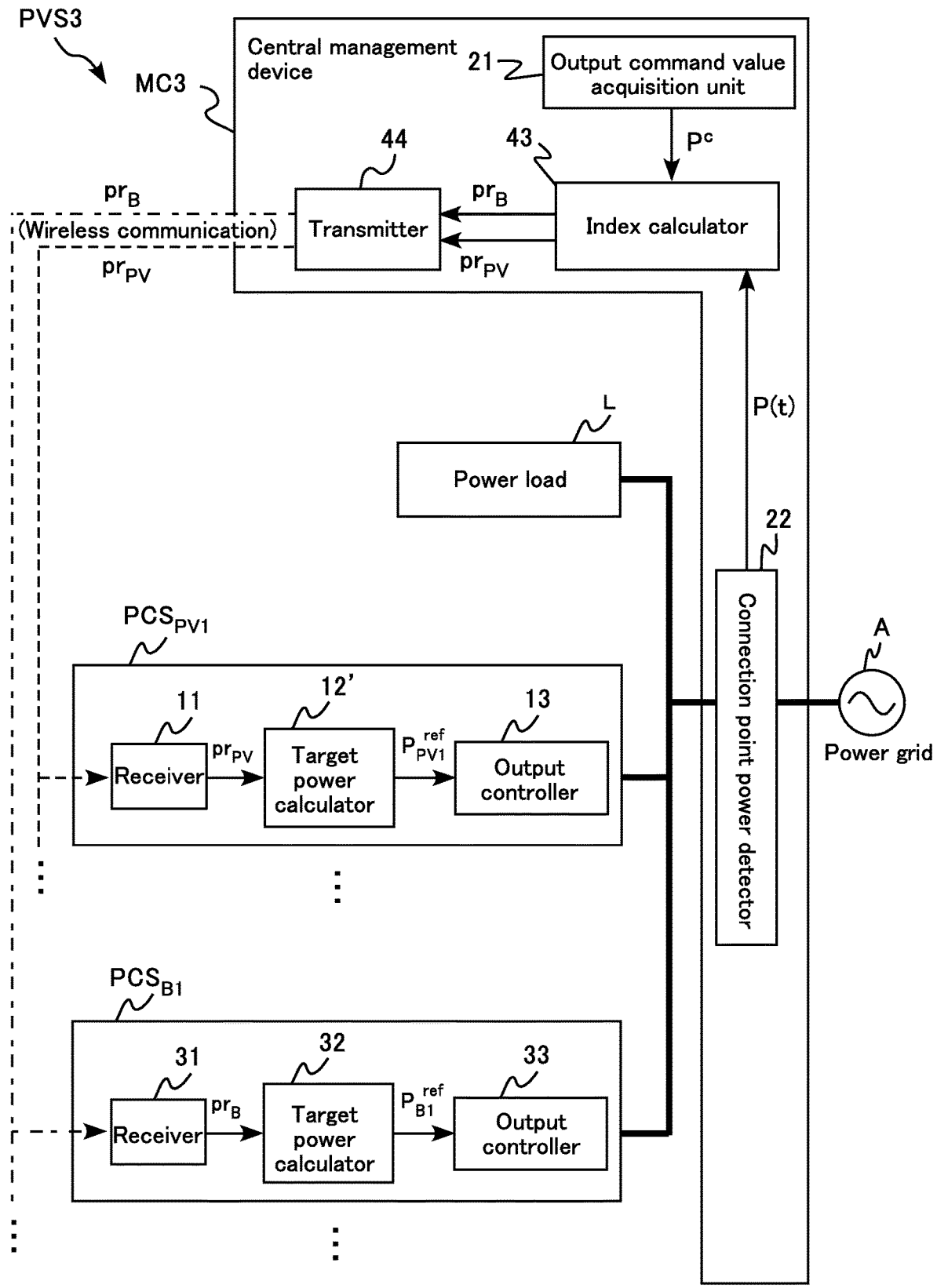
FIG. 18 shows the functional structure for a connection point power suppression control of the photovoltaic power generation system according to the third embodiment.

FIGS. 17 and 18 show a photovoltaic power generation system PVS3 according to a third embodiment. FIG. 17 shows the overall structure of the photovoltaic power generation system PVS3. FIG. 18 shows the functional structure of a control system in the photovoltaic power generation system PVS3 in FIG. 17, where the control system controls power at a connection point. Although the photovoltaic power generation system PVS3 includes a plurality of power conditioners $PCS_{PVi}$ and a plurality of power conditioners $PCS_{Bk}$, FIG. 18 shows only a first one of the power conditioners $PCS_{PVi}$ and a first one of the power conditioners $PCS_{Bk}$. As shown in FIGS. 17 and 18, the photovoltaic power generation system PVS3 is different from the photovoltaic power generation system PVS2 according to the second embodiment with respect to additionally including a power load L. The power load L is connected to the connection point, and is supplied with power from a power grid A, the power conditioners $PCS_{PVi}$ and the power conditioners $PCS_{Bk}$. In the present embodiment, it is assumed that the sum $\Sigma P_{PVi}^{out}$ of the individual output powers $P_{PVi}^{out}$ of the power conditioners $PCS_{PVi}$ (the power generation amounts $P_i^{SP}$ of the solar cells $SP_i$) is larger than the consumed power of the power load L. It is also assumed that part or all of the surplus power not consumed by the power load L flows back to the power grid A. The surplus power is a difference between the sum $\Sigma P_{PVi}^{out}$ of the individual output powers $P_{PVi}^{out}$ and the consumed power.

When surplus power is caused to flow back in the photovoltaic power generation system PVS3, it is necessary to prevent the surplus power from exceeding the output command value $P^C$ from the power company. In the photovoltaic power generation system PVS3, the surplus power that flows back can be regarded as a connection point power P(t) detected by a connection point power detector 22. Accordingly, the photovoltaic power generation system PVS3 regulates the connection point power P(t) to the target power (output command value $P^C$) by performing a connection point power suppression control using a suppression index $pr_{pv}$ and a charge/discharge index $pr_B$, similarly to the second embodiment.

In the photovoltaic power generation system PVS3 according to the present embodiment, a central management device MC3 calculates the suppression index $pr_{pv}$ and the charge/discharge index $pr_B$, based on the output command value $P^C$ from the power company and the connection point power P(t). At this time, the central management device MC3 calculates the suppression index $pr_{pv}$ and the charge/discharge index $pr_B$ with use of the above formulas (21) and (22). Each of the power conditioners $PCS_{PVi}$ dispersively calculates the individual target power $P_{PVi}^{ref}$ based on the suppression index $pr_{pv}$. Also, each of the power conditioners $PCS_{Bk}$ dispersively calculates the individual target power $P_{Bk}^{ref}$, based on the charge/discharge index $pr_B$. This makes it possible to reduce the processing load on the central management device MC3. It is also possible to regulate the connection point power P(t), namely the surplus power caused to flow back to the power grid A, to match with the output command value $P^C$. This, as a result, can prevent the surplus power that is caused to flow back to the power grid A from exceeding the output command value $P^C$ from the power company.

In the third embodiment, the power load L is added to the photovoltaic power generation system PVS2 according to the second embodiment. However, the power load L can be added to the photovoltaic power generation system PVS1 according to the first embodiment instead. This also allows for the connection point power suppression control with the suppression index pr. In this case as well, the processing load of the central management device MC1 can be reduced while the connection point power P (t) is matched with the target power (output command value $P^C$).

Figure 19:
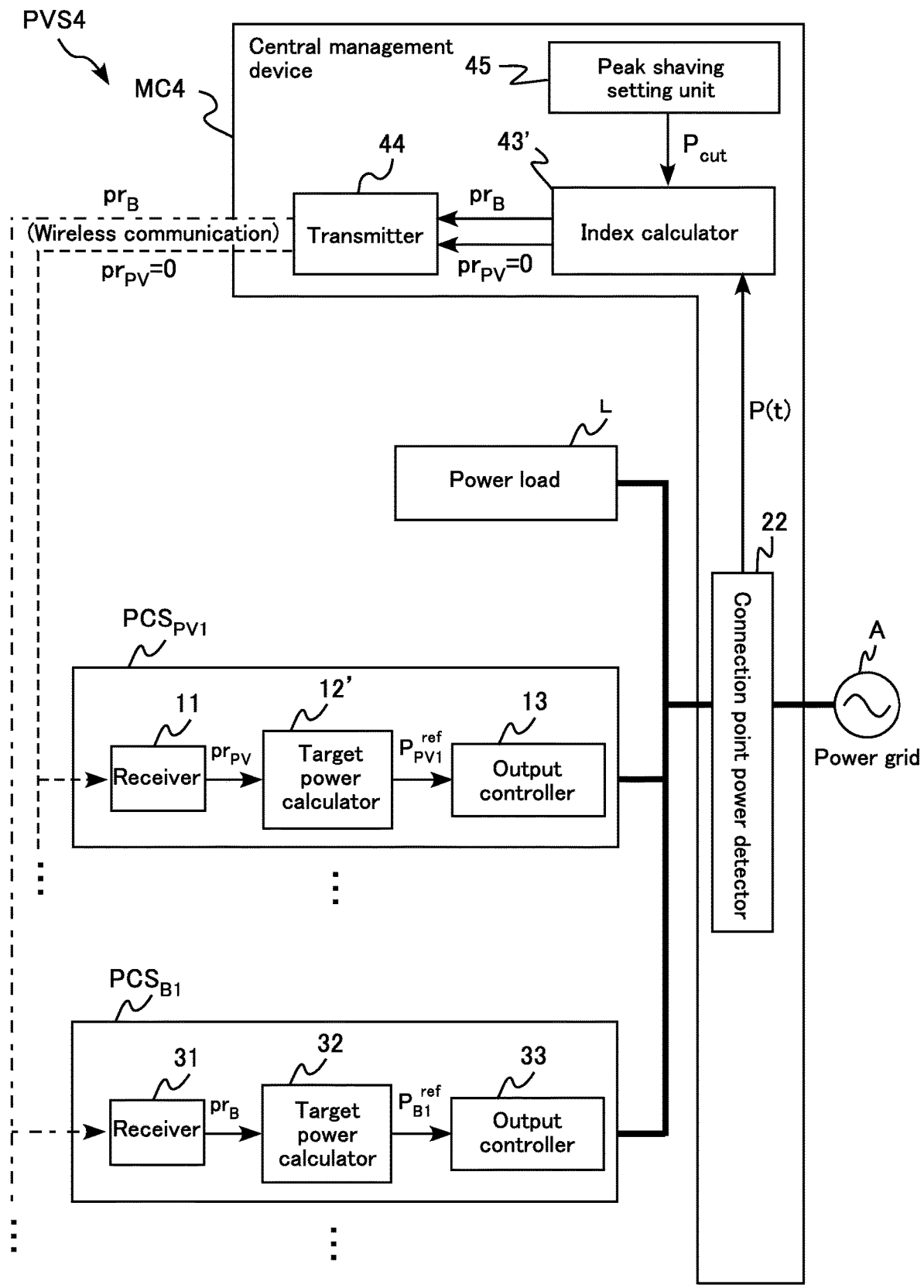
FIG. 19 shows the functional structure for a peak shaving control of a photovoltaic power generation system according to a fourth embodiment.

FIG. 19 shows a photovoltaic power generation system PVS4 according to a fourth embodiment. Although the photovoltaic power generation system PVS4 includes a plurality of power conditioners $PCS_{PVi}$ and $PCS_{Bk}$, FIG. 19 shows only the first ones of the respective groups of power conditioners $PCS_{PVi}$ and $PCS_{Bk}$, similarly to FIG. 18. Also, the overall structure of the photovoltaic power generation system PVS4 is substantially the same as the photovoltaic power generation system PVS3 (see FIG. 17) according to the third embodiment. In the third embodiment, it is assumed that the individual output powers $P_{PVi}^{out}$ of the power conditioners $PCS_{PV1}$ (the power generation amounts $P_i^{SP}$ of the solar cells $SP_i$) are larger than the consumed power of the power load L. In the fourth embodiment, however, the sum $\Sigma P_{PVi}^{out}$ of the individual output powers $P_{PVi}^{out}$ of the power conditioners $PCS_{PVi}$ (power generation amounts $P_i^{SP}$ of the solar cells $SP_i$) is lower than the consumed power of the power load L. In other words, part or all of required power that is the amount of power insufficient with the power generation amounts $P_i^{SP}$ of the solar cells $SP_i$ is supplied from the power grid A. The required power is a difference between the sum $\Sigma P_{PVi}^{out}$ of the individual output powers $P_{PVi}^{out}$ and the consumed power.

In the photovoltaic power generation system PVS4 as described above, it is necessary to purchase power from the power company in order to supply the required power from the power grid A. For the purchase of power, an electricity bill is paid to the power company. The electricity bill includes a basic charge and a usage-based charge. The basic charge is determined by the maximum value (peak value) of the amount of power usage which is recorded, for example, every 30 minutes by a power meter provided at the connection point. Specifically, when the peak value of the amount of power usage is larger, the basic charge is higher, and when the peak value of the amount of power usage is lower, the basic charge is lower. In view of this, in the photovoltaic power generation system PVS4 according to the fourth embodiment, each of the power conditioners $PCS_{PVi}$ and $PCS_{Bk}$ suppresses the peak value of the power (purchased power) supplied from the power grid A by performing a dispersive control with use of the suppression index $pr_{pv}$ and the charge/discharge index $pr_B$. This control is referred to as "peak shaving control". Note that the purchased power is the amount of power supplied from the power grid A to the photovoltaic power generation system PVS4, i.e., power obtained (purchased) by the photovoltaic power generation system PVS4 from the power grid A. As described above, the connection point power P(t) takes a positive value when the power is output from the photovoltaic power generation system PVS4 to the power grid A (when flowing in reverse). Accordingly, the connection point power P(t) takes a negative value when the power is input from the power grid A to the photovoltaic power generation system PVS4. During the peak shaving control for controlling the purchased power, a target value is set to a negative value, and a control is performed such that the connection point power P(t) does not fall below the target value.

During the peak shaving control, the photovoltaic power generation system PVS4 controls the individual output powers $P_{PVi}^{out}$ of the power conditioners $PCS_{PVi}$, and outputs all powers generated by the solar cells $SP_i$. The photovoltaic power generation system PVS4 also controls the individual output powers $P_{Bk}^{out}$ of the power conditioners $PCS_{Bk}$, and discharges powers accumulated in the storage cells $B_k$ as necessary. In this way, part of the power consumed by the power load L is supplemented by the powers generated by the solar cells $SP_i$ and the powers accumulated in the storage cells $B_k$, whereby an increase in the above-described purchased power is suppressed. For the peak shaving control, the central management device MC4 is different from the central management device MC2 according to the second embodiment in the following points, as shown in FIG. 19. That is, the central management device MC4 includes a peak shaving setting unit 45 instead of the output command value acquisition unit 21, and an index calculator 43' instead of the index calculator 43.

The peak shaving setting unit 45 performs various settings for the peak shaving control. In the present embodiment, the peak shaving setting unit 45 sets the upper limit value of purchased power to a negative value, and sets the peak shaving target power $P_{out}$ based on the upper limit value. The peak shaving target power $P_{out}$ takes a negative value, and this value is a target value of the connection point power P(t). The peak shaving target power $P_{out}$ is freely set by a user. The peak shaving setting unit 45 outputs the peak shaving target power $P_{out}$ thus set to the index calculator 43'.

As compared to the index calculator 43 according to the second embodiment, the index calculator 43' calculates the suppression index $pr_{pv}$ and the charge/discharge index $pr_B$ with use of the peak shaving target power $P_{out}$ input from the peak shaving setting unit 45, instead of using the output command value $P^C$. That is, in the present embodiment, the index calculator 43' calculates the suppression index $pr_{pv}$ and the charge/discharge index $pr_B$ to regulate the connection point power P (t) to the peak shaving target power $P_{out}$. At this time, the index calculator 43' calculates a Lagrange multiplier λ with use of the peak shaving target power $P_{out}$, instead of the output command value $P^C(t)$ in the above formula (21). Then, the index calculator 43' calculates the calculated Lagrange multiplier λ as the charge/discharge index $pr_B$, with use of the above formula (22). Note that a fixed value of "0" is used for the suppression index $pr_{pv}$ so that all powers generated by the solar cells $SP_i$ are output from the power conditioners $PCS_{PVi}$. Accordingly, it can also be said that the index calculator 43' only calculates the charge/discharge index $pr_B$. The index calculator 43' transmits the calculated suppression index $pr_{pv}$ to the power conditioners $PCS_{PVi}$ via a transmitter 44. The index calculator 43' also transmits the calculated charge/discharge index $pr_B$ to the power conditioners $PCS_{Bk}$ via the transmitter 44.

In the photovoltaic power generation system PVS4 having the structure described above, the central management device MC4 monitors the connection point power P(t) detected by a connection point power detector 22. When the connection point power P(t) is less than or equal to the peak shaving target power $P_{out}$, the index calculator 43' calculates the suppression index $pr_{pv}$ (=0) and the charge/discharge index $pr_B$, which are used for regulating the connection point power P(t) to the peak shaving target power $P_{out}$. Each of the power conditioners $PCS_{PVi}$ calculates the individual target power $P_{PVi}^{ref}$ based on the optimization problem that uses the suppression index $pr_{pv}$ calculated by the central management device MC4, and regulates the individual output power $P_{PVi}^{out}$ to the individual target power $P_{PVi}^{ref}$. Each of the power conditioners $PCS_{Bk}$ calculates the individual target power $P_{Bk}^{ref}$ based on the optimization problem that uses the charge/discharge index $pr_B$ calculated by the central management device MC4, and regulates the individual output power $P_{Bk}^{out}$ to the individual target power $P_{Bk}^{ref}$. With the above control, when the connection point power P(t) is less than or equal to the peak shaving target power $P_{out}$, the powers generated by the solar cells $SP_i$ are all output and the powers accumulated in the storage cells $B_k$ are all discharged. As a result, the connection point power P(t) is raised to match with the peak shaving target power $P_{out}$. In this way, the photovoltaic power generation system PVS4 suppresses the peak value by preventing the connection point power P(t) from being less than or equal to the peak shaving target power $P_{out}$.

Note that the central management device MC4 regulates the connection point power P(t) to the peak shaving target power $P_{out}$ when the connection point power P(t) is less than or equal to the preset peak shaving target power $P_{out}$. Accordingly, the connection point power P (t) may momentarily fall below the peak shaving target power $P_{out}$, depending on the detection intervals of the connection point power P(t) or the calculation intervals of the suppression index $pr_{pv}$ and the charge/discharge index $pr_B$. Accordingly, at the time of setting the upper limit value of the purchased power, a value can be set that is smaller than the upper limit value desired by a user by a predetermined value. In this way, the peak shaving target power $P_{out}$ is set to have a value larger than the actual target value. As a result, even if the connection point power P(t) momentarily drops, it is prevented from being less than or equal to the peak shaving target power $P_{out}$.

Based on the above, the photovoltaic power generation system PVS4 according to the present embodiment can regulate the connection point power P(t) to the target power (peak shaving target power $P_{out}$), even if the peak shaving target power $P_{out}$ set by the peak shaving setting unit 45 is used as the target power of the connection point power P(t) instead of the output command value $P^C$. Furthermore, since the power conditioners $PCS_{PVi}$ and $PCS_{Bk}$ dispersively calculate the individual target powers $P_{PVi}^{ref}$ and $P_{Bk}^{ref}$, the processing load of the central management device MC4 can be reduced.

In the fourth embodiment, the powers accumulated in the storage cells $B_k$ are decreased during the peak shaving control, due to the prioritization of discharge of the storage cells $B_k$. Accordingly, when a predetermined charging condition is satisfied, the storage cells $B_k$ may be charged with part of the power supplied from the power grid A. Examples of the charging condition include the case where the connection point power P(t) is greater than the peak shaving target power $P_{out}$ by at least a threshold value. This makes it possible to charge the storage cells $B_k$ in preparation for the next peak shaving control.

In the control for charging the storage cells $B_k$, it is possible to determine whether to perform charging or not, or whether to change the charging speed for each predetermined time zone. For example, a charge operation mode can be set for each predetermined time zone. In this way, a control for the charging of the storage cells $B_k$ can be performed depending on the charge operation mode. Examples of the charge operation mode include non-charging mode, a normal charging mode, and a low-speed charging mode. During the non-charging mode, charging is not performed. During the normal charging mode, charging is performed at a predetermined charging speed (normal speed). During the low-speed charging mode, charging is performed at a predetermined speed lower than the normal speed (low speed). Note that the charge operation modes are not limited to those described above. A user can set the charge operation mode via a user interface or the like of the central management device MC4, and the peak shaving setting unit 45 sets the charge operation mode according to an operation instruction from the user. The predetermined time zones are obtained by dividing a day into a plurality of time periods. For example, when a day is divided into hours, the charge operation mode can be set for each of 24 time zones, and when a day is divided into units of 30 minutes, the charge operation mode can be set for each of 48 time zones. It is possible to divide a day into time periods such as morning, daytime, evening, night, and late night. It is also possible to provide predetermined time zones on a per-week basis, instead of a per-day basis.

Specifically, the central management device MC4 transmits, to the power conditioners $PCS_{Bk}$ via the transmitter 44, charge operation mode setting information set by the peak shaving setting unit 45. Each of the power conditioners $PCS_{Bk}$ receives the charge operation mode setting information via a receiver 31, and changes the C rate constraint (charge rated output $P_{SMk}^{Imt}$) of the storage cell $B_k$ shown in the above formula (20c') with use of the charge rate $C_{rate}^{M}$ associated with the charge operation mode that has been set. For example, the charge rate $C_{rate}^{M}$ for the normal charging mode may be set to 0.3, the charge rate $C_{rate}^{M}$ for the low-speed charging mode to 0.1, and the charge rate $C_{rate}^{M}$ for the non-charging mode to 0. Each of the power conditioners $PCS_{sk}$ can determine whether to charge the storage cell $B_k$, or whether to change the charging speed thereof, according to the setting of the charge operation mode, by calculating the individual target power $P_{Bk}^{ref}$ based on the optimization problem shown in the above formula (20'). Note that the charging speed may be variable so that the storage cell $B_k$ is fully charged during a series of time zones in which the low-speed charging mode is set. For example, when "low-speed charging mode" is set in series from midnight to 6 a.m., the charging speed is set such that the storage cell $B_k$ is fully charged over six hours. Specifically, the charge rate $C_{rate}^{M}$ is set to ⅙ ($\approx$0.167). It is desirable that the charging speed not exceed the normal speed. In this way, whether to charge the storage cell $B_k$ or whether to change the charging speed thereof may be appropriately determined according to the charge operation mode. Accordingly, in the case where the power unit rate of the usage-based charge (for purchased power) changes depending on a time zone, it is possible to purchase more power during a time zone with a lower power unit rate and to purchase less power during a time zone with a higher power unit rate.

In the fourth embodiment, the photovoltaic power generation system PVS4 includes the plurality of power conditioners $PCS_{PVi}$ connected to the solar cells $SP_i$. However, these components may be omitted. In other words, the photovoltaic power generation system PVS4 may be made up of the plurality of power conditioners $PCS_{Bk}$ connected to the storage cells $B_k$, the power load L, and the central management device MC4.

Figure 20:
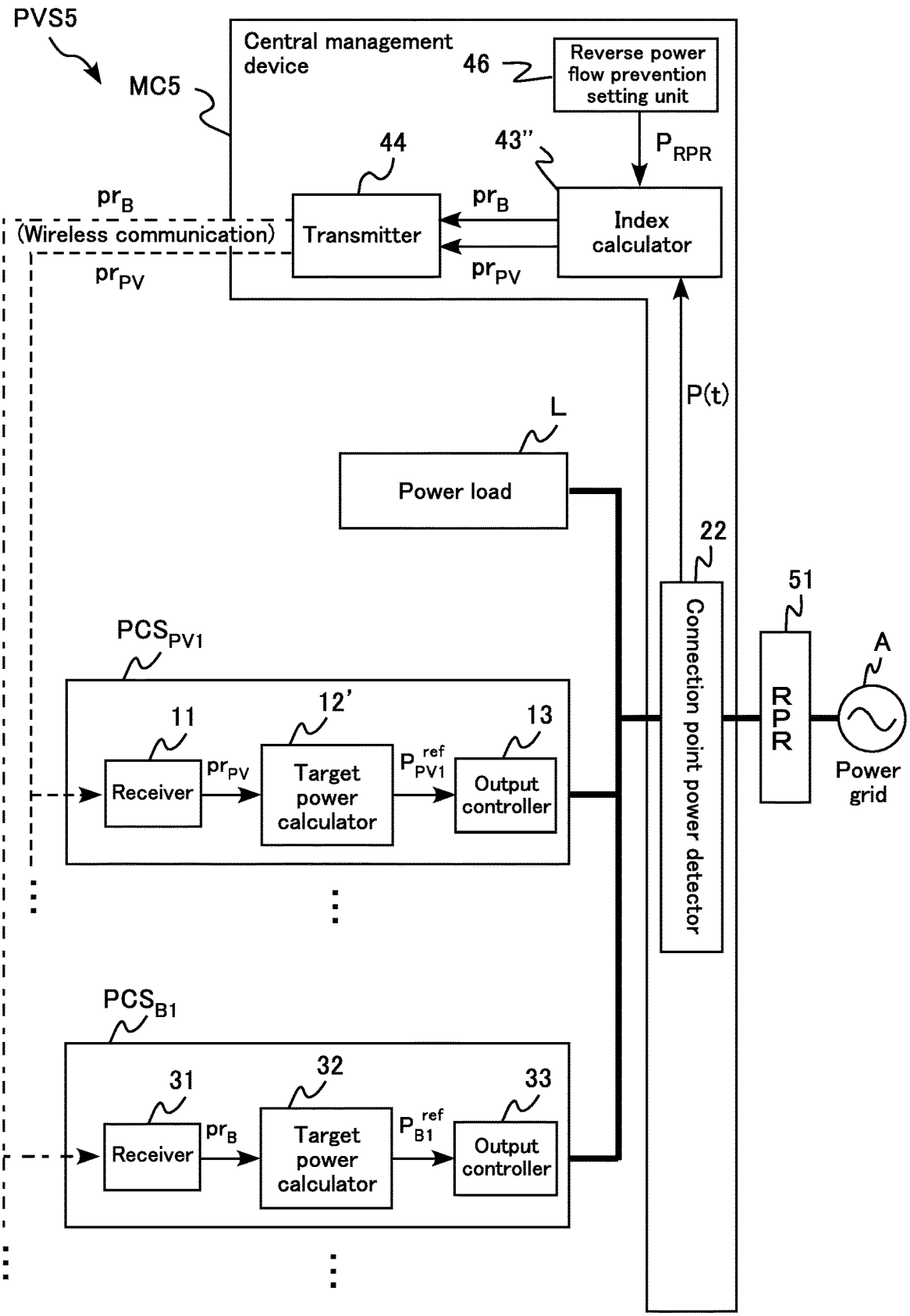
FIG. 20 shows the functional structure for a reverse power flow prevention control of a photovoltaic power generation system according to a fifth embodiment.

FIG. 20 shows a photovoltaic power generation system PVS5 according to a fifth embodiment. Although the photovoltaic power generation system PVS5 includes a plurality of power conditioners $PCS_{PVi}$ and $PCS_{Bk}$, FIG. 20 shows only the first ones of the respective groups of power conditioners $PCS_{PVi}$ and $PCS_{Bk}$, similarly to FIG. 18. Also, the overall structure of the photovoltaic power generation system PVS5 is substantially the same as the photovoltaic power generation system PVS3 (see FIG. 17) according to the third embodiment. Although it is allowed to cause surplus power to flow back in the third embodiment, reverse power flow is prohibited in the fifth embodiment.

It is necessary for the photovoltaic power generation system PVS5 in which reverse power flow is prohibited to include an RPR (reverse power relay) 51 at the connection point to the power grid A. The RPR 51 is a type of relay. Upon detecting the occurrence of reverse power flow from the photovoltaic power generation system PVS5 to the power grid A, the RPR51 shuts off the photovoltaic power generation system PVS5 from the power grid A. Once the photovoltaic power generation system PVS5 is shut off, the recovery of the system will take time because it is necessary to call a specialist. For example, the power consumption of the power load L decreases when the power load L is low due to a non-operation day of a factory or the like. Accordingly, if the weather is fine on a non-operation day of the factory, the power generation amounts $P_i^{SP}$ of the solar cells $SP_i$ may exceed the power consumption of the power load L, causing the occurrence of reverse power flow. To address this, each of the power conditioners $PCS_{PVi}$ and $PCS_{Bk}$ in the photovoltaic power generation system PVS5 according to the fifth embodiment performs a dispersive control with use of the suppression index $pr_{pv}$ or the charge/discharge index $pr_B$, thereby to prevent the occurrence of reverse power flow. This is referred to as "reverse power flow prevention control". When the connection point power P(t) has a positive value, power flows in reverse. Accordingly, it suffices to maintain the connection point power P(t) at a negative value so as to prevent the connection point power P(t) from taking a positive value and to avoid reverse power flow.

The photovoltaic power generation system PVS5 suppresses the individual output powers $P_{PVi}^{out}$ of the power conditioners $PCS_{PVi}$ during the reverse power flow prevention control. The photovoltaic power generation system PVS5 also controls the individual output powers $P_{Bk}^{out}$ of the power conditioners $PCS_{Bk}$ to charge the storage cells $B_k$. In this way, power is always supplied from the power grid A to the photovoltaic power generation system PVS5, and not the other way around. This means that the connection point power P(t) is maintained at a negative value and prevented from having a positive value. As a result, the occurrence of reverse power flow is prevented. For the reverse power flow prevent ion control, the central management device MC5 is different from the central management device MC2 according to the second embodiment in the following points, as shown in FIG. 20. That is, the central management device MC5 includes a reverse power flow prevention setting unit 46 instead of the output command value acquisition unit 21, and an index calculator 43" instead of the index calculator 43.

The reverse power flow prevention setting unit 46 performs various settings for the reverse power flow prevention control. In the present embodiment, the reverse power flow prevention setting unit 46 sets a reverse power flow prevention target power $P_{RPR}$ for preventing the occurrence of reverse power flow. The reverse power flow prevention target power $P_{RPR}$ takes a negative value, and this value is the target value of the connection point power P(t). The reverse power flow prevention target power $P_{RPR}$ is freely set by a user. The reverse power flow prevention setting unit 46 outputs the reverse power flow prevention target power $P_{RPR}$ thus set to the index calculator 43".

The index calculator 43" calculates the suppression index $pr_{pv}$ and the charge/discharge index $pr_B$ for regulating the connection point power P(t) to the reverse power flow prevention target power $P_{RPR}$. That is, in the present embodiment, the index calculator 43" calculates the suppression index $pr_{pv}$ and the charge/discharge index $pr_B$ with use of the reverse power flow prevention target power $P_{RPR}$ input from the reverse power flow prevention setting unit 46, instead of using the output command value $P^C$, as compared to the index calculator 43 according to the second embodiment. Specifically, the index calculator 43" calculates a Lagrange multiplier λ with use of the reverse power flow prevention target power $P_{RPR}$, instead of the output command value $P^C(t)$ in the above formula (21). Then, the index calculator 43" calculates the calculated Lagrange multiplier λ as the suppression index $pr_{pv}$ and the charge/discharge index $pr_B$, with use of the above formula (22). The index calculator 43" transmits the calculated suppression index $pr_{pv}$ to the power conditioners $PCS_{PVi}$ via a transmitter 44. The index calculator 43" also transmits the calculated charge/discharge index $pr_B$ to the power conditioners $PCS_{Bk}$ via the transmitter 44.

In the photovoltaic power generation system PVS5 having the structure described above, the central management device MC5 monitors the connection point power P(t) detected by a connection point power detector 22. The index calculator 43" calculates the suppression index $pr_{pv}$ and the charge/discharge index $pr_B$ for regulating the connection point power P(t) to the reverse power flow prevention target power $P_{RPR}$, when the connection point power P(t) is larger than or equal to the reverse power flow prevention target power $P_{RPR}$. Each of the power conditioners $PCS_{PVi}$ calculates the individual target power $P_{PVi}^{ref}$ based on the optimization problem that uses the suppression index $pr_{pv}$ calculated by the central management device MC5, and regulates the individual output power $P_{PVi}^{out}$ to the individual target power $P_{PVi}^{ref}$. Each of the power conditioners $PCS_{Bk}$ calculates the individual target power $P_{Bk}^{ref}$ based on the optimization problem that uses the charge/discharge index $pr_B$ calculated by the central management device MC5, and regulates the individual output power $P_{Bk}^{out}$ to the individual target power $P_{Bk}^{ref}$. As a result, the connection point power P(t) is regulated to the reverse power flow prevention target power $P_{RPR}$, and the occurrence of reverse power flow is thereby prevented. In other words, the RPR51 is prevented from operating due to reverse power flow.

Suppose that the setting value of the reverse power flow prevention target power $P_{RPR}$ is 0 (or nearly 0). In this case, when the connection point power P(t) momentarily rises, the connection point power P(t) may take a positive value depending on the detection intervals of the connection point power P(t) or the calculation intervals of the suppression index $pr_{pv}$ and the charge/discharge index $pr_B$. As a result, reverse power flow may occur. Accordingly, it is preferable to set the reverse power flow prevention target power $P_{RPR}$ to a value smaller than 0 by at least a predetermined value. In this way, even if the connection point power P(t) momentarily rises, it is prevented from exceeding 0 since the reverse power flow prevention target power $P_{RPR}$ is smaller than 0. As a result, the occurrence of reverse power flow can be prevented.

Based on the above, the photovoltaic power generation system PVS5 according to the present embodiment can regulate the connection point power P(t) to the target power (reverse power flow prevention target power $P_{RPR}$), even if the reverse power flow prevention target power $P_{RPR}$ set by the reverse power flow prevention setting unit 46 is used as the target power of the connection point power P(t) instead of the output command value $P^C$. Furthermore, since the power conditioners $PCS_{PVi}$ and $PCS_{Bk}$ dispersively calculate the individual target powers $P_{PVi}^{ref}$ and $P_{Bk}^{ref}$, the processing load of the central management device MC4 can be reduced.

In the fifth embodiment, charging of the storage cells $B_k$ is prioritized during the reverse power flow prevention control. Because of this, power is accumulated in the storage cells $B_k$. Accordingly, the storage cells $B_k$ may be discharged when a predetermined discharging condition is satisfied. Examples of the discharging condition include the case where the connection point power P(t) is smaller than the reverse power flow prevention target power $P_{RPR}$ by at least a threshold value. This makes it possible to discharge the storage cells $B_k$ in preparation for the next reverse power flow prevention control.

In the control for discharging the storage cells $B_k$, it is possible to determine whether to perform discharging or not for each predetermined time zone. For example, a discharge operation mode can be set for each predetermined time zone. Then, whether to discharge the storage cells $B_k$ can be controlled depending on the discharge operation mode. Examples of the discharge operation mode include a discharging mode and a non-discharging mode. During the discharging mode, discharging is performed. During the non-discharging mode, discharging is not performed. Note that the discharge operation modes are not limited to those described above. A user can set the discharge operation mode via a user interface or the like of the central management device MC5, and the reverse power flow prevention setting unit 46 sets the discharge operation mode according to an operation instruction from the user. The predetermined time zones may be the same as or different from the predetermined time zones for the peak shaving control described above.

Specifically, the central management device MC5 transmits, to the power conditioners $PCS_{Bk}$ via the transmitter 44, discharge operation mode setting information set by the reverse power flow prevention setting unit 46. Each of the power conditioners $PCS_{Bk}$ receives the discharge operation mode setting information via the receiver 31, and changes the C rate constraint (discharge rated output $P_{SPk}^{lmt}$) of the storage cell $B_k$ shown in the above formula (20c') with use of the discharge rate $C_{rate}^P$ associated with the discharge operation mode that has been set. For example, the discharge rate $C_{rate}^P$ for the discharging mode may be set to 0.3, and the discharge rate $C_{rate}^P$ for the non-charging mode to 0. Each of the power conditioners $PCS_{Bk}$ can determine whether to discharge the storage cell $B_k$ according to the setting of the discharge operation mode, by calculating the individual target power $P_{Bk}^{ref}$ based on the optimization problem shown in the above formula (20'). In this way, whether to discharge the storage cell $B_k$ may be appropriately determined according to the discharge operation mode. This makes it possible to prevent discharge of the storage cells $B_k$ to accumulate power therein as necessary.

In the fifth embodiment, the photovoltaic power generation system PVSS includes the plurality of power conditioners $PCS_{Bk}$ connected to the storage cells $B_k$. However, these components may be omitted. In other words, the photovoltaic power generation system PVSS may be made up of the plurality of power conditioners $PCS_{PVi}$ connected to the solar cells $SP_i$, the power load L, and the central management device MC5. In this case, the photovoltaic power generation system PVSS regulates the connection point power P(t) to the reverse power flow prevention target power $P_{RPR}$ that has been set, only through suppression of the individual output powers $P_{PVi}^{out}$ from the power conditioners $PCS_{PVi}$ during the reverse power flow prevention control.

In the third to fifth embodiments, the photovoltaic power generation systems PVS3, PVS4, and PVS5 respectively implement the connection point power suppression control, the peak shaving control, and the reverse power flow prevention control. However, these controls may be combined with each other. In this case, the central management device may switch between the controls as necessary. For example, the switching may be performed in response to an operation of a user, or the switching may be performed automatically based on a situation (whether the connection point power P(t) takes a positive value or a negative value (whether the power is flowing back or not), whether reverse power flow is prohibited, the history of the power consumption of the power load L, or the operation days of the power load L).

In the first to fifth embodiments, the connection point power P(t), which is detected by the connection point power detector 22, is regulated to a target power (the output command value $P^C$, the peak shaving target power $P_{out}$, or the reverse power flow prevention target power $P_{RPR}$). However, other examples are conceivable. As one example, the central management device may acquire the individual output powers $P_i^{out}$, $P_{PVi}^{out}$, and $P_{Bk}^{out}$ from the power conditioners $PCS_i$, $PCS_{PVi}$, and $PCS_{Bk}$, respectively, and may perform control so that the sum of the acquired individual output powers $PCS_i$, $PCS_{PVi}$, and $PCS_{Bk}$ (hereinafter "system total output") match with the target power. Such an embodiment will be described below with reference to FIGS. 21 to 25.

Figure 21:
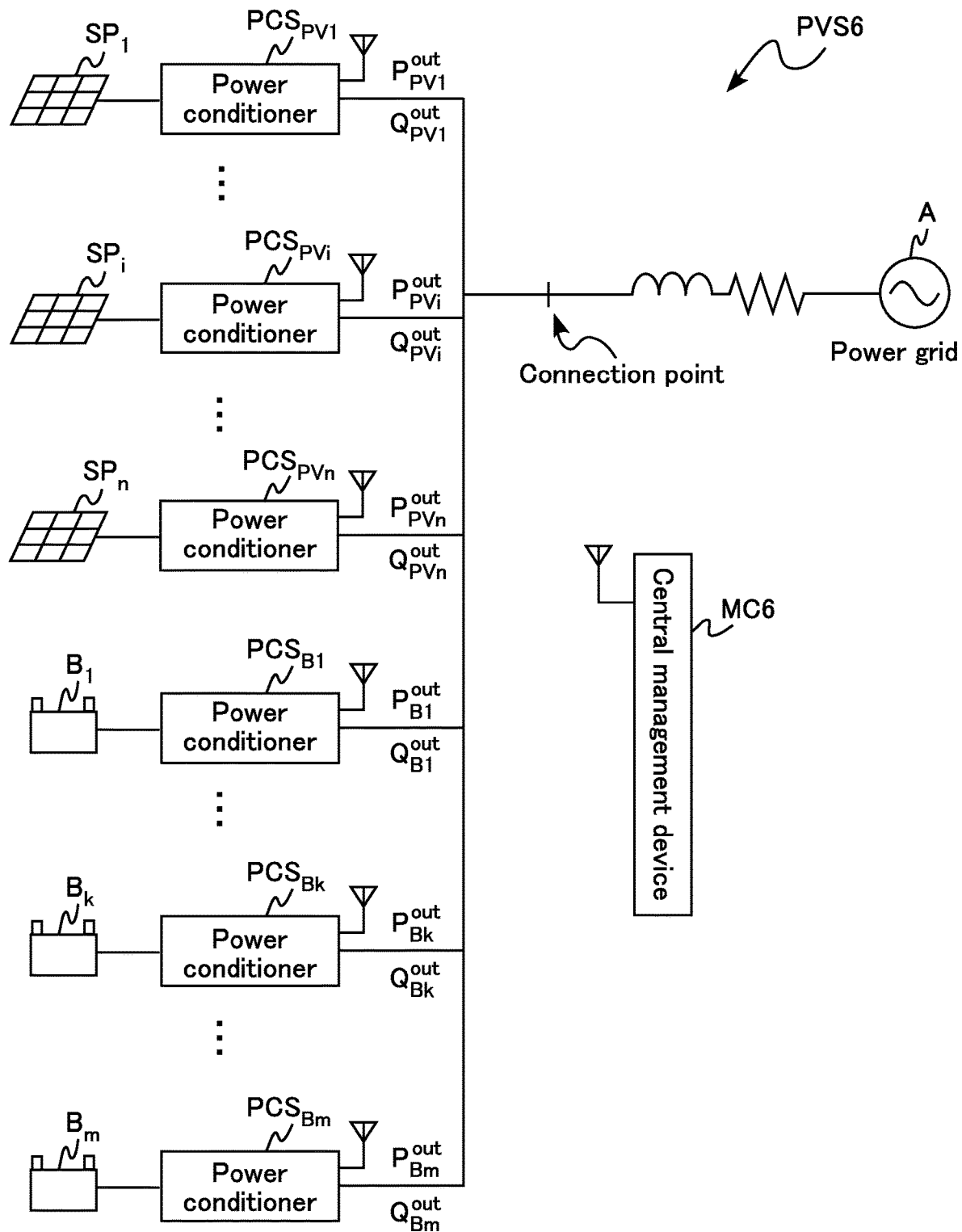
FIG. 21 shows the overall structure of a photovoltaic power generation system according to a sixth embodiment.
Figure 22:
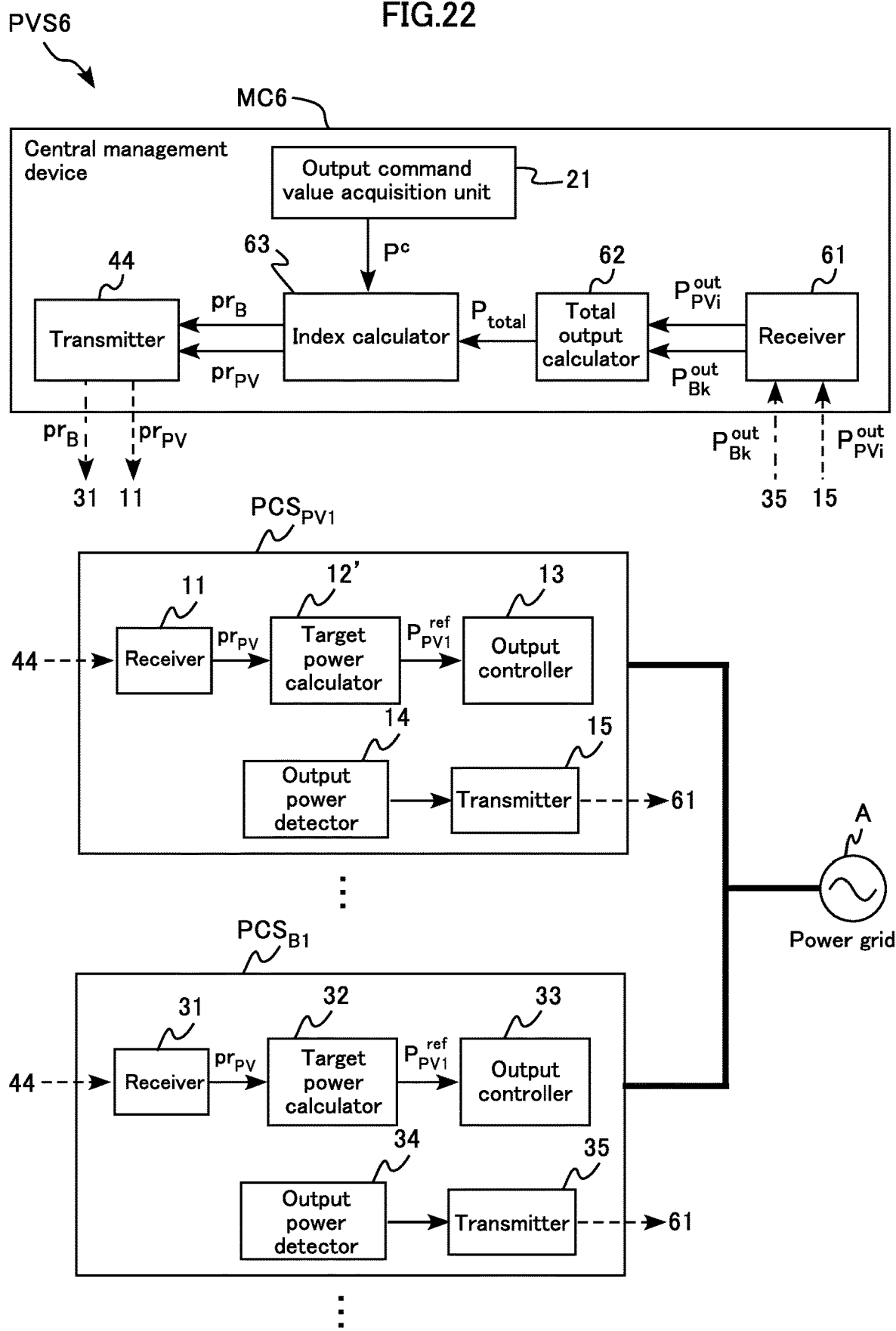
FIG. 22 shows the functional structure for a system total output suppression control of the photovoltaic power generation system according to the sixth embodiment.

FIGS. 21 and 22 show a photovoltaic power generation system PVS6 according to a sixth embodiment. FIG. 21 shows the overall structure of the photovoltaic power generation system PVS6. FIG. 22 shows the functional structure of a control system in the photovoltaic power generation system PVS6 in FIG. 21, where the control system controls a system total output. Although the photovoltaic power generation system PVS6 includes a plurality of power conditioners $PCS_{PVi}$ and $PCS_{Bk}$, FIG. 22 shows only the first ones of the respective groups of power conditioners $PCS_{PVi}$ and $PCS_{Bk}$, similarly to FIG. 18.

Instead of detecting the connection point power P(t), the photovoltaic power generation system PVS6 according to the sixth embodiment calculates the sum (system total output $P_{total}(t)$) of all the individual output powers $P_{PVi}^{out}$ and $P_{Bk}^{out}$ of the power conditioners $PCS_{PVi}$, and $PCS_{Bk}$, and regulates the system total output $P_{total}(t)$ to the output command value $P^C$ specified by the power company. In other words, according to the sixth embodiment, the system total output $P_{total}(t)$ is regarded as the regulation subject power, and the output command value $P^C$ is regarded as the target power of the system total output $P_{total}(t)$. Note that the control performed by the photovoltaic power generation system PVS6 in the present embodiment is referred to as "system total output suppression control".

As shown in FIGS. 21 and 22, the photovoltaic power generation system PVS6 is different from the photovoltaic power generation system PVS2 according to the second embodiment in the following points. That is, the central management device MC6 does not include the connection point power detector 22, but instead includes a structure for acquiring the individual output powers $P_{PVi}^{out}$ and $P_{Bk}^{out}$ from the power conditioners $PCS_{PVi}$ and $PCS_{Bk}$. Specifically, each of the power conditioners $PCS_{PVi}$ further includes an output power detector 14 and a transmitter 15, and each of the power conditioners $PCS_{Bk}$ further includes an output power detector 34 and a transmitter 35. Also, the central management device MC6 includes a receiver 61, a total output calculator 62, and an index calculator 63, instead of the connection point power detector 22 and the index calculator 43.

The output power detector 14 is included in the power conditioner $PCS_{PVi}$, and detects the individual output power $P_{PVi}^{out}$ of the power conditioner $PCS_{PVi}$. The output power detector 34 is included in the power conditioner $PCS_{Bk}$, and detects the individual output power $P_{Bk}^{out}$ of the power conditioner $PCS_{Bk}$.

The transmitter 15 transmits the individual output power $P_{PVi}^{out}$ detected by the output power detector 14 to the central management device MC6. The transmitter 35 transmits the individual output power $P_{Bk}^{out}$ detected by the output power detector 34 to the central management device MC6.

The receiver 61 receives the individual output powers $P_{PVi}^{out}$ and $P_{Bk}^{out}$ transmitted from the power conditioners $PCS_{PVi}$ and $PCS_{Bk}$.

The total output calculator 62 calculates the system total output $P_{total}(t)$ which is the sum of the individual output powers $P_{PVi}^{out}$ and $P_{Bk}^{out}$ received by the receiver 61. In the present embodiment, the total output calculator 62 calculates the system total output $P_{total}(t)$ by summing up all the received individual output powers $P_{PVi}^{out}$ and $P_{Bk}^{out}$.

The index calculator 63 calculates the suppression index $pr_{pv}$ and the charge/discharge index $pr_B$, which are used to regulate the system total output by the total output $P_{total}(t)$ calculated calculator 62 to the output command value $P^C$. At this time, the index calculator 63 calculates a Lagrange multiplier $\lambda$ with use of the system total output $P_{total}(t)$, instead of the connection point power P(t) in the above formula (21). Then, the index calculator 63 calculates the calculated Lagrange multiplier $\lambda$ as the suppression index $pr_{pv}$ and the charge/discharge index $pr_B$, with use of the above formula (22). The index calculator 63 transmits the calculated suppression index $pr_{pv}$ to the power conditioners $PCS_{PVi}$ via a transmitter 44. The index calculator 63 also transmits the calculated charge/discharge index $pr_B$ to the power conditioners $PCS_{Bk}$ via the transmitter 44.

Based on the above, the photovoltaic power generation system PVS6 according to the present embodiment can regulate the system total output $P_{total}(t)$ to the target power (output command value $P^C$), even if the system total output $P_{total}(t)$ is used as the regulation subject power instead of the connection point power P(t) according to the second embodiment. Furthermore, since the power conditioners $PCS_{PVi}$ and $PCS_{Bk}$ dispersively calculate the individual target powers $P_{PVi}^{ref}$ and $P_{Bk}^{ref}$, the processing load of the central management device MC6 can be reduced.

The photovoltaic power generation system PVS6 in the sixth embodiment differs from the photovoltaic power generation system PVS2 in the second embodiment in that the system total output $P_{total}(t)$ is regulated to the output command value $P^C$. Note that this same control may be performed in the photovoltaic power generation system PVS1 according to the first embodiment. That is, in the photovoltaic power generation system PVS1 according to the first embodiment, the system total output $P_{total}(t)$, instead of the connection point power P(t), can be regulated to the output command value. This also allows for the system total output suppression control with use of the suppression index pr. In this case as well, the processing load of the central management device can be reduced while the system total output $P_{total}(t)$ is matched with the target power (output command value $P^C$).

In the sixth embodiment, the photovoltaic power generation system PVS6 includes the power conditioners $PCS_{PVi}$ and $PCS_{Bk}$ that are connected to the connection point. However, the photovoltaic power generation system PVS6 may further include the power load L, similarly to the examples described in the third to firth embodiments.

Figure 23:
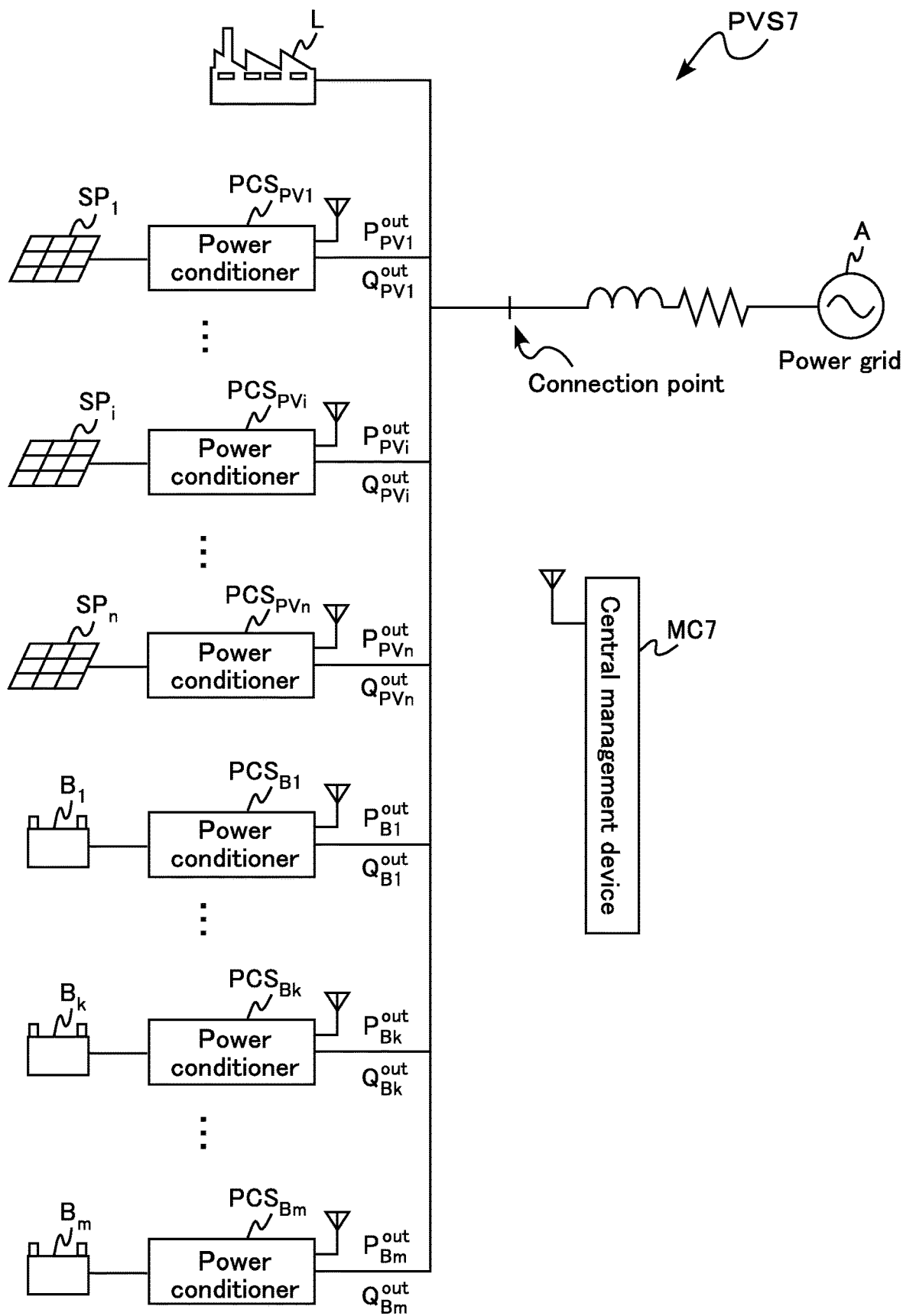
FIG. 23 shows the overall structure of a photovoltaic power generation system according to a seventh embodiment.
Figure 24:
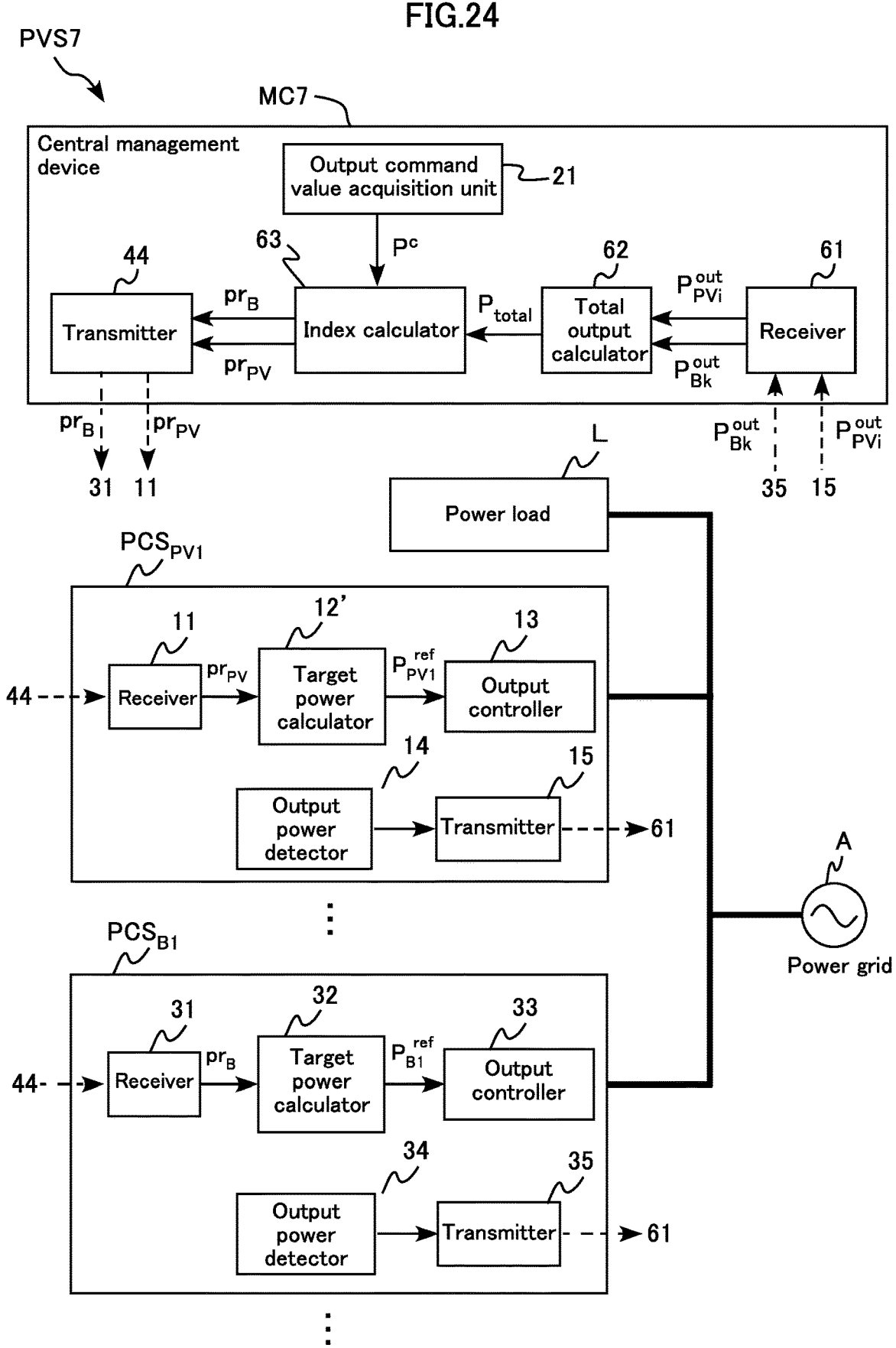
FIG. 24 shows the functional structure for a system total output suppression control of the photovoltaic power generation system according to the seventh embodiment.

FIGS. 23 and 24 show a photovoltaic power generation system PVS7 according to a seventh embodiment. FIG. 23 shows the overall structure of the photovoltaic power generation system PVS7. FIG. 24 shows the functional structure of a control system in the photovoltaic power generation system PVS7 in FIG. 23, where the control system controls a system total output. Although the photovoltaic power generation system PVS7 includes a plurality of power conditioners $PCS_{PVi}$ and $PCS_{Bk}$, FIG. 24 shows only the first ones of the respective groups of power conditioners $PCS_{PVi}$ and $PCS_{Bk}$, similarly to FIG. 18.

As shown in FIGS. 23 and 24, the photovoltaic power generation system PVS7 is different from the photovoltaic power generation system PVS6 according to the sixth embodiment in that the power load L is also connected to the connection point. Even in this case, the system total output suppression control using the suppression index $pr_{pv}$ and the charge/discharge index $pr_B$ can be performed, based on the calculated system total output $P_{total}(t)$, similarly to the sixth embodiment. Accordingly, the processing load of a central management device MC7 can be reduced while the system total output $P_{total}(t)$ is matched with the output command value $P^C$, similarly to the sixth embodiment.

In the seventh embodiment, the power load L is added to the photovoltaic power generation system PVS6 according to the sixth embodiment. However, the power load L can be added to the photovoltaic power generation system PVS1, and the system total output $P_{total}(t)$, instead of the connection point power P(t), can be regulated to the output command value $P^C$. This also allows for the system total output suppression control with the suppression index pr. In this case as well, the processing load of the central management device can be reduced while the system total output $P_{total}(t)$ is matched with the target power (output command value $P^C$).

Figure 25:
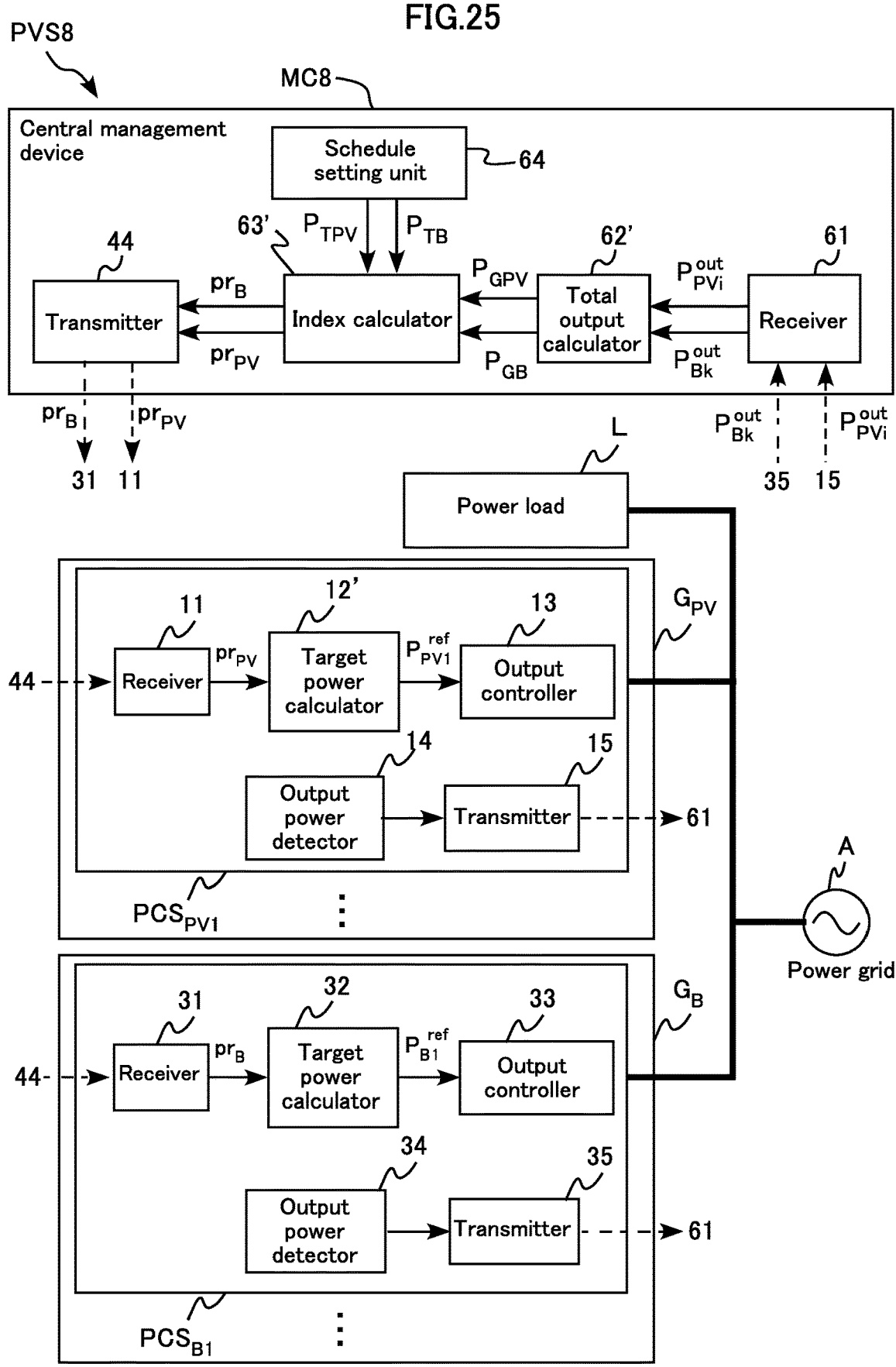
FIG. 25 shows the functional structure for a schedule control of a photovoltaic power generation system according to an eighth embodiment.

FIG. 25 shows a photovoltaic power generation system PVS8 according to an eighth embodiment. Although the photovoltaic power generation system PVS8 includes a plurality of power conditioners $PCS_{Pvi}$ and $PCS_{Bk}$, FIG. 25 shows only the first ones of the respective groups of power conditioners $PCS_{Pvi}$ and $PCS_{Bk}$, similarly to FIG. 18. Also, the overall structure of the photovoltaic power generation system PVS8 is substantially the same as the photovoltaic power generation system PVS7 according to the seventh embodiment. In the photovoltaic power generation system PVS8 according to the eighth embodiment, the plurality of power conditioners $PCS_{Pvi}$ and $PCS_{Bk}$ are divided into two groups. One of the groups is a first power conditioner group $G_{PV}$, which is a group of the plurality of power conditioners $PCS_{Pvi}$, and the other is a second power conditioner group $G_B$, which is a group of the plurality of power conditioners $PCS_{Bk}$.

The photovoltaic power generation system PVS8 according to the eighth embodiment sets a target power for each of the first power conditioner group $G_{PV}$ and the second power conditioner group $G_B$, and regulates the total output power of the first power conditioner group $G_{PV}$ and the total output power of the second power conditioner group $G_B$ to the respective target powers. This control is referred to as "schedule control". Note that the total output power of the first power conditioner group $G_{PV}$ is the sum $\Sigma P_{Pvi}^{out}$ of the individual output powers $P_{Pvi}^{out}$ of the power conditioners $PCS_{Pvi}$ and is referred to as a first group total output $P_{GPV}$. Also, the total output power of the second power conditioner group $G_B$ is the sum $\Sigma P_{Bk}^{out}$ of the individual output powers $P_{Bk}^{out}$ of the power conditioners $PCS_{Bk}$ and is referred to as a second group total output $P_{GB}$.

As shown in FIG. 25, the photovoltaic power generation system PVS8 is different from the photovoltaic power generation system PVS7 according to the seventh embodiment in the following points, in order to perform the schedule control. Specifically, the central management device MC8 includes a schedule setting unit 64 instead of the output command value acquisition unit 21, a total output calculator 62' instead of the total output calculator 62, and an index calculator 63' instead of the index calculator 63.

The schedule setting unit 64 performs various settings for the schedule control. In the present embodiment, the sched-ule setting unit 64 sets a first group target power $P_{TPV}$, which is the target value of the first group total output $P_{GPV}$, and a second group target power $P_{TB}$, which is the target value of the second group total output $P_{GB}$. The first group target power $P_{TPV}$ and the second group target power $P_{TB}$ can be set for each predetermined time zone described above. These setting values can be freely set by a user. The schedule setting unit 64 outputs the various setting values thus set to the index calculator 63'.

The total output calculator 62' calculates the first group total output $P_{GPV}$ and the second group total output $P_{GB}$. Specifically, the total output calculator 62' calculates the first group total output $P_{GPV}$ by adding up the individual output powers $P_{Pvi}^{out}$ of the power conditioners $PCS_{Pvi}$ received by the receiver 61. Also, the total output calculator 62' calculates the second group total output $P_{GB}$ by adding up the individual output powers $P_{Bk}^{out}$ of the power conditioners $PCS_{Bk}$ received by the receiver 61.

The index calculator 63' calculates the suppression index $pr_{pv}$ used to regulate the first group total output $P_{GPV}$ calculated by the total output calculator 62' to the first group target power $P_{TPV}$ input by the schedule setting unit 64. At this time, the index calculator 63' calculates the suppression index $pr_{pv}$ with use of the following formula (34). In the following formula (34), $\lambda_{PV}$ denotes the Lagrange multiplier for the plurality of power conditioners $PCS_{Pvi}$, and $\varepsilon_{PV}$ denotes the gradient coefficient for the plurality of power conditioners $PCS_{Pvi}$. Since the first group total output $P_{GPV}$ and the first group target power $P_{TPV}$ have values that vary over time t, the first group total output is denoted by $P_{GPV}(t)$ and the first group target power is denoted by $P_{TPV}(t)$ respectively. Accordingly, the index calculator 63' calculates the Lagrange multiplier $\lambda_{PV}$ with use of the first group total output $P_{GPV}(t)$ instead of the connection point power P(t), and the first group target power $P_{TPV}(t)$ instead of the output command value $P^C(t)$, in the above formula (9). The calculated Lagrange multiplier $\lambda_{PV}$ is then set to the suppression index $pr_{pv}$. The index calculator 63' transmits the calculated suppression index $pr_{pv}$ to the power conditioners $PCS_{Pvi}$ via a transmitter 44.

$$\left. \begin{array}{l} \dfrac{d\lambda_{PV}}{dt} = \varepsilon_{PV}(P_{GPV}(t) - P_{TPV}(t)) \\ pr_{PV} = \lambda_{PV} \end{array} \right\} \quad \Lambda(34)$$

The index calculator 63' calculates the charge/discharge index $pr_B$ used to regulate the second group total output $P_{GB}$ calculated by the total output calculator 62' to the second group target power $P_{TB}$ input by the schedule setting unit 64. At this time, the index calculator 63' calculates the charge/discharge index $pr_B$ with use of the following formula (35). In the following formula (35), $\lambda_B$ denotes the Lagrange multiplier for the plurality of power conditioners $PCS_{Bk}$, and $\varepsilon_B$ denotes the gradient coefficient for the plurality of power conditioners $PCS_{Bk}$. Since the second group total output $P_{GB}$ and the second group target power $P_{TB}$ have values that vary over time t, the second group total output is denoted by $P_{GB}(t)$ and the second group target power is denoted by $P_{TB}(t)$ respectively. Accordingly, the index calculator 63' calculates the Lagrange multiplier $\lambda_B$ with use of the second group total output $P_{GB}(t)$ instead of the connection point power P(t), and the second group target power $P_{TB}(t)$ instead of the output command value $P^C(t)$, in the above formula (9). Then, the index calculator 63' calculates the calculated Lagrange multiplier $\lambda_3$ as the charge/discharge index $pr_B$.

The index calculator 63' transmits the calculated charge/discharge index $pr_B$ to the power conditioners $PCS_{Bk}$ via the transmitter 44.

$$\left.\begin{array}{l} \dfrac{d\lambda_B}{dt} = \varepsilon_B(P_{GB}(t) - P_{TB}(t)) \\ pr_B = \lambda_B \end{array}\right\} \quad \Lambda(35)$$

In the photovoltaic power generation system PVS8 having the structure as described above, the central management device MC8 acquires the individual output powers $P_{PVi}^{out}$ from the power conditioners $PCS_{PVi}$, and calculates the first group total output $P_{GPV}$. Then, the central management device MC8 calculates the suppression index $pr_{pv}$ with the above formula (34) for matching the calculated first group total output $P_{GPV}$ with the first group target power $P_{TPV}$. The calculated suppression index $pr_{pv}$ is transmitted to the power conditioners $PCS_{PVi}$. Each of the power conditioners $PCS_{PVi}$ calculates the individual target power $P_{PVi}^{ref}$ with use of the received suppression index $pr_{pv}$, and regulates the individual output power $P_{PVi}^{out}$ to the individual target power $P_{PVi}^{ref}$. Also, the central management device MC8 acquires the individual output powers $P_{Bk}^{out}$ from the power conditioners $PCS_{Bk}$, and calculates the second group total output $P_{GB}$. Then, the central management device MC8 calculates the charge/discharge index $pr_B$ with the above formula (35) for matching the calculated second group total output $P_{GB}$ with the second group target power $P_{TB}$. The calculated charge/discharge index $pr_B$ is transmitted to the power conditioners $PCS_{Bk}$. Each of the power conditioners $PCS_{Bk}$ calculates the individual target power $P_{Bk}^{ref}$ with use of the received charge/discharge index $pr_B$, and regulates the individual output power $P_{Bk}^{out}$ to the individual target power $P_{Bk}^{ref}$. As a result of these steps, the first group total output $P_{GPV}$ is matched with the first group target power $P_{TPV}$, and the second group total output $P_{GB}$ is matched with the second group target power $P_{TB}$.

Based on the above, the photovoltaic power generation system PVS8 according to the present embodiment can match the first group total output $P_{GPV}$ with the first group target power $P_{TPV}$ and the second group total output $P_{GB}$ with the second group target power $P_{TB}$, by setting the respective target powers (first group target power $P_{TPV}$ and the second group target power $P_{TB}$) for the first power conditioner group $G_{PV}$ and the second power conditioner group $G_B$. Since the power conditioners $PCS_{PVi}$ and $PCS_{Bk}$ dispersively calculate the individual target powers $P_{PVi}^{ref}$ and $P_{Bk}^{ref}$ based on the suppression index $pr_{pv}$ and the charge/discharge index $pr_B$, the processing load of the central management device MC8 can be reduced.

In the eighth embodiment, the target power (the first group target power $P_{TPV}$ or the second group target power $P_{TB}$) is set for each of the first power conditioner group $G_{PV}$ and the second power conditioner group $G_B$. However, the target power may be set for only one of these groups.

In the eighth embodiment, the plurality of power conditioners $PCS_{PVi}$ and $PCS_{Bk}$ are divided into two groups, i.e., the first power conditioner group $G_{PV}$ made up of the plurality of power conditioners $PCS_{PVi}$ and the second power conditioner group $G_B$ made up of the plurality of power conditioners $PCS_{Bk}$. However, other examples may be conceivable. For example, the first power conditioner group $G_{PV}$ may be further divided into a plurality of groups, and a target power may be set for each of these groups. The same applies to the second power conditioner group $G_B$. It is also possible to divide the power conditioners $PCS_{PVi}$ and $PCS_{Bk}$ into groups that each include at least one power conditioner $PCS_{PVi}$ and at least one power conditioner $PCS_{Bk}$, and to set the target power for each of these groups. In this case, the above formulas (21) and (22) may be used to calculate the suppression index $pr_{pv}$ and the charge/discharge index $pr_B$ for each of these groups.

In the seventh and eighth embodiments, the photovoltaic power generation systems PVS7 and PVS8 respectively implement the system total output suppression control and the schedule control. However, these controls may be combined with each other. In this case, the central management device may switch between the controls as necessary. For example, the switching may be performed in response to an operation of a user, or the switching may be performed automatically based on a situation (whether a suppression command is received from the power company, whether the first group target power $P_{TPV}$ and the second group target power $P_{TB}$ are set, etc).

In the seventh and eighth embodiments, the central management devices MC7 and MC8 acquire the individual output powers $P_{PVi}^{out}$ and $P_{Bk}^{out}$ from the power conditioners $PCS_{PVi}$ and $PCS_{Bk}$. In addition to this, it is possible to further acquire, from the power load L, the power consumption of the power load L. In the case where the power consumption of the power load L is available, it is possible to estimate the connection point power P(t) by calculating the sum of the individual output powers $P_{PVi}^{out}$ and $P_{Bk}^{out}$ acquired from the power conditioners $PCS_{PVi}$ and $PCS_{Bk}$ and the power consumption acquired from the power load L. This allows for the connection point power suppression control, the peak shaving control, and the reverse power flow prevention control described in the third to fifth embodiments, without the connection point power detector 22.

In the third to fifth embodiments, the connection point power suppression control, the peak shaving control, and the reverse power flow prevention control are performed based on the connection point power P(t). Also, in the seventh to eighth embodiments, the system total output suppression control and the schedule control are performed based on the system total output $P_{total}(t)$, the first group total output $P_{GPV}$, and the second group total output $P_{GB}$. However, other examples may be conceivable. As one example, it is possible to provide both a means for detecting the connection point power P(t) (connection point power detector 22) and a means for acquiring the individual output powers $P_{PVi}^{out}$ and $P_{Bk}^{out}$ from the power conditioners $PCS_{PVi}$ and $PCS_{Bk}$, so as to allow for a composite control including the connection point power suppression control, the peak shaving control, the reverse power flow prevention control, the system total output suppression control, and the schedule control.

Although the first to eighth embodiments each describe an example in which the power system according to the present disclosure is applied to a photovoltaic power generation system, the power system may be applied to other power generation systems such as a wind power generation system. Alternatively, a photovoltaic power generation system may be combined with other power generation systems.

The power system according to the present disclosure is not limited to the embodiments described above, and various design changes may be made to the specific configurations of the units without departing from the scope of the claims.

LIST OF REFERENCE SIGNS

PVS1-PVS8 Photovoltaic power conditioners
A Power grid
$SP_i$ Solar cell
$B_k$ Storage cell
$PCS_i$, $PCS_{PVi}$, $PCS_{Bk}$ Power conditioners
$G_{PV}$ First power conditioner group
$G_B$ Second power conditioner group
11, 31 Receivers
12, 12', 32 Target power calculators
13, 33 Output controllers
14 Output power detector
15 Transmitter
MC1-MC8 Central management devices
21 Output command value acquisition unit
22 Connection point power detector
23, 43, 43', 43" Index calculators
24, 44 Transmitters
45 Peak shaving setting unit
46 Reverse power flow prevention setting unit
51 RPR (Reverse power relay)
61 Receiver
62, 62' Total output calculators
63, 63' Index calculators
64 Schedule setting unit
L Power load

The invention claimed is:

1. A power system connected to a power grid, comprising:
a plurality of power conditioners; and
a central management device that manages the plurality of power conditioners,
wherein the central management device includes:
a detector that detects regulation subject power;
an index calculator that calculates an index for controlling individual output powers of the plurality of power conditioners such that the regulation subject power matches with target power, the calculating of the index being based on the regulation subject power and the target power; and
a transmitter that transmits the index to the plurality of power conditioners,
wherein each of the plurality of power conditioners includes:
a receiver that receives the index;
a target power calculator that calculates the individual target power of the power conditioner based on an optimization problem using the index; and
a controller that regulates the individual output power of the power conditioner to the individual target power.

2. The power system according to claim 1,
wherein the plurality of power conditioners include n photovoltaic power conditioners (n being a positive integer) that receive power from solar cells,
wherein the index calculator calculates a suppression index as the index for the photovoltaic power conditioners, and
wherein the transmitter transmits the suppression index to the photovoltaic power conditioners.

3. The power system according to claim 2,
wherein when pr denotes the suppression index, $P_i^{ref}$ (i=an integer of 1, ..., n) denotes the individual target power of each of the n photovoltaic power conditioners, $P_i^{lmt}$ denotes a rated output of each of the n photovoltaic power conditioners, and wj denotes a weight for an output control of each of the n photovoltaic power conditioners, the individual target power $P_i^{ref}$ is calculated by solving an optimization problem defined by the following formula (1).

$$\min_{P_i^{ref}} \left\{ w_i \left( P_i^{ref} - P_i^{lmt} \right)^2 + pr \left( P_i^{ref} - P_i^{lmt} \right) \right\} \quad (1)$$

$$\text{subject to } 0 \leq P_i^{ref} \leq P_i^{lmt}$$

4. The power system according to claim 2, wherein when $P_i^{out}(t)$ denotes the individual output power of each of the n photovoltaic power conditioners, $P^C(t)$ denotes the target power, and $P(t)$ denotes the regulation subject power, the index calculator calculates the suppression index pr by solving the following formulas (2) and (3), $$\frac{d\lambda}{dt} = \varepsilon \left( \sum_{i=1}^{n} P_i^{out}(t) - P^C(t) \right), \varepsilon > 0 \quad (2)$$

$$= \varepsilon(P(t) - P^C(t))$$

$$pr = \lambda \quad (3)$$

Note that c denotes a gradient coefficient.

5. The power system according to claim 2,
wherein the plurality of power conditioners include m storage cell power conditioners (m being a positive integer) that receive power from storage cells or output power to the storage cells,
wherein the index calculator calculates a charge/discharge index as the index for the storage cell power conditioners, and
wherein the transmitter transmits the charge/discharge index to the storage cell power conditioners.

6. The power system according to claim 5,
wherein when $pr_{pv}$ denotes the suppression index, $P_{PVi}^{ref}$ (i=an integer of 1, ..., n) denotes the individual target power of each of the n photovoltaic power conditioners, $P_{PVi}^{lmt}$ denotes a rated output of each of the n photovoltaic power conditioners, $w_{PVi}$ denotes a weight for an output control of each of the n photovoltaic power conditioners, and $P_i t$ denotes a design parameter indicating whether to prioritize suppression of the individual output power of each of the n photovoltaic power conditioners, the individual target power $P_{PVi}^{ref}$ is calculated by solving an optimization problem defined by the following formula (4), and
wherein when $pr_B$ denotes the charge/discharge index, $P_{Bk}^{ref}$ (k=an integer of 1, ..., m) denotes the individual target power of each of the m storage cell power conditioners, $P_{Bk}^{lmt}$ denotes a rated output of each of the m storage cell power conditioners, $w_{Bk}$ denotes a weight for an output control of each of the m storage cell power conditioners, and $\alpha_k$ and $\beta_k$ denote parameters set according to a remaining amount of each of the storage cells, the individual target power $P_{Bk}^{ref}$ is calculated by solving an optimization problem defined by the following formula (5).

$$\min_{P_{PVi}^{ref}} \left\{ w_{PVi} \left( P_{PVi}^{ref} - P_{\varphi i} \right)^2 + pr_{PV} \left( P_{PVi}^{ref} - P_{\varphi i} \right) \right\} \quad (4)$$

$$\text{subject to } 0 \leq P_{PVi}^{ref} \leq P_{PVi}^{lmt}$$

-continued $$\min_{P_{Bk}^{ref}} \left\{ w_{VBk}(P_{Bk}^{ref})^2 + pr_B(P_{Bk}^{ref}) \right\} \quad (5)$$
$$\text{subject to } -P_{Bk}^{lmt} \le P_{Bk}^{ref} \le P_{Bk}^{lmt}$$
$$\alpha_k \le P_{Bk}^{ref} \le \beta_k$$

7. The power system according to claim 5,
wherein when $pr_{PV}$ denotes the suppression index, $P_{PVi}^{ref}$ (i=an integer of 1, . . . , n) denotes the individual target power of each of the n photovoltaic power conditioners, $P_{PVi}^{lmt}$ denotes a rated output of each of the n photovoltaic power conditioners, $w_{PVi}$ denotes a weight for an output control of each of the n photovoltaic power conditioners, $P_{\varphi i}$ denotes a design parameter indicating whether to prioritize suppression of the individual output power of each of the n photovoltaic power conditioners, $Q_{PVi}$ denotes an output of reactive power, $S_{PVi}^{d}$ denotes a maximum apparent power that can be output, $V_{PVi}$ denotes a connection point voltage of each of the n photovoltaic power conditioners, and $V_0$ denotes a connection point reference voltage, the individual target power $P_{PVi}^{ref}$ is calculated by solving an optimization problem defined by the following formula (4'), and wherein when $pr_B$ denotes the charge/discharge index, $P_{Bk}^{ref}$ (k=an integer of 1, . . . , m) denotes the individual target power of each of the m storage cell power conditioners, $P_{Bk}^{lmt}$ denotes a rated output of each of the m storage cell power conditioners, $P_{SMk}^{lmt}$ denotes a charge rated output of each of the storage cells, $P_{SPk}^{lmt}$ denotes a discharge rated output of each of the storage cells, $w_{Bk}$ denotes a weight for an output control of each of the m storage cell power conditioners, $\alpha_k$ and $\beta_k$ denote parameters set according to a remaining amount of each of the storage cells, $w_{SOCk}$ denotes a weight corresponding to a state of charge of each of the storage cells, $Q_{Bk}$ denotes an output of reactive power, $S_{Bk}^{d}$ denotes a maximum apparent power that can be output, $V_{Bk}$ denotes a connection point voltage of each of the m storage cell power conditioners, and $V_0$ denotes a connection point reference voltage, the individual target power $P_{Bk}^{ref}$ is calculated by solving an optimization problem defined by the following formula (5').

$$\min_{P_{PVi}^{ref}} \left\{ w_{PVi}(P_{PVi}^{ref} - P_{\varphi i})^2 + pr_{PV}(P_{PVi}^{ref} - P_{\varphi i}) \right\} \quad (4')$$
$$\text{subject to } 0 \le P_{PVi}^{ref} \le P_{PVi}^{lmt}$$
$$(P_{PVi}^{ref})^2 + (Q_{PVi})^2 \le \left(S_{PVi}^{d} \frac{V_{PVi}}{V_0}\right)^2$$

$$\min_{P_{Bk}^{ref}} \left\{ w_{Bk} w_{SOCk}(P_{Bk}^{ref})^2 + pr_B(P_{Bk}^{ref}) \right\} \quad (5')$$
$$\text{subject to } -P_{Bk}^{lmt} \le P_{Bk}^{ref} \le P_{Bk}^{lmt}$$
$$P_{SMk}^{lmt} \le P_{Bk}^{ref} \le P_{SPk}^{lmt}$$
$$\alpha_k \le P_{Bk}^{ref} \le \beta_k$$
$$(P_{Bk}^{ref})^2 + (Q_{Bk})^2 \le \left(S_{Bk}^{d} \frac{V_{Bk}}{V_0}\right)^2$$

8. The power system according to claim 5, wherein when $P_{PVi}^{out}(t)$ denotes the individual output power of each of the n photovoltaic power conditioners, $P_{Bk}^{out}(t)$ denotes the individual output power of each of the m storage cell power conditioners, $P^C(t)$ denotes the target power, $P(t)$ denotes the regulation subject power, $pr_{PV}$ denotes the suppression index, and $pr_B$ denotes the charge/discharge index, the index calculator calculates the suppression index $Pr_{PV}$ and the charge/discharge index $Pr_B$ with use of the following formulas (6) and (7), $$\frac{d\lambda}{dt} = \varepsilon\left(\sum_{i=1}^{n}(P_{PVi}^{out}(t)) + \sum_{k=1}^{m}(P_{Bk}^{out}(t)) - P^C(t)\right), \varepsilon > 0 \quad (6)$$
$$= \varepsilon(P(t) - P^C(t))$$

$$pr_{PV} = pr_B = \lambda \quad (7)$$

where $\varepsilon$ denotes a gradient coefficient.

9. The power system according to claim 1, wherein the regulation subject power is a power at a connection point of the plurality of power conditioners and the power grid.

10. The power system according to claim 1,
wherein the central management device further includes:
an acquiring unit that acquires the individual output powers of the plurality of power conditioners; and a total output power calculator that calculates a total output power which is a sum of the individual output powers of the plurality of power conditioners, and
wherein the regulation subject power is the total output power.

11. The power system according to claim 1, wherein a load that consumes power is connected to the connection point of the plurality of power conditioners and the power grid.

12. The power system according to claim 1,
wherein a load that consumes power is connected to the connection point of the plurality of power conditioners and the power grid,
wherein the central management device further includes:
an acquiring unit that acquires the individual output powers of the plurality of power conditioners, and that acquires power consumption of the load; a total output power calculator that calculates a total output power that is a sum of the individual output powers of the plurality of power conditioners; and a connection point power estimator that estimates a power at the connection point, based on the total output power and the power consumption, and
wherein the regulation subject power is the power at the connection point.

13. The power system according to claim 1,
wherein the central management device further includes an acquiring unit that acquires an output command from a power company via wireless communication, and
wherein the target power is a target value based on the output command.

14. The power system according to claim 1,
wherein the central management device further includes a setting unit that sets an upper limit value of power supplied from the power grid, and
wherein the target power is a target value based on the upper limit value.

15. The power system according to claim 14, wherein when at least one of the plurality of power conditioners is connected to any of the solar cells, the index calculator calculates the index for the at least one power conditioner as 0.

16. The power system according to claim 1,
wherein the central management device further includes a setting unit that sets a reverse power flow prevention target, and
wherein the target power is a target value based on the reverse power flow prevention target.

17. The power system according to claim 1,
wherein the plurality of power conditioners are divided into a plurality of groups, and
wherein in at least one of the plurality of groups, a control is performed such that a sum of the individual output powers of all power conditioners in the group indicates a predetermined target value.

* * * * *

UNITED STATES PATENT AND TRADEMARK OFFICE
CERTIFICATE OF CORRECTION

PATENT NO. : 10,871,795 B2
APPLICATION NO. : 16/081276
DATED : December 22, 2020
INVENTOR(S) : Ohori et al.

Page 1 of 1

It is certified that error appears in the above-identified patent and that said Letters Patent is hereby corrected as shown below:

In the Claims

Column 47, Line 66: Delete: "and wj denotes a weight" and insert --and $w_i$ denotes a weight--.

Column 48, Line 26: Delete: "Note that c denotes a gradient coefficient" and insert --Note that $\varepsilon$ denotes a gradient coefficient--.

Column 48, Line 44: Delete: "$P_i$t denotes a design parameter" and insert --$P_{\varphi i}$ denotes a design parameter--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*